(12) United States Patent
Abhiram et al.

(10) Patent No.: US 12,165,041 B2
(45) Date of Patent: Dec. 10, 2024

(54) LOW POWER HARDWARE ARCHITECTURE FOR HANDLING ACCUMULATION OVERFLOWS IN A CONVOLUTION OPERATION

(71) Applicant: Recogni Inc., San Jose, CA (US)

(72) Inventors: Shabarivas Abhiram, Mountain View, CA (US); Gary S. Goldman, Los Altos, CA (US); Jian hui Huang, Los Altos, CA (US); Eugene M. Feinberg, San Jose, CA (US)

(73) Assignee: Recogni Inc., San Jose, CA (US)

( * ) Notice: Subject to any disclaimer, the term of this patent is extended or adjusted under 35 U.S.C. 154(b) by 0 days.

(21) Appl. No.: 17/806,143

(22) Filed: Jun. 9, 2022

(65) Prior Publication Data

US 2023/0401433 A1    Dec. 14, 2023

(51) Int. Cl.
*G06N 3/063*    (2023.01)
*G06F 9/30*    (2018.01)
*G06F 17/16*    (2006.01)

(52) U.S. Cl.
CPC ......... *G06N 3/063* (2013.01); *G06F 9/30189* (2013.01); *G06F 17/16* (2013.01)

(58) Field of Classification Search
CPC ..... G06N 3/063; G06F 9/30189; G06F 17/16; G06F 17/153; G06F 7/00
See application file for complete search history.

(56) References Cited

U.S. PATENT DOCUMENTS 4,700,319 A * 10/1987 Steiner .................. G06F 7/4876
                                                        382/303
4,811,211 A    3/1989 Sandman et al.
5,319,588 A    6/1994 Haines et al.
(Continued)

FOREIGN PATENT DOCUMENTS

EP    0 992 885 B1    4/2000
EP    1 058 185 A1    12/2000
(Continued)

OTHER PUBLICATIONS

Zamarreño-Ramos, Carlos. "Modular and scalable implementation of AER neuromorphic systems." (2011): i-212 (Year: 2011).*
(Continued)

*Primary Examiner* — Randall K. Baldwin
(74) *Attorney, Agent, or Firm* — Ascenda Law Group, PC

(57) ABSTRACT

In a low power hardware architecture for handling accumulation overflows in a convolver unit, an accumulator of the convolver unit computes a running total by successively summing dot products from a dot product computation module during an accumulation cycle. In response to the running total overflowing the maximum or minimum value of a data storage element, the accumulator transmits an overflow indicator to a controller and sets its output equal to a positive or negative overflow value. In turn, the controller disables the dot product computation module by clock gating, clamping one of its inputs to zero and/or holding its inputs to constant values. At the end of the accumulation cycle, the output of the accumulator is sampled. In response to a clear signal being asserted, the dot product computation module is enabled, and the running total is set to zero for the start of the next accumulation cycle.

14 Claims, 50 Drawing Sheets

(56) References Cited

U.S. PATENT DOCUMENTS

| | | | |
|---|---|---|---|
| 6,571,268 | B1 | 5/2003 | Giacalone et al. |
| 6,745,336 | B1 | 6/2004 | Martonosi et al. |
| 6,862,678 | B1 | 3/2005 | Kao et al. |
| 6,868,432 | B2 | 3/2005 | Fugger et al. |
| 7,023,240 | B2 | 4/2006 | Elappuparackal |
| 7,206,800 | B1 | 4/2007 | Bentz |
| 9,703,529 | B2 | 7/2017 | Lutz et al. |
| 10,586,148 | B2* | 3/2020 | Henry ............. G06N 3/082 |
| 10,671,388 | B1* | 6/2020 | Preusser ......... G06F 9/30014 |
| 10,678,509 | B1* | 6/2020 | Settle ............. G06N 3/063 |
| 10,891,538 | B2* | 1/2021 | Dally ............. G06N 3/048 |
| 11,262,982 | B2* | 3/2022 | Park ............... G06F 7/5443 |
| 2004/0225703 | A1 | 11/2004 | Pangal |
| 2005/0251638 | A1* | 11/2005 | Boutaud ......... G06F 9/30116 |
| | | | 712/E9.025 |
| 2011/0239032 | A1* | 9/2011 | Kato ............... G06V 40/171 |
| | | | 713/500 |
| 2018/0137414 | A1* | 5/2018 | Du .................. G06F 1/3287 |
| 2018/0225116 | A1* | 8/2018 | Henry ............. G06F 17/10 |
| 2018/0307975 | A1* | 10/2018 | Nealis ............. G06F 7/5443 |
| 2018/0322390 | A1* | 11/2018 | Das ................ G06F 9/30036 |
| 2018/0322607 | A1* | 11/2018 | Mellempudi .... G06N 3/0454 |
| 2019/0101952 | A1 | 4/2019 | Diamond et al. |
| 2019/0238152 | A1* | 8/2019 | Pagnanelli ...... H03M 3/51 |
| 2019/0294413 | A1* | 9/2019 | Vantrease ....... G06F 7/5095 |
| 2019/0392287 | A1* | 12/2019 | Ovsiannikov ... G06N 3/08 |
| 2020/0026494 | A1* | 1/2020 | Langhammer ... G06F 17/16 |
| 2020/0074285 | A1* | 3/2020 | Kim ............... G06N 3/045 |
| 2020/0310758 | A1 | 10/2020 | Desoli et al. |
| 2021/0029312 | A1* | 1/2021 | Geurts ........... H04N 5/3575 |
| 2021/0049463 | A1* | 2/2021 | Ruff .............. G06N 3/045 |
| 2021/0064688 | A1 | 3/2021 | Saeed et al. |
| 2021/0248456 | A1* | 8/2021 | Guo ................ G06N 3/045 |
| 2021/0287423 | A1* | 9/2021 | Guenther ........ G06T 1/20 |
| 2021/0303307 | A1* | 9/2021 | Olson ............. G06F 7/5443 |
| 2021/0312270 | A1* | 10/2021 | Liguori ........... G06F 7/50 |
| 2022/0066739 | A1* | 3/2022 | Croxford ........ H03M 7/24 |
| 2022/0100468 | A1* | 3/2022 | Han ................ G06N 3/0481 |
| 2022/0284273 | A1* | 9/2022 | Yoo ................ G06F 7/523 |
| 2022/0318013 | A1* | 10/2022 | Mellempudi .... G06F 9/3818 |
| 2023/0092574 | A1* | 3/2023 | Dibrino ........... G06F 7/4876 |

FOREIGN PATENT DOCUMENTS

| | | |
|---|---|---|
| WO | 2020/191417 A2 | 9/2020 |
| WO | 2022/015967 A1 | 1/2022 |

OTHER PUBLICATIONS

Hari, Siva Kumar Sastry, et al. "Making convolutions resilient via algorithm-based error detection techniques." IEEE Transactions on Dependable and Secure Computing 19.4 (2021): 2546-2558. (Year: 2021).*

Park, Jeongwoo, Sunwoo Lee, and Dongsuk Jeon. "A neural network training processor with 8-bit shared exponent bias floating point and multiple-way fused multiply-add trees." IEEE Journal of Solid-State Circuits 57.3 (2021): 965-977. (Year: 2021).*

Li, Jian, and Raziel Alvarez. "On the quantization of recurrent neural networks." arXiv preprint arXiv:2101.05453 (2021): 1-20 (Year: 2021).*

Chai, Elaina Teresa. Analysis of Quantization and Normalization Effects in Deep Neural Networks. Stanford University, 2021: i-131 (Year: 2021).*

Gural, Albert. Algorithmic Techniques for Neural Network Training on Memory-Constrained Hardware. Stanford University, 2021: i-186 (Year: 2021).*

Pedram, Ardavan, et al. "Algorithm/architecture solutions to improve beyond uniform quantization in embedded DNN accelerators." Journal of Systems Architecture 126 (Mar. 2022): 102454: 1-9. (Year: 2022).*

Machura, Michal, Michal Danilowicz, and Tomasz Kryjak. "Embedded Object Detection with Custom LittleNet, FINN and Vitis AI DCNN Accelerators." Journal of Low Power Electronics and Applications 12.2 (May 2022): 30: 1-35 (Year: 2022).*

Lian, Ruo Long. A framework for FPGA-based acceleration of neural network inference with limited numerical precision via high-level synthesis with streaming functionality. University of Toronto (Canada), 2016: i-103 (Year: 2016).*

Wei, Xuechao, et al. "Automated systolic array architecture synthesis for high throughput CNN inference on FPGAs." Proceedings of the 54th Annual Design Automation Conference 2017. (Year: 2017).*

Nascimento, Marcelo Gennari do, Roger Fawcett, and Victor Adrian Prisacariu. "Dsconv: Efficient convolution operator." Proceedings of the IEEE/CVF International Conference on Computer Vision. 2019: 5148-5157 (Year: 2019).*

Zhang, Heshan, et al. "A Block-Floating-Point Arithmetic Based FPGA Accelerator for Convolutional Neural Networks." 2019 IEEE Global Conference on Signal and Information Processing (GlobalSIP). IEEE, 2019. (Year: 2019).*

De Bruin, Barry, Zoran Zivkovic, and Henk Corporaal. "Quantization of deep neural networks for accumulator-constrained processors." Microprocessors and microsystems 72 (2020): 102872: 1-11 (Year: 2020).*

Tatsumi, Mariko. Using mixed low-precision formats in multiply-accumulate (MAC) units for DNN training. Diss. University of British Columbia, Apr. 2022: i-122 (Year: 2022).*

Du, Li, et al. "A reconfigurable streaming deep convolutional neural network accelerator for Internet of Things." IEEE Transactions on Circuits and Systems I: Regular Papers 65.1 (2017): 198-208. (Year: 2017).*

Ahmadi, Mehdi, Shervin Vakili, and JM Pierre Langlois. "CARLA: A convolution accelerator with a reconfigurable and low-energy architecture." IEEE Transactions on Circuits and Systems I: Regular Papers 68.8 (2021): 3184-3196. (Year: 2021).*

Abtahi; et al., "Accelerating Convolutional Neural Network with FFT on Embedded Hardware", IEEE Transactions on Very Large Scale Integration (VLSI) Systems, 2018, vol. 26, Issue 9, 13 pgs.

Andri; et al., "YodaNN1: An Architecture for Ultra-Low Power Binary-Weight CNN Acceleration", IEEE Transactions on Computer-Aided Design of Integrated Circuits and Systems, arXiv:1606.05487v4 [cs.AR] Feb. 24, 2017, 14 pgs.

Brooks; et al., "Value-Based Clock Gating and Operation Packing: Dynamic Strategies for Improving Processor Power and Performance", ACM Transactions on Computer Systems, vol. 18, No. 2, May 2000, pp. 89-126.

Kim; et al., "Low-Power RTL Code Generation for Advanced CNN Algorithms toward Object Detection in Autonomous Vehicles", Electronics (2020), 9(3):478, 14 pgs.

Kitayama; et al., "Low-Power Implementation Techniques for Convolutional Neural Networks Using Precise and Active Skipping Methods", IEICE Trans. Electron., vol. E104-C, No. 7, Jul. 2021, pp. 330-337.

Mukkara; et al., "SCNN: An Accelerator for Compressed-sparse Convolutional Neural Networks", 2017 ACM/IEEE 44th Annual International Symposium on Computer Architecture (ISCA), arXiv:1708.04485v1 [cs.NE] May 23, 2017, 12 pgs.

Ottavi; et al., "A Mixed-Precision RISC-V Processor for Extreme-Edge DNN Inference", 2020 IEEE Computer Society Annual Symposium on VLSI (ISVLSI), arXiv:2010.04073v1 [cs.AR] Oct. 8, 2020, 6 pgs.

Prabhu; et al., "Context Based Clock Gating Technique for Low Power Designs of IoT Applications—A DesignWare IP Case Study", Design and Reuse (design-reuse.com), downloaded Mar. 29, 2022 from: https://www.design-reuse.com/articles/42300/context-based-clock-gating-technique-for-low-power-designs-of-iot-applications.html, 7 pgs.

Wang; et al., "Bit Prudent In-Cache Acceleration of Deep Convolutional Neural Networks", 2019 IEEE International Symposium on High Performance Computer Architecture (HPCA), pp. 81-93 (2019).

Yu-Hsin; et al., "Eyeriss: An Energy-Efficient Reconfigurable Accelerator for Deep Convolutional Neural Networks." in ISSCC 2016, IEEE International Solid-State Circuits Conference, Jan. 31-Feb. 4, 2016, pp. 262-264.

(56) References Cited

OTHER PUBLICATIONS

Zhu; et al., "An Efficient Hardware Accelerator for Structured Sparse Convolutional Neural Networks on FPGAs", IEEE Transactions on Very Large Scale Integration (VLSI) Systems, arXiv:2001.01955v1 [eess.SY] Jan. 7, 2020, 12 pgs.
Extended European Search Report dated Oct. 23, 2023, from the European Patent Office, for EP Application No. 23177939.8, 8 pgs.

* cited by examiner

Model Training

Model Inference

LOW POWER HARDWARE ARCHITECTURE FOR HANDLING ACCUMULATION OVERFLOWS IN A CONVOLUTION OPERATION

FIELD OF THE INVENTION

The present invention relates to a hardware architecture for a convolutional engine, and more particularly relates to a low power hardware architecture for handling accumulation overflows in a convolution operation.

BACKGROUND

Today, neural networks (in particular convolution neural networks) are widely used for performing image recognition/classification, object recognition/classification and image segmentation. While having numerous applications (e.g., object identification for self-driving cars, facial recognition for social networks, etc.), neural networks require intensive computational processing which could lead to large power consumption. Described herein is a low power hardware architecture for handling accumulation overflows in a convolution computation.

SUMMARY OF THE INVENTION

In a low power hardware architecture for handling accumulation overflows in a convolver unit, an accumulator of the convolver unit computes a running total by successively summing dot products from a dot product computation module during an accumulation cycle. In a preferred embodiment, the dot product is between a kernel with a 3×3 array of weight values and input (or activation) data with a 3×3 array of data values. The dot products may be successively summed in the instance where a filter contain many kernels, and the input data contains many channels.

In response to the running total overflowing the maximum or minimum value of a data storage element, the accumulator transmits an overflow indicator to a controller and sets its output equal to a positive or negative overflow value. In turn, the controller disables the dot product computation module by clock gating, clamping one of its inputs to zero and/or holding its inputs to constant values. At the end of the accumulation cycle, the output of the accumulator is sampled, which may be either the running total of the accumulator or the overflow value. In response to a clear signal being asserted, the dot product computation module is enabled, and the running total is set to zero for the start of the next accumulation cycle.

If a system has only one convolver unit (mentioned only as a hypothetical for the sake of discussion), it might be reasonable for the convolver unit to immediately start the next accumulation cycle upon encountering an accumulation overflow. However, in a system with many convolver units, it is desired for the outputs of the respective accumulators to be sampled at the same time. Therefore, the disabled state advantageously allows a convolver to stay in a low power mode for the remainder of an accumulation cycle while waiting for one or more other convolver units to complete their respective accumulations. At the end of the accumulation cycle, the output of all accumulators are sampled. In response to a clear signal being asserted, a new accumulation cycle commences during which the respective running totals are set to zero and any disabled dot product computation modules are re-enabled.

These and other embodiments of the invention are more fully described in association with the drawings below.

BRIEF DESCRIPTION OF THE DRAWINGS

FIG. 10B, FIG. 10C and FIG. 10D depict the loading of data values into the 2-D shift register, in accordance with one embodiment of the invention.

FIG. 15B, FIG. 15C and FIG. 15D depict the loading of data values into the 2-D shift register, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Figure 1:
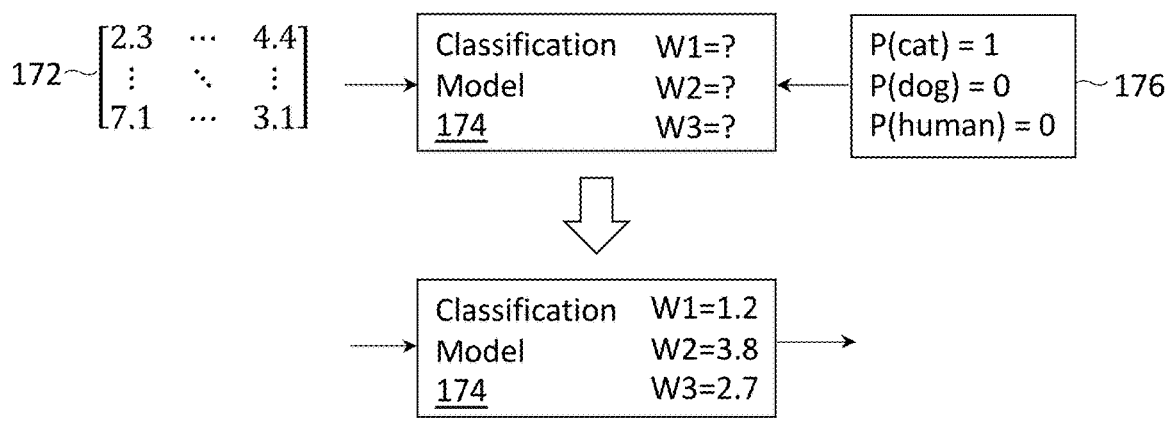
FIG. 1 depicts a diagram providing an overview of model training and model application in a neural network.
Figure 1:
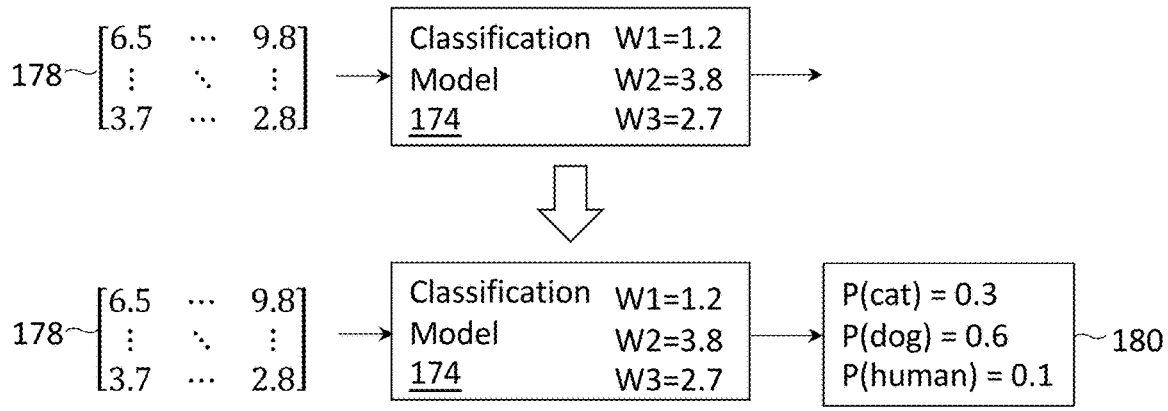

FIG. 1 depicts a diagram providing an overview of the training phase and the inference phase in a neural network. In the training phase, pairs of input and known (or desired) output may be provided to train model parameters (also called "weights") of classification model 174. For conciseness, only one input and output pair (172, 176) is depicted in FIG. 1, but in practice many known input and output pairs will be used to train classification model 174. In the example of FIG. 1, input 172 is a matrix of numbers (which may represent the pixels of an image) and known output 176 is a vector of classification probabilities (e.g., the probability that the input image is a cat is 1, the probability that the input image is a dog is 0, and the probability that the input image is a human is 0). In one possible training process, the classification probabilities may be provided by a human (e.g., a human can recognize that the input image depicts a cat and assign the classification probabilities accordingly). At the conclusion of the model training process, the model parameters will have been estimated (e.g., W1=1.2, W2=3.8, W3=2.7). Sometimes, there may be intuitive ways to interpret the model parameters, but many times no intuition may be associated therewith, and the model parameters may simply be the parameters that minimize the error between the model's classification (or the model's classification probabilities) of a given set of input with the known classification (or known classification probabilities), while at the same time avoiding "model overfitting."

In the inference (or prediction or feed-forward) phase, classification model 174 with trained parameters (i.e., parameters trained during the training phase) is used to classify a set of input. In the instant application, the trained classification model 174 provides the classification output 180 of a vector of probabilities (e.g., the probability that the input image is a cat is 0.3, the probability that the input image is a dog is 0.6, and the probability that the input image is a human is 0.1) in response to input 178.

One embodiment of classification model 174 is a convolutional neural network. A basic building block of a convolutional neural network is a convolution operation, which is described in FIGS. 2-7. As further described below, a convolution operation may refer to a 2-dimensional convolution operation with 2-dimensional input and a 2-dimensional filter, a 3-dimensional convolution operation with 3-dimensional input and a 3-dimensional filter, etc., and more generally, a n-dimensional convolution operation with an n-dimensional input tensor and an n-dimensional filter tensor.

Figure 2:
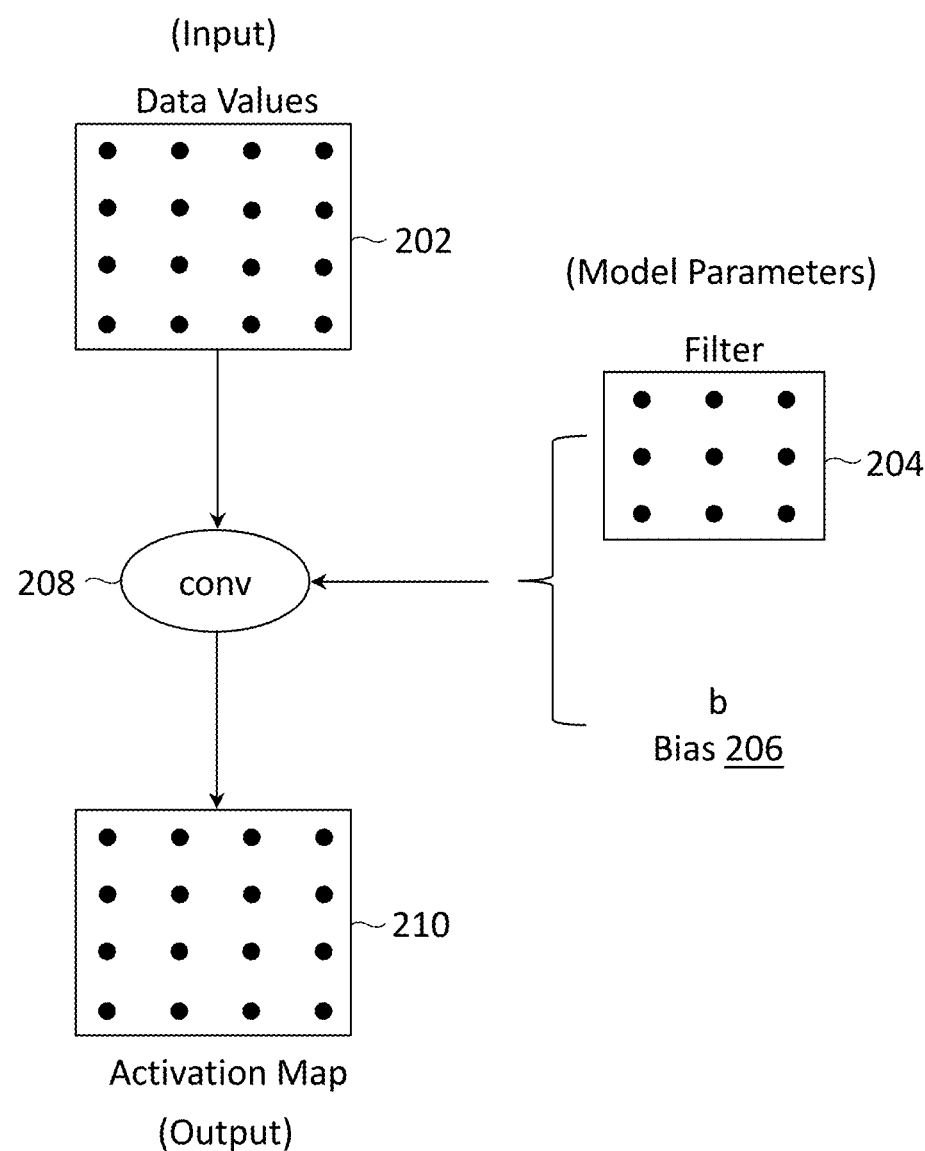
FIG. 2 depicts a diagram of the input, model parameters and output of a convolution operation, the model parameters including a single 2-dimensional filter.

FIG. 2 depicts a diagram of the input, model parameters and output of a 2-dimensional convolution operation. In the example of FIG. 2, the input includes a 2-dimensional matrix of numerical values (each of the numerical values abstractly represented by "⊙"). The matrix in the example of FIG. 2 is a 4×4 matrix, but other input could have different dimensions (e.g., could be a 100×100 square matrix, a 20×70 rectangular matrix, etc.). Later presented examples will illustrate that the input may even be a 3-dimensional object. In fact, the input may be an object of any number of dimensions. The input may represent pixel values of an image or may represent the output of a previous convolution operation (also called activation data).

The model parameters may include a filter and a bias. In the example of FIG. 2, the filter is a 3×3 matrix of values (the values also called "weights") and the bias is a scalar value. Typically, there is one bias associated with each filter. The example in FIG. 2 includes one filter, so there is one corresponding bias. However, in certain embodiments, if there were 5 filters, there would be 5 associated biases, one for each of the filters.

The convolution operator 208 (abbreviated "conv") receives input 202 and the model parameters 204, 206, and generates output 210 called an activation map or a feature map. Each value of the activation map is generated as the sum of a dot product between of input 202 and filter 204 (at a certain spatial location relative to input 202) and bias 206. The computations to arrive at activation map 210 are described in more detail below in FIG. 3.

Figure 3:
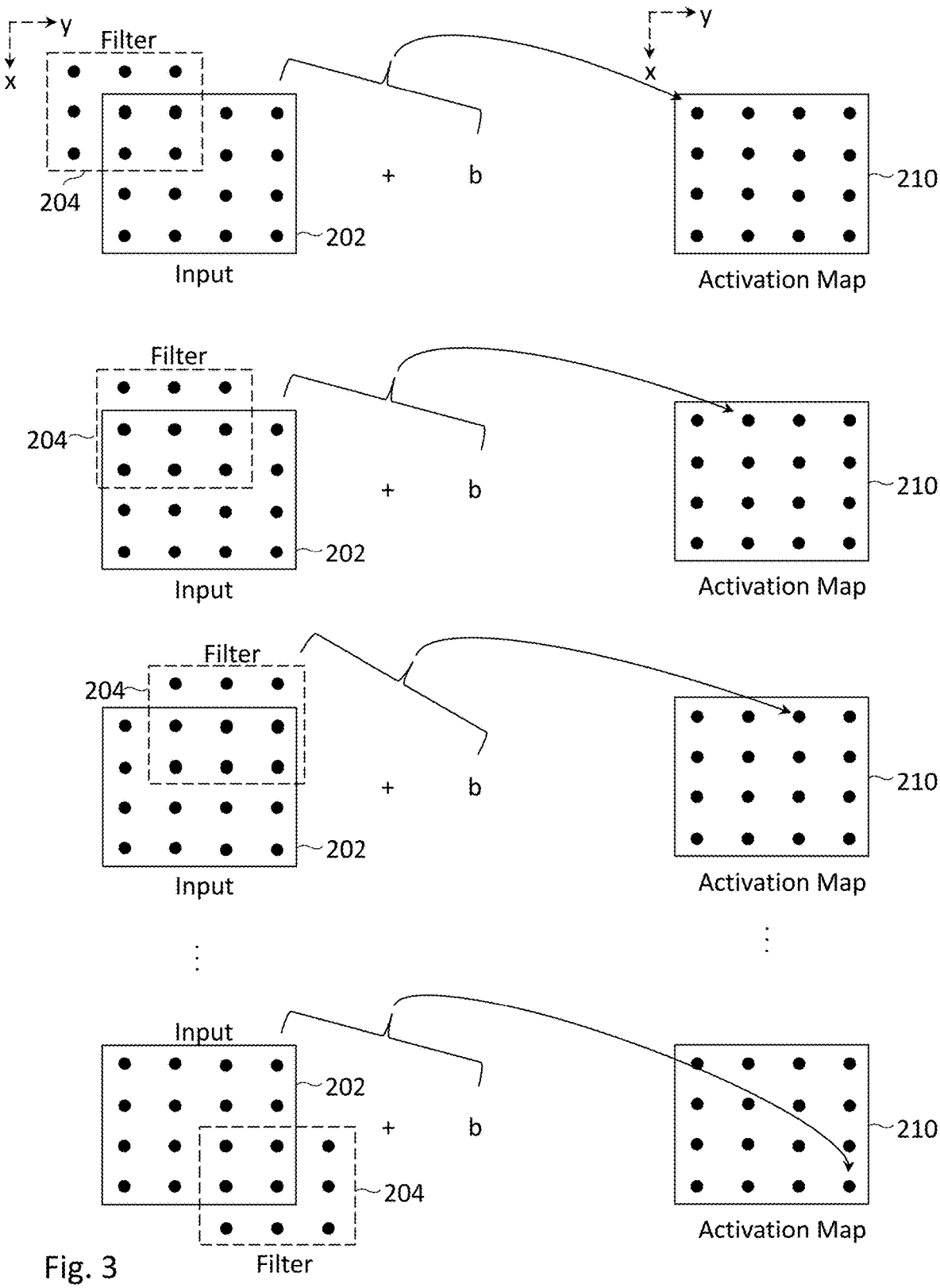
FIG. 3 depicts a diagram that explains the computation of a convolution operation using a 2-dimensional filter.

The first row of FIG. 3 describes the computation of the element at position (x=1, y=1) of activation map 210. As shown in the first row, the center of filter 204 is spatially aligned with the element at position (1, 1) of input 202. Such computation assumes the use of "zero padding" in which the input 202 is implicitly surrounded by a border of zeros. The advantage of using zero padding is that the dimensions of input 202 and output activation map 210 remain constant when using a 3×3 filter. A dot product is computed between filter 204 and the four values of input 202 that spatially align with filter 204. The dot product is then summed with bias b to arrive at the element at position (1, 1) of activation map 210.

The second row of FIG. 3 describes the computation of the element at position (1, 2) of activation map 210. As shown in the second row, the center of filter 204 is spatially aligned with the element at position (1, 2) of input 202. A dot product is computed between filter 204 and the six values of input 202 that spatially align with filter 204. The dot product is then summed with bias b to arrive at the element at position (1, 2) of activation map 210.

The third row of FIG. 3 describes the computation of the element at position (1, 3) of activation map 210. As shown in the third row, the center of filter 204 is spatially aligned with the element at position (1, 3) of input 202. A dot product is computed between filter 204 and the six values of input 202 that spatially align with filter 204. The dot product is then summed with bias b to arrive at the element at position (1, 3) of activation map 210.

The fourth row of FIG. 3 describes the computation of the element at position (4, 4) of activation map 210. As shown in the fourth row, the center of filter 204 is spatially aligned with the element at position (4, 4) of input 202. A dot product is computed between filter 204 and these four values of input 202 that spatially align with filter 204. The dot product is then summed with bias b to arrive at the element at position (4, 4) of activation map 210. In general, the convolution operation comprises a plurality of shift (or align), dot product and bias (or sum) steps. In the present example, the filter was shifted by 1 spatial position between dot product computations (called the step size or stride), but other step sizes of 2, 3, etc. are possible.

Figure 4:
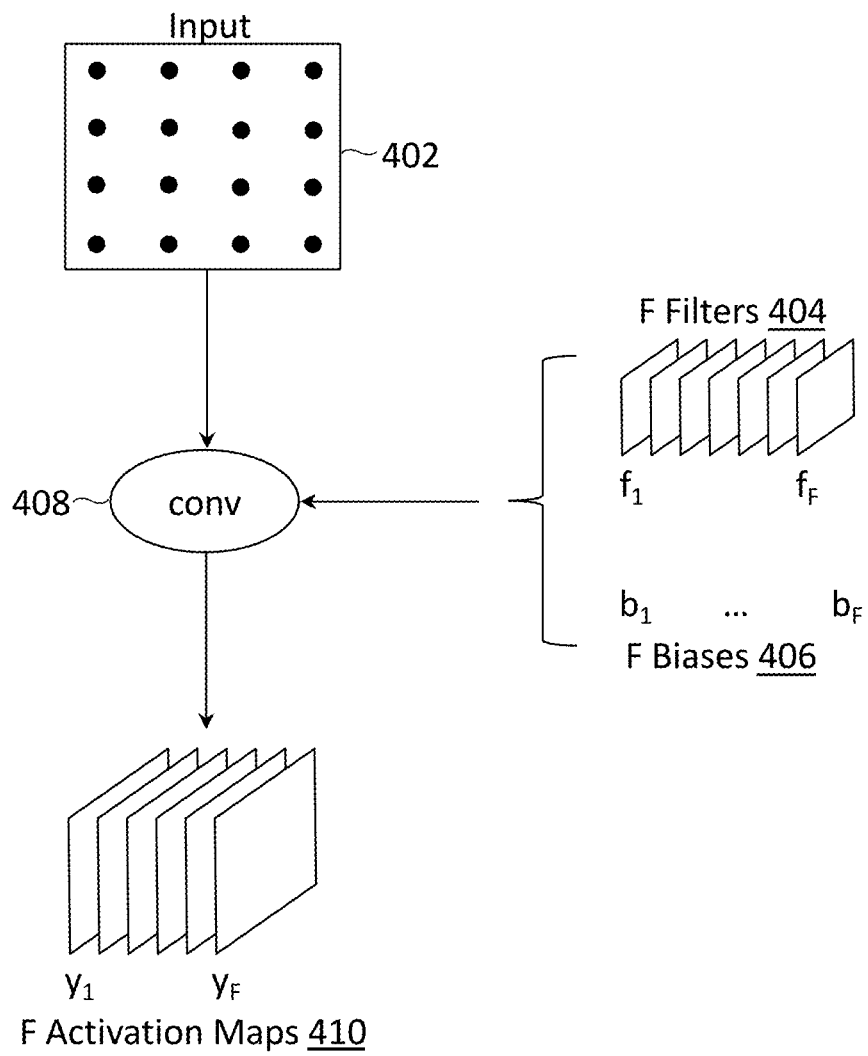
FIG. 4 depicts a diagram of the input, model parameters and output of a convolution operation, the model parameters including a plurality of 2-dimensional filters.

FIG. 4 is similar to FIG. 2, except that there are F filters 404, F biases 406 and F activation maps 410 instead of a single filter 204, a single bias 206 and a single activation map 210. The relation between the F filters 404, F biases 406 and F activation maps 410 is as follows: Filter $f_1$, bias $b_1$ and input 402 are used by the convolution operator 408 to compute activation map $y_1$ (in very much the same way that filter 204, bias 206 and input 202 were used by the convolution operator 208 to compute activation map 210 in FIG. 2); filter $f_2$, bias $b_2$ and input 402 are used by the convolution operator 408 to compute activation map $y_2$; and so on.

Figure 5:
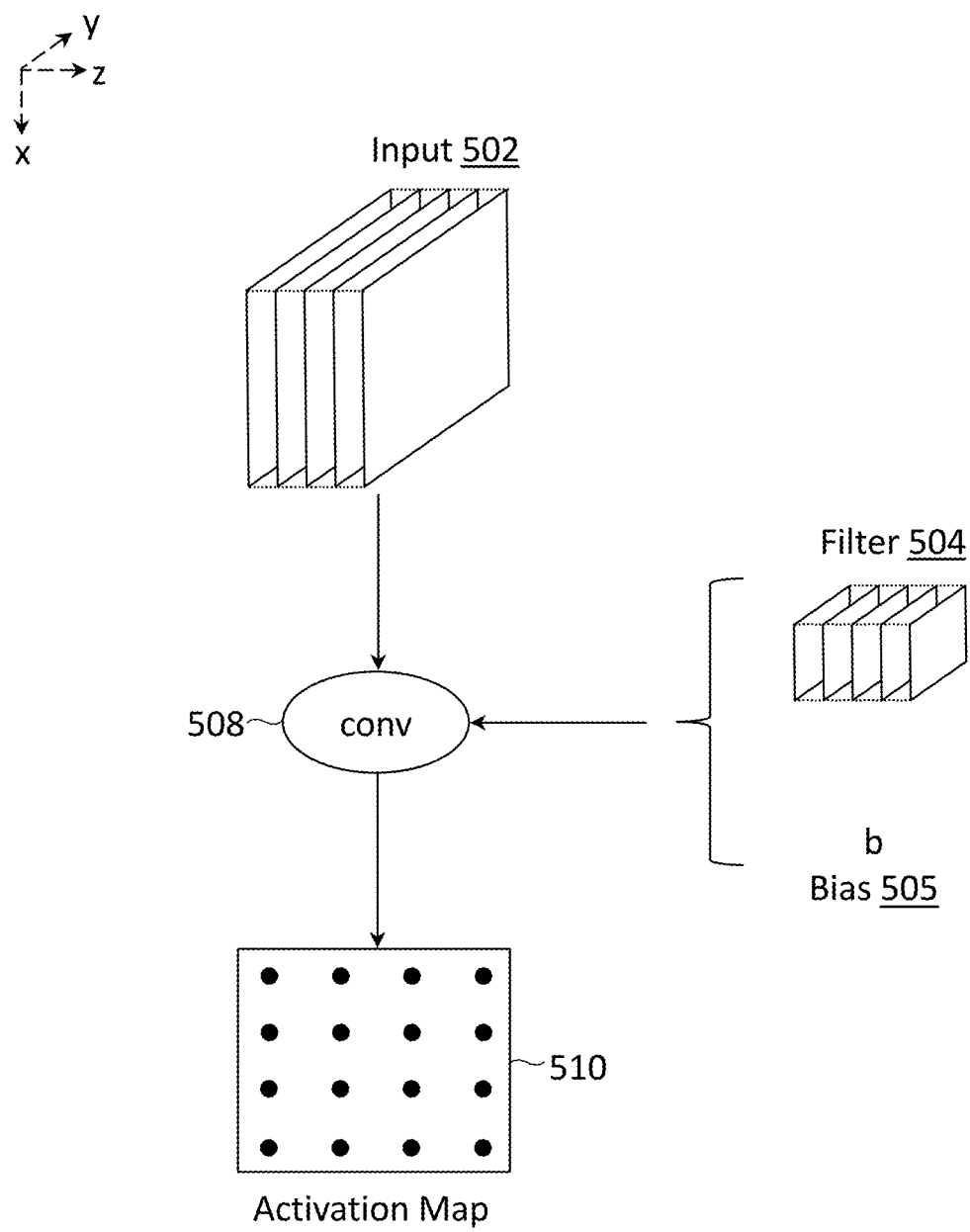
FIG. 5 depicts a diagram of the input, model parameters and output of a convolution operation, the model parameters including a single 3-dimensional filter.

FIG. 5 is similar to FIG. 2, except that instead of a 2-dimensional input 202 and a 2-dimensional filter 204, a 3-dimensional input 502 and a 3-dimensional filter 504 are used. The computations by the convolution operator 508 to arrive at activation map 510 are described in more detail below in FIG. 6. While input 502 and filter 504 are 3-dimensional, activation map 510 is 2-dimensional, as will become clearer in the associated description of FIG. 6. Each "slice" of filter 504 (analogous to a "channel" of input 502) may be called a kernel. In FIG. 5, filter 504 is composed of five kernels, and input 502 is composed of five channels. If not already apparent, the number of kernels of filter 504 (or the size of the "z" dimension of filter 504) must match the number of channels of input 502 (or the size of the "z" dimension of input 502). During a convolution operation, channel 1 of input 502 aligns with kernel 1 of filter 504; channel 2 of input 502 aligns with kernel 2 of filter 504; and so on. Typically, there is no translation of filter 504 with respect to input 502 in the z-dimension during a convolution operation.

Figure 6:
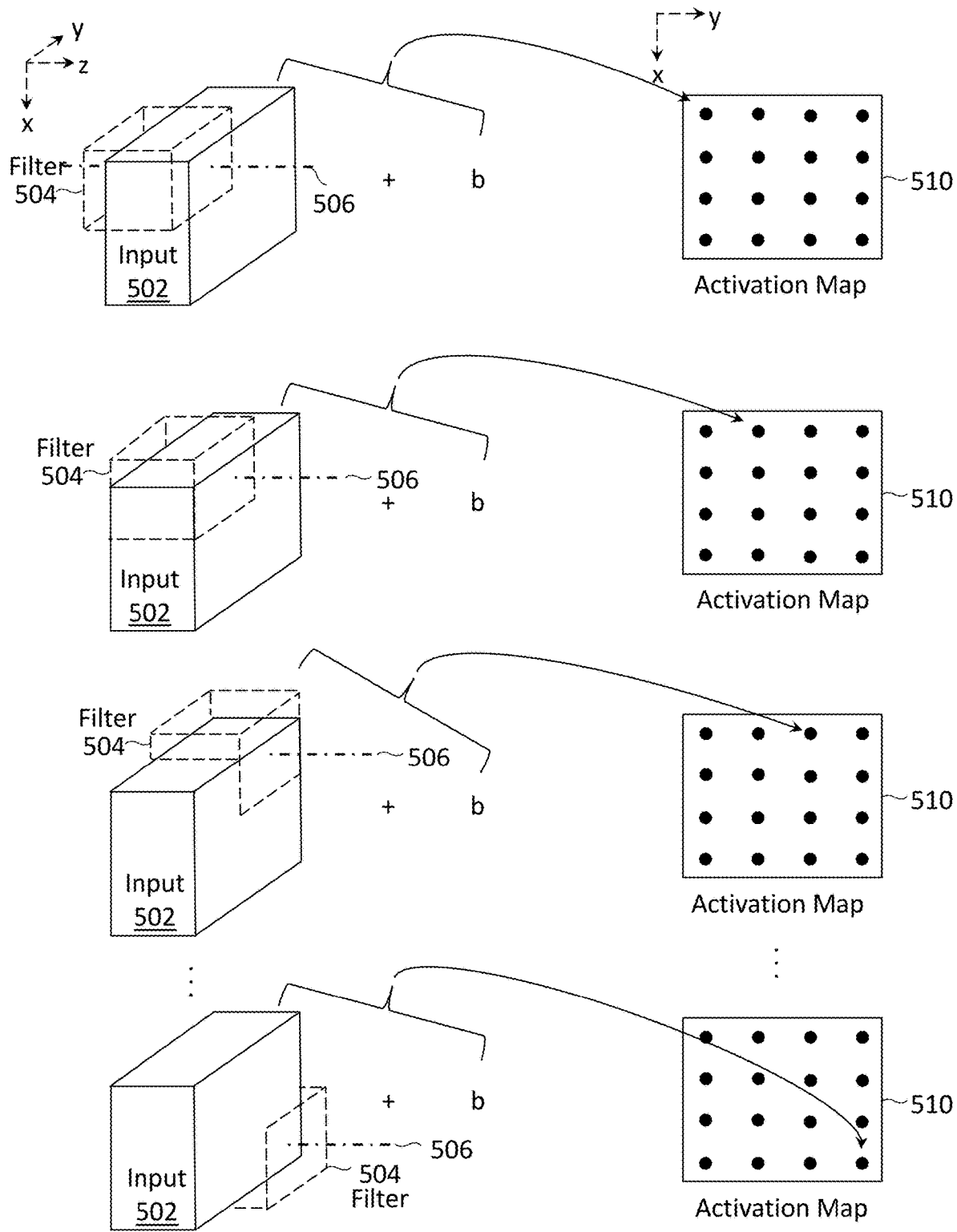
FIG. 6 depicts a diagram that explains the computation of a convolution operation using a 3-dimensional filter.

The first row of FIG. 6 describes the computation of the element at position (x=1, y=1) of activation map 510. As shown in the first row, the central axis 506 of filter 504 (with central axis drawn parallel to the z-axis) is aligned with the elements at positions (1, 1, z) for $z \in \{1, \ldots, 5\}$ of input 502. A dot product is computed between filter 504 and the twenty values of input 502 that spatially align with filter 504 (4 aligned values per channel ×5 channels). The dot product is then summed with bias b to arrive at the element at position (1, 1) of activation map 510.

The second row of FIG. 6 describes the computation of the element at position (1, 2) of activation map 510. As shown in second first row, the central axis 506 of filter 504 is aligned with the elements at positions (1, 2, z) for $z \in \{1, \ldots, 5\}$ of input 502. A dot product is computed between filter 504 and the thirty values of input 502 that spatially align with filter 504 (6 aligned values per channel×5 channels). The dot product is then summed with bias b to arrive at the element at position (1, 2) of activation map 510.

The third row of FIG. 6 describes the computation of the element at position (1,3) of activation map 510. As shown in the third row, the central axis 506 of filter 504 is aligned with the elements at positions (1, 3, z) for $z \in \{1, \ldots, 5\}$ of input 502. A dot product is computed between filter 504 and the thirty values of input 502 that spatially align with filter 504 (6 aligned values per channel×5 channels). The dot product is then summed with bias b to arrive at the element at position (1, 3) of activation map 510.

The fourth row of FIG. 6 describes the computation of the element at position (4, 4) of activation map 510. As shown in the fourth row, the central axis 506 of filter 504 is aligned with the elements at positions (4, 4, z) for $z \in \{1, \ldots, 5\}$ of input 502. A dot product is computed between filter 504 and the twenty values of input 502 that spatially align with filter 504 (4, 4) aligned values per channel×5 channels). The dot product is then summed with bias b to arrive at the element at position (4, 4) of activation map 510.

Figure 7:
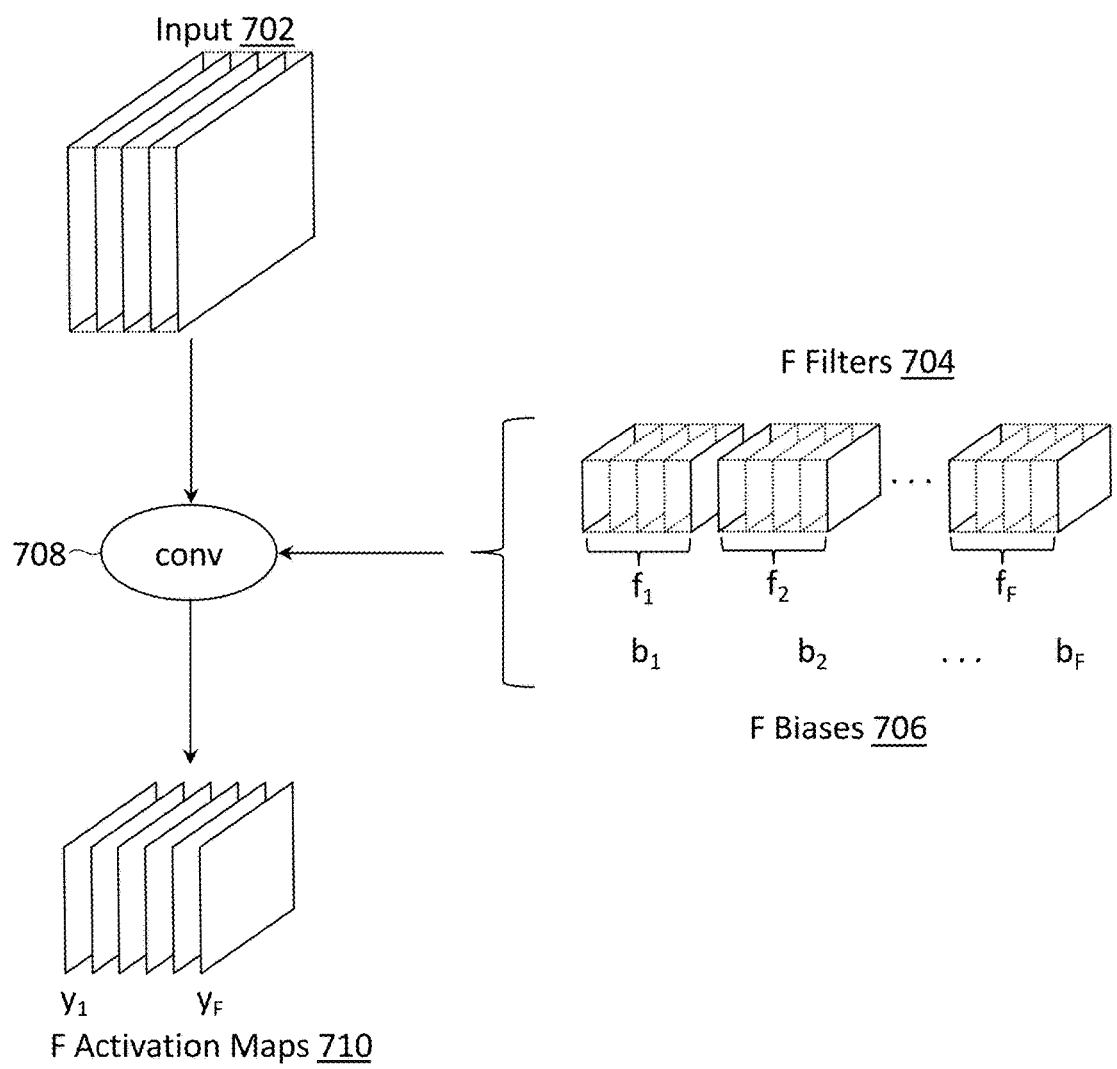
FIG. 7 depicts a diagram of the input, model parameters and output of a convolution operation, the model parameters including a plurality of 3-dimensional filters.

FIG. 7 is similar to FIG. 5, except that there are F 3-dimensional filters 704, F biases 706 and F activation maps 710 (F>1), instead of a single 3-dimensional filter 504, a single bias b 505 and a single activation map 510. The relation between the F 3-dimensional filters 704, F biases 706 and F activation maps 710 is as follows: Filter $f_1$, bias $b_1$ and input 702 are used to compute activation map $y_1$ (in very much the same way that filter 504, bias b 505 and input 502 were used to compute activation map 510 in FIG. 5); filter $f_2$, bias $b_2$ and input 702 are used to compute activation map $y_2$; and so on. More generally, in an n-dimensional space, the above-described dot product can be generalized as the dot product of two n-dimensional tensors.

The following figures describe a hardware architecture to perform the convolution operation of FIG. 7. Many of the examples assume the use of two filters, F=2, for simplicity. The examples further assume that the filters 704 are constructed using 3×3 kernels (i.e., each kernel being composed of 9 weights). It is understood, however, that the concepts/ architectures described herein can be modified to accommodate kernels with other dimensions.

Figure 8:
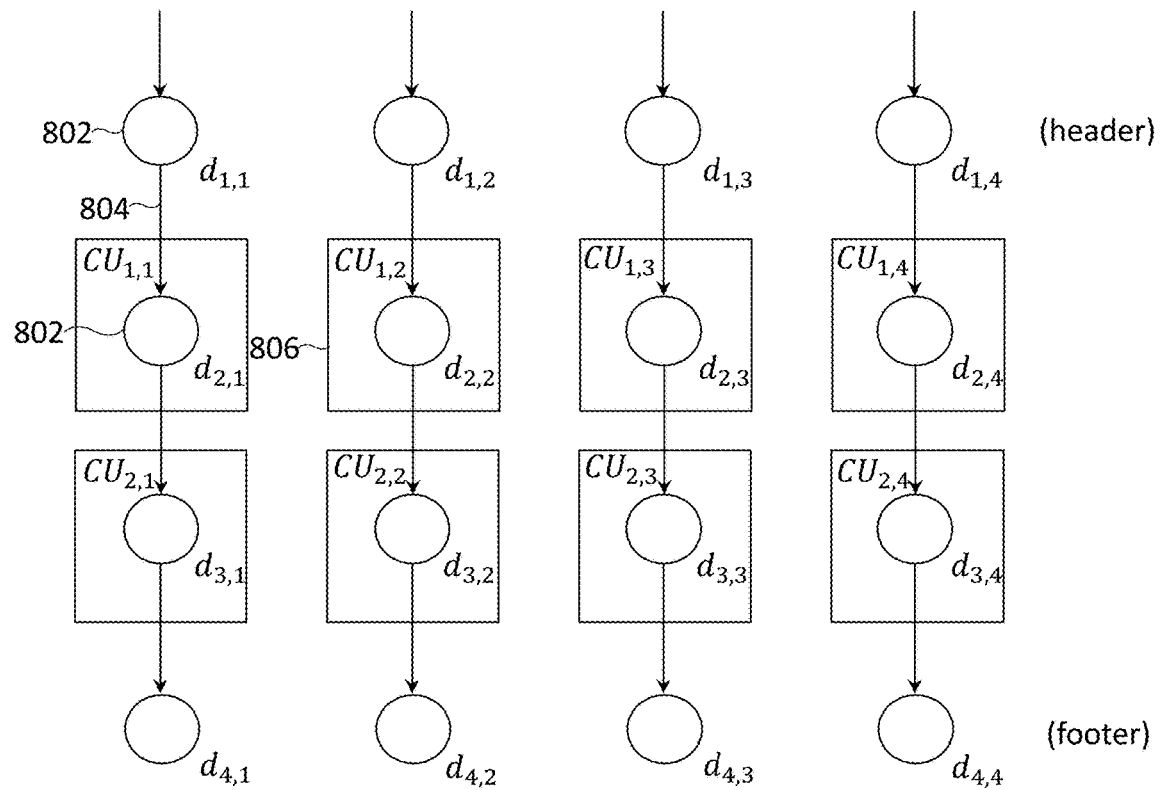
FIG. 8 depicts a convolutional engine including a 2-D shift register and an array of convolver units, in accordance with one embodiment of the invention.

FIG. 8 depicts convolutional engine 708, in accordance with one embodiment of the invention. Convolutional engine 708 (depicted in FIG. 8) is a hardware architecture of the convolution operator ("conv") 708 (depicted in FIG. 7). Convolutional engine 708 may include a 2-D shift register with an array of input data storage elements:

$$\begin{bmatrix} d_{1,1} & d_{1,2} & d_{1,3} & d_{1,4} \\ d_{2,1} & d_{2,2} & d_{2,3} & d_{2,4} \\ d_{3,1} & d_{3,2} & d_{3,3} & d_{3,4} \\ d_{4,1} & d_{4,2} & d_{4,3} & d_{4,4} \end{bmatrix}$$

In the simplified example of FIG. 8, the array is a four by four array. Each of the input data storage elements may be formed by a plurality of D flip-flops (i.e., one D flip-flop to store each bit of a data signal). Therefore, if input data storage element $d_{1,1}$ were to store eight bits, $d_{1,1}$ may be formed from eight D flip-flops. Each of the arrows between pairs of input data storage elements represents an electrical connection (i.e., may be implemented as a wire). For example, input data storage element $d_{1,1}$ (ref. num. 802) may be electrically coupled to storage element $d_{2,1}$ (ref. num. 802) via electrical connection 804. Further, the arrow may represent a one-directional flow of data (i.e., data being transmitted from input data storage element $d_{1,1}$ to input data storage element $d_{2,1}$, but not from $d_{2,1}$ to input data storage element $d_{1,1}$). In the discussion that follows, the first row of input data storage elements may be called a "header", and the last row of input data storage elements may be called a "footer."

Convolutional engine 708 may further include an array of convolver units:

$$\begin{bmatrix} CU_{1,1} & CU_{1,2} & CU_{1,3} & CU_{1,4} \\ CU_{2,1} & CU_{2,2} & CU_{2,3} & CU_{2,4} \end{bmatrix}$$

For conciseness, an array of convolver units may be called "a convolver array." In the simplified example of FIG. 8, the convolver array is a two by four array. Convolver unit $CU_{1,2}$ has been labeled with reference numeral 806 (to facilitate later discussion). It is understood that a more typical embodiment will contain many more convolver units, such as in the example embodiment of FIG. 30. The operation of the 2-D shift register and the operation of the convolver units will be described in detail in the following figures.

Figure 9A:
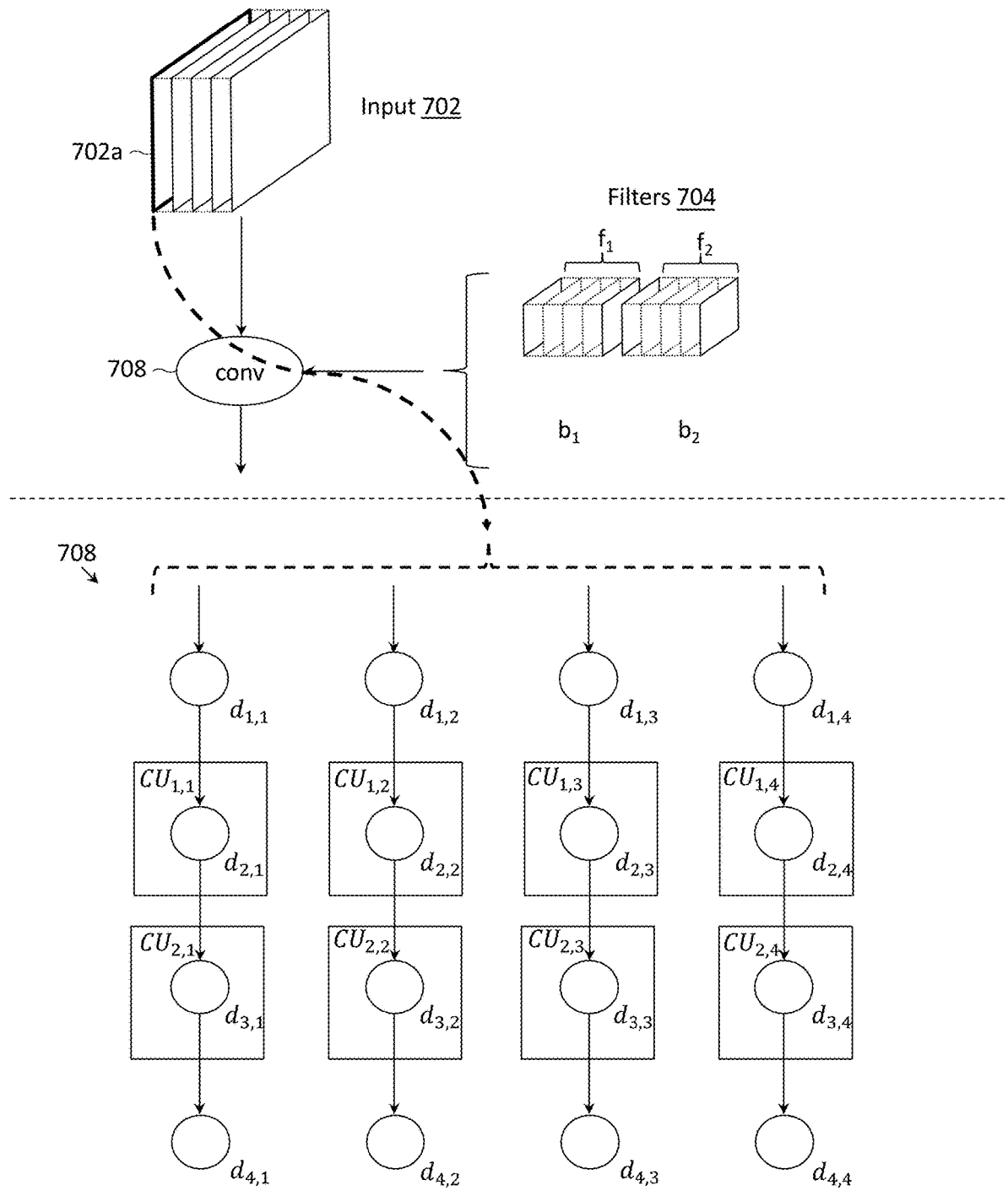
FIG. 9A and FIG. 9B depict the loading of data values into the convolutional engine, in accordance with one embodiment of the invention.

FIG. 9A depicts the loading of data values into convolutional engine 708, in accordance with one embodiment of the invention. Each channel of input may be loaded into convolutional engine 708 in a serial fashion. FIG. 9A depicts the loading of the first channel 702a of input 702 into convolutional engine 708 (assuming that the channels are numbered from 1 to 5 in the left to right direction). As will be described in FIGS. 10B-10D, the rows of a particular channel may be loaded into convolutional engine 708 in a serial fashion. It is noted that terms such as a "row" and a "column" will be/are being used for convenience and with respect to how elements are depicted in the figures. Nevertheless, the meaning of such terms may or may not translate into how circuit elements are laid out on a chip, where a row could be interpreted as a column and vice versa, depending on the viewer's orientation with respect to the chip.

Figure 9B:
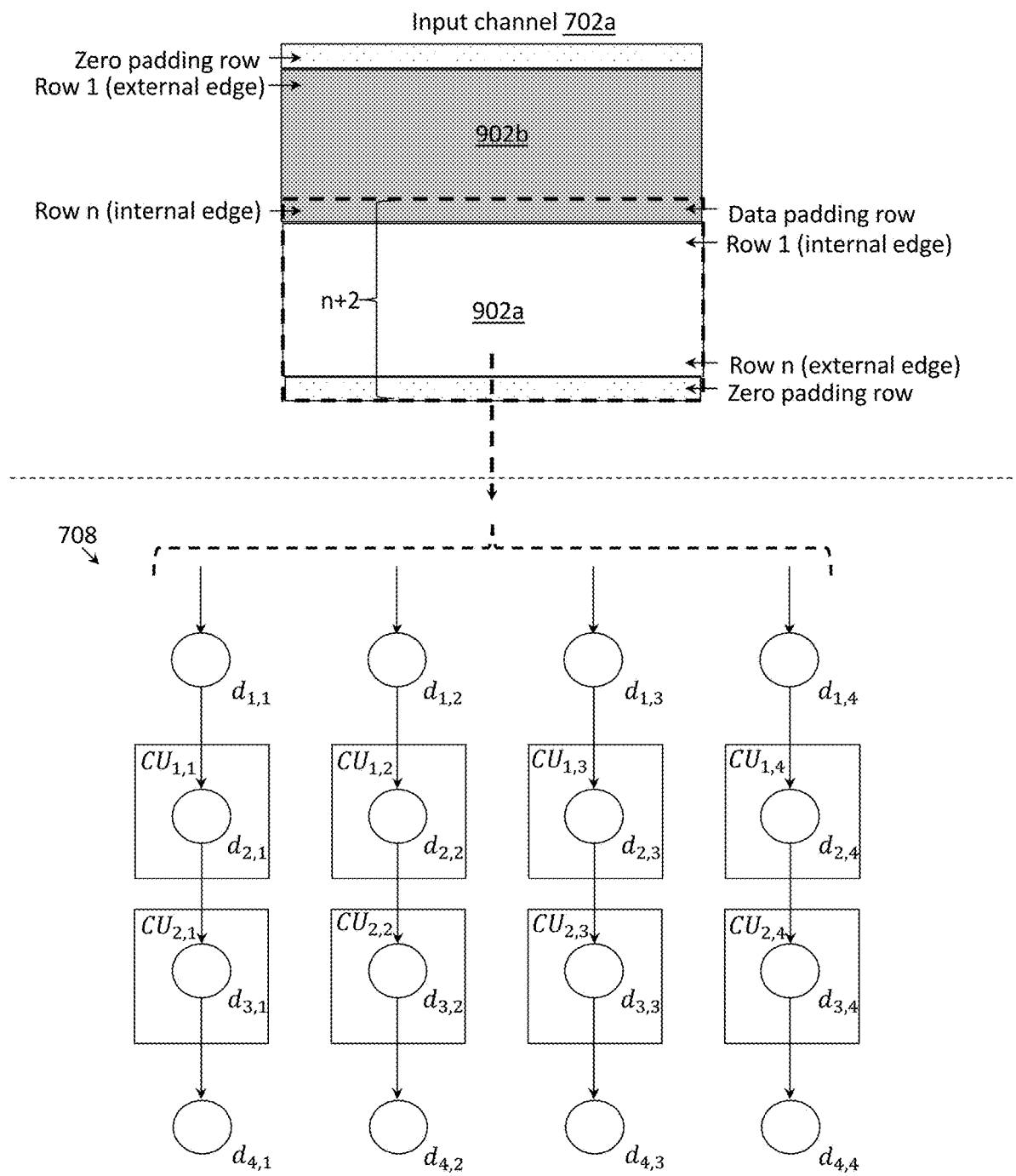

For simplicity, this first example describing the hardware architecture of a convolutional engine will handle the case in which the number of columns of an input channel is equal to the number of columns of the convolver array. In FIG. 9B, the number of columns of input channel 702a is assumed to equal the number of columns of the convolver array. For instance, input channel 702a may be a ten by four matrix of data values. FIGS. 27A-27C describe how to handle the scenario in which the number of columns of an input channel is greater than the number of columns of the convolver array. FIGS. 28, 29A and 29B describe two schemes for handling the case in which the number of columns of an input channel is less than the number of columns of the convolver array.

Typically, due to memory constraints of each convolver unit, convolutional engine 708 can only compute the convolution operation for a certain number of contiguous rows of the data values before the output needs to be saved (copied to a memory location separate from the convolver units—see memory 3002 in FIG. 30). Once the output is saved, the convolutional engine 708 can continue onto the next set of contiguous rows. In particular, if each convolver unit is constructed with n output data storage elements, convolution engine 708 can compute the output of n contiguous input rows (plus two padding rows explained below). For simplicity of explanation, n contiguous input rows will be called a "horizontal stripe" of data. In the simplified example of FIG. 9B, there are two horizontal stripes 902a, 902b (while it is understood that in practice there could be any number of horizontal stripes). Due to the memory constraint of the convolver units, the convolutional engine 708 may process the horizontal stripes serially. In the example of FIG. 9B, horizontal stripe 902a is processed first, followed by horizontal stripe 902b.

For reasons that will be more apparent below, the loading of a leading row (i.e., first row of a horizontal stripe to be loaded) that is an external edge may be preceded by the loading of a zero padding row (as in row n of horizontal stripe 902a); the loading of a trailing row (i.e., last row of a horizontal stripe to be loaded) that is an external edge may be followed by the loading of a zero padding row (as in row 1 of horizontal stripe 902b); the loading of a leading row that is an internal edge may be preceded by the loading of a data padding row (as in row n of horizontal stripe 902b); and the loading of a trailing row that is an internal edge may be followed by the loading of a data padding row (as in row 1 of horizontal stripe 902a). If not already apparent, an "external edge" refers to a leading or trailing row of a horizontal stripe that forms an external boundary of an input channel, whereas an internal edge refers to a leading or trailing row of a horizontal stripe that is not part of an external boundary of an input channel. The reason for the zero or data padding row is tied to the 3×3 filter requiring data from a row above and a row below the row of interest to compute the convolution output. For a 5×5 filter, two padding rows (for the top row of a stripe) and two padding rows (for the bottom row of a stripe) or a total of four padding rows would have been needed.

In the particular example of FIG. 9B, the n+2 rows within the bolded and dashed rectangle are loaded into convolutional engine 708. The n+2 rows include a zero padding row, n rows of horizontal stripe 902a and a data padding row (equivalent to row n of horizontal stripe 902b).

Figure 9C:
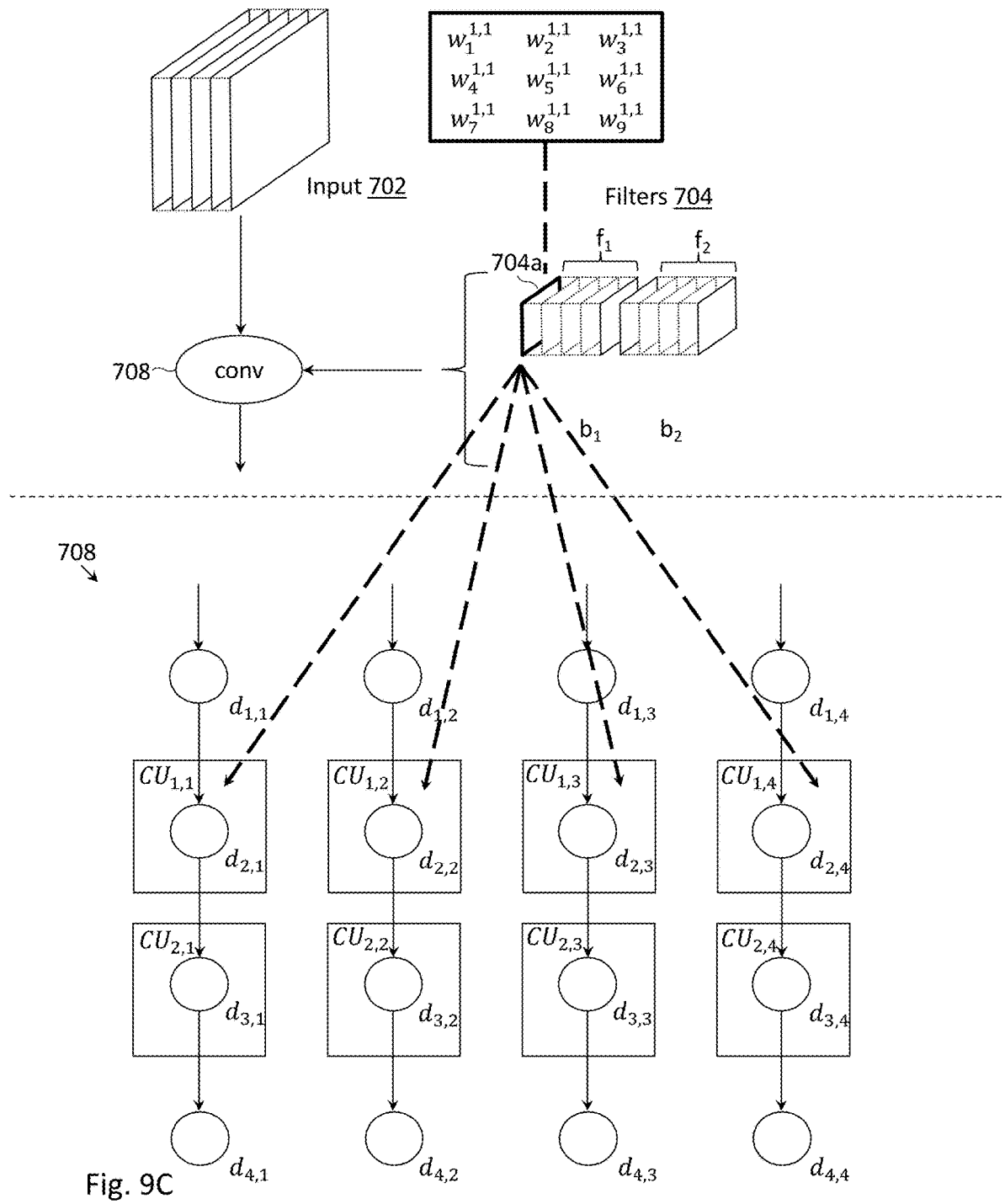
FIG. 9C and FIG. 9D depict the loading of filter weights into the convolutional engine, in accordance with one embodiment of the invention.
Figure 9D:
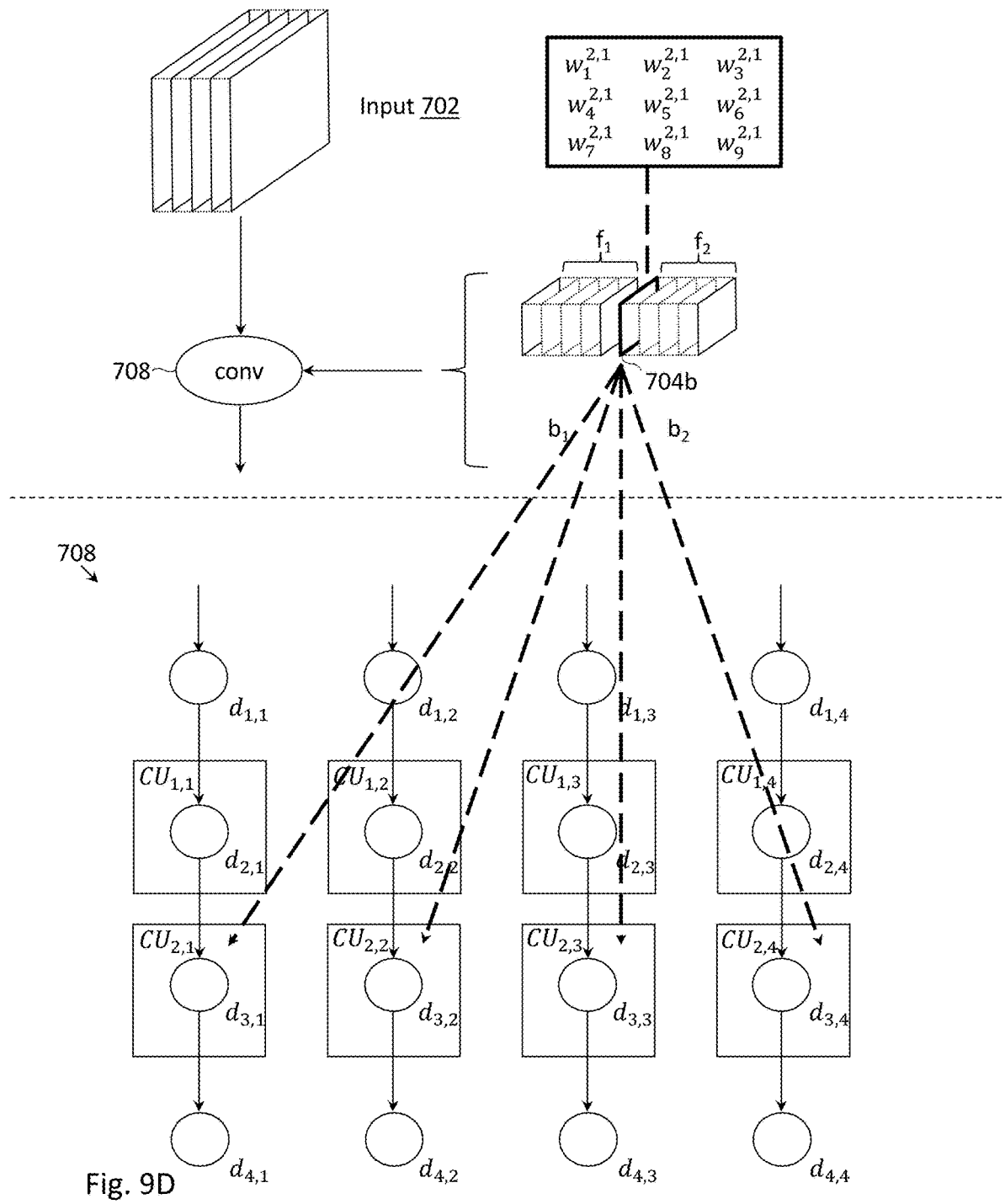

FIGS. 9C-9D depict the loading of filter weights to convolutional engine 708, in accordance with one embodiment of the invention. More specifically, FIG. 9C depicts the loading of the nine weights of kernel 704a into each of the convolver units of the first row of the convolver array (i.e., $CU_{1,1}$, $CU_{1,2}$, $CU_{1,3}$ and $CU_{1,4}$), and FIG. 9D depicts the loading of the nine weights of kernel 704b into each of the convolver units of the second row of the convolver array (i.e., $CU_{2,1}$, $CU_{2,2}$, $CU_{2,3}$ and $CU_{2,4}$). Kernel 704a is the first kernel of filter $f_1$, and each of its weights is labeled with the superscript "1,1", which is shorthand for (filter $f_1$, kernel 1). Kernel 704b is the first kernel of filter $f_2$, and each of its weights is labeled with the superscript "2,1", which is shorthand for (filter $f_2$, kernel 1).

Figure 10A:
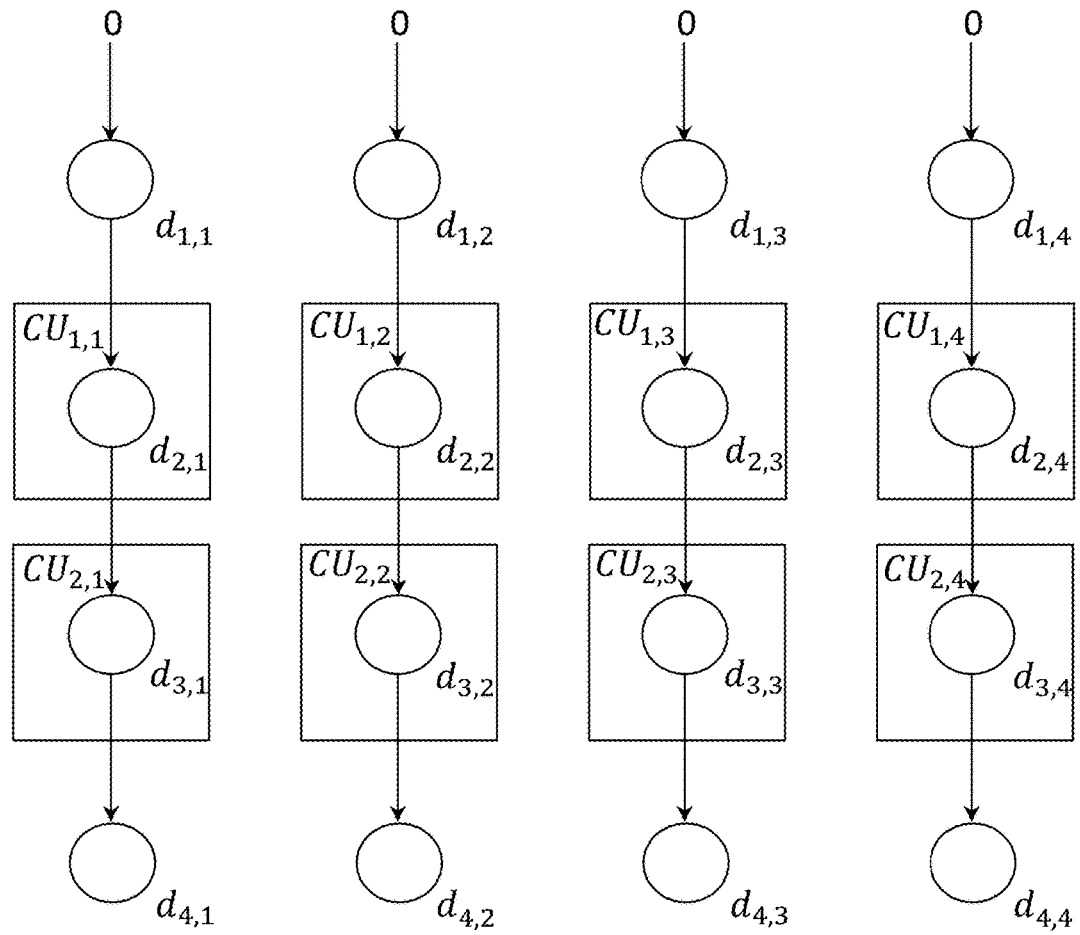
FIG. 10A and FIG. 10B depict the loading of a zero padding row into the 2-D shift register, in accordance with one embodiment of the invention.
Figure 10B:
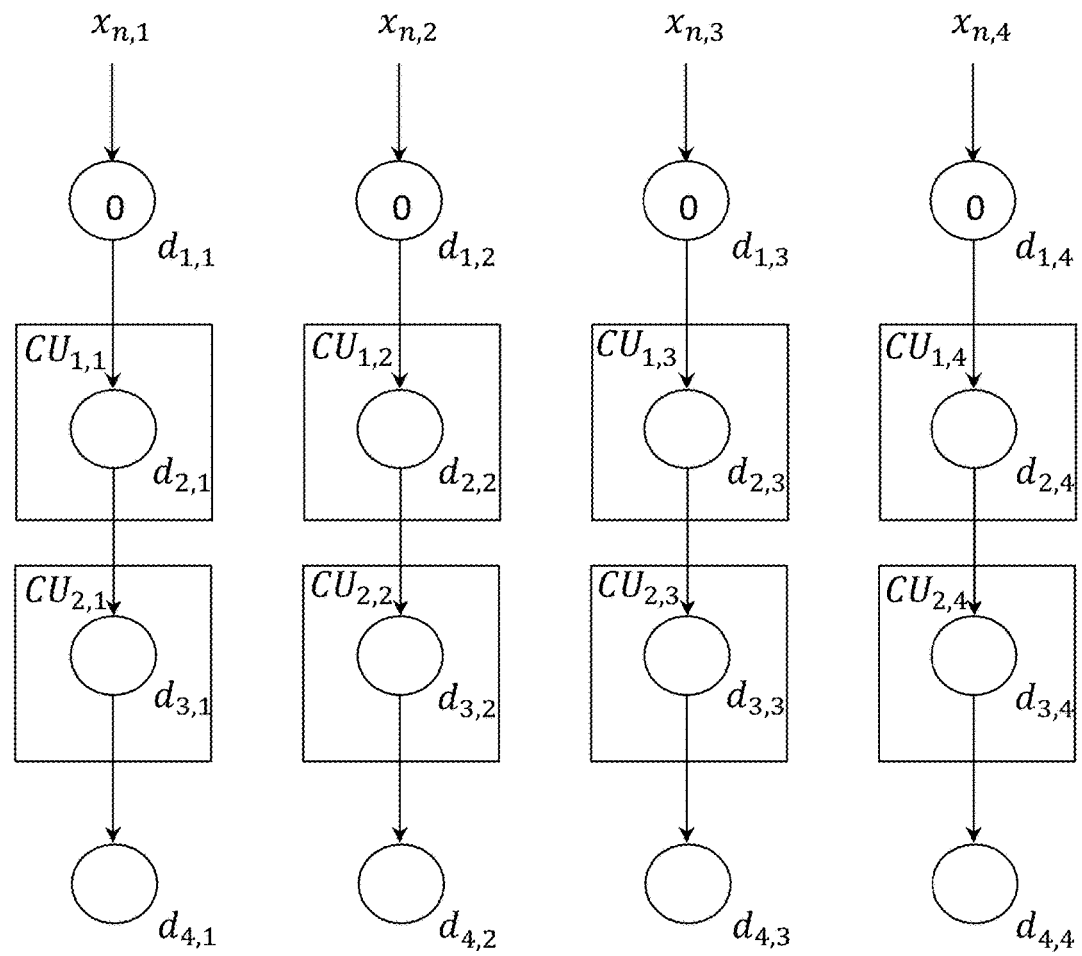
Figure 10C:
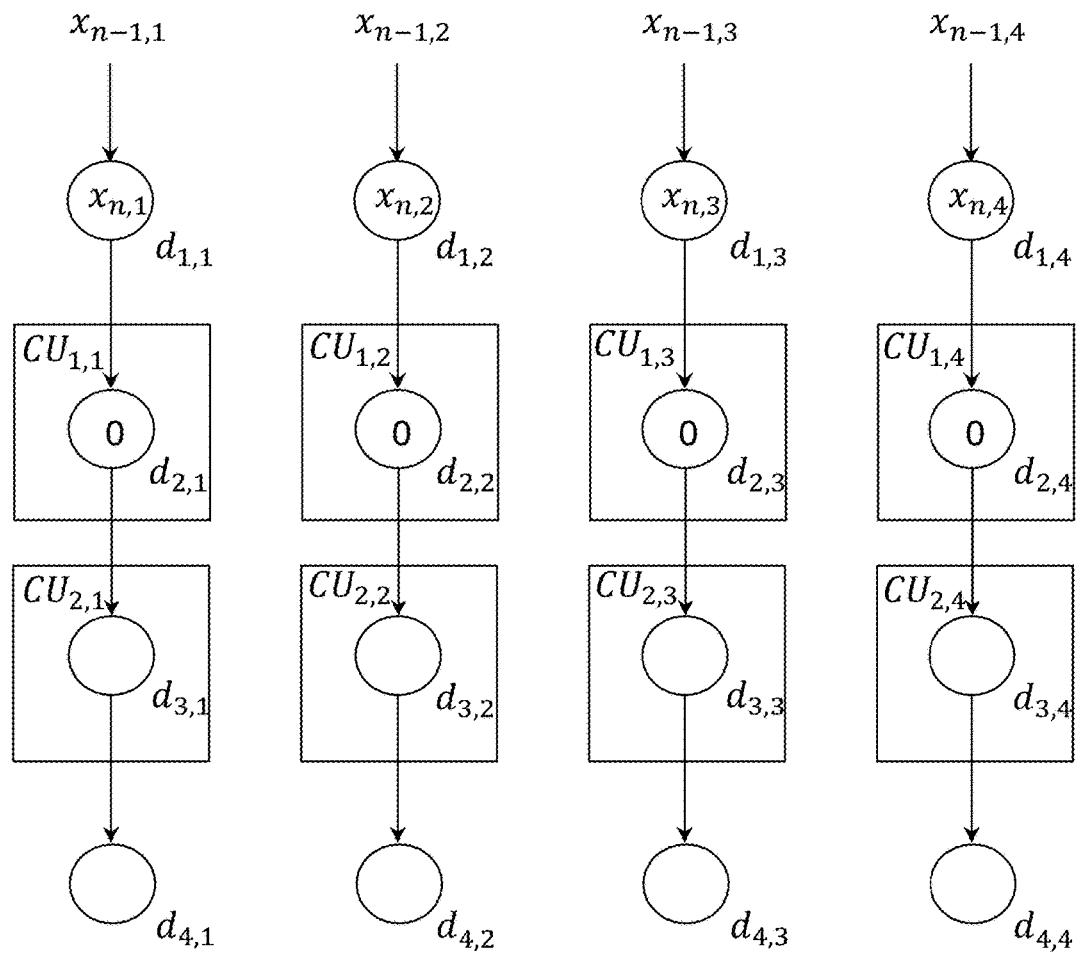
Figure 10D:
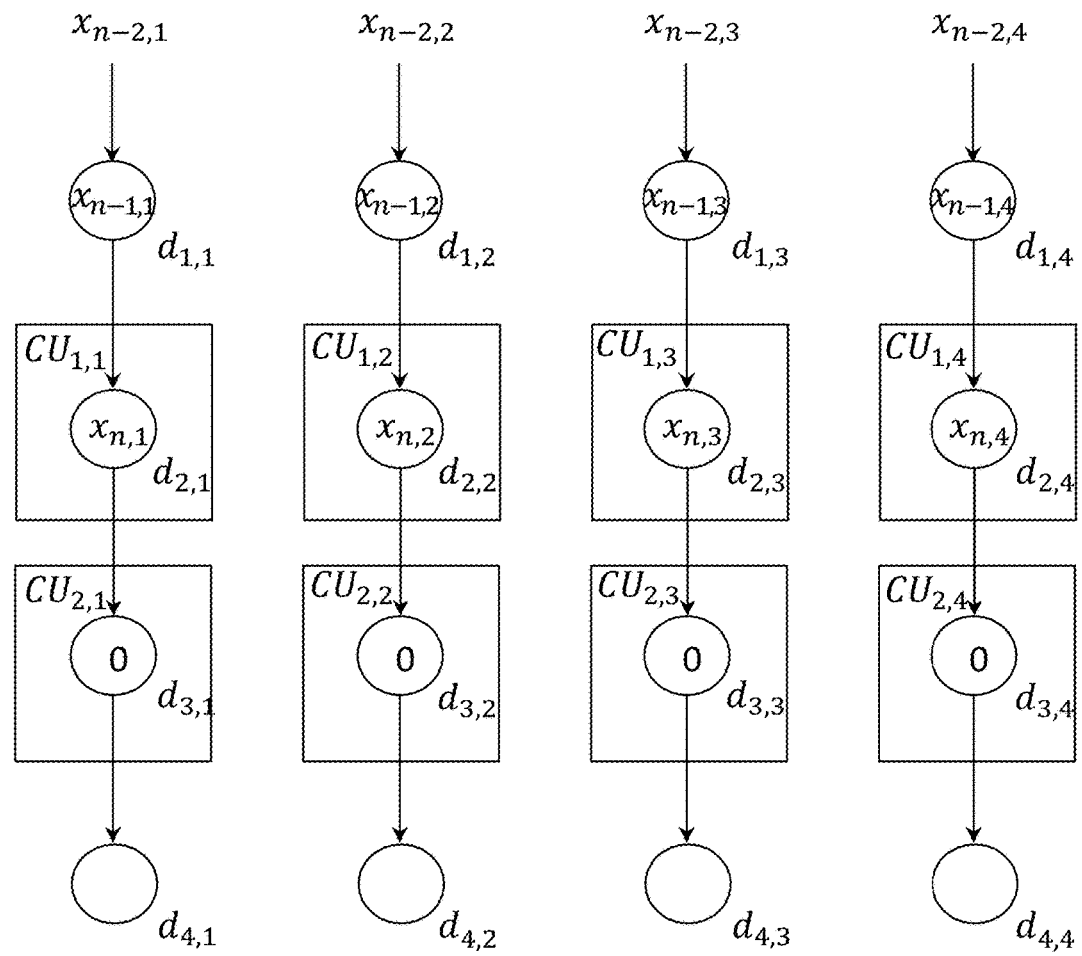

FIGS. 10A-10B depict the loading of a row of zero values into the 2-D shift register. FIGS. 10B-10D depict a row-by-row loading of data values from the first input channel 702a into the 2-D shift register and a row-to-row shifting of the data values through the 2-D shift register. Data values $x_{n,1}$, $x_{n,2}$, $x_{n,3}$ and $x_{n,4}$ may represent values from row n of horizontal stripe 902a of input channel 702a. Data values $x_{n-1,1}$, $x_{n-1,2}$, $x_{n-1,3}$ and $x_{n-1,4}$ may represent values from row n−1 of horizontal stripe 902a of input channel 702a. Data values $x_{n-2,1}$, $x_{n-2,2}$, $x_{n-2,3}$ and $x_{n-2,4}$ may represent values from row n−2 of horizontal stripe 902a of input channel 702a.

Upon row n of horizontal stripe 902a being loaded into the second row of input data storage elements (i.e., $d_{2,1}$, $d_{2,2}$, $d_{2,3}$ and $d_{2,4}$), the first row of convolver units (i.e., $CU_{1,1}$, $CU_{1,2}$, $CU_{1,3}$ and $CU_{1,4}$) corresponding to the second row of input data storage elements may be activated. By "corresponding", it is meant that there is a logical correspondence between convolver unit $CU_{1,1}$ and input data storage element $d_{2,1}$, convolver unit $CU_{1,2}$ and input data storage element $d_{2,2}$, and so on. The correspondences between the input data storage element and convolver units are shown in the figures by the input data storage element being drawn within the corresponding convolver unit. In a more typical embodiment with a high number of convolver units, most of the convolver units will receive data values from its corresponding input data storage element and eight spatial neighbors (i.e., input data storage element neighbors) of the corresponding input data storage element. Such relationship is more difficult to appreciate from the example convolutional engine of FIG. 11A in which there is a small number of convolver units.

Figure 11A:
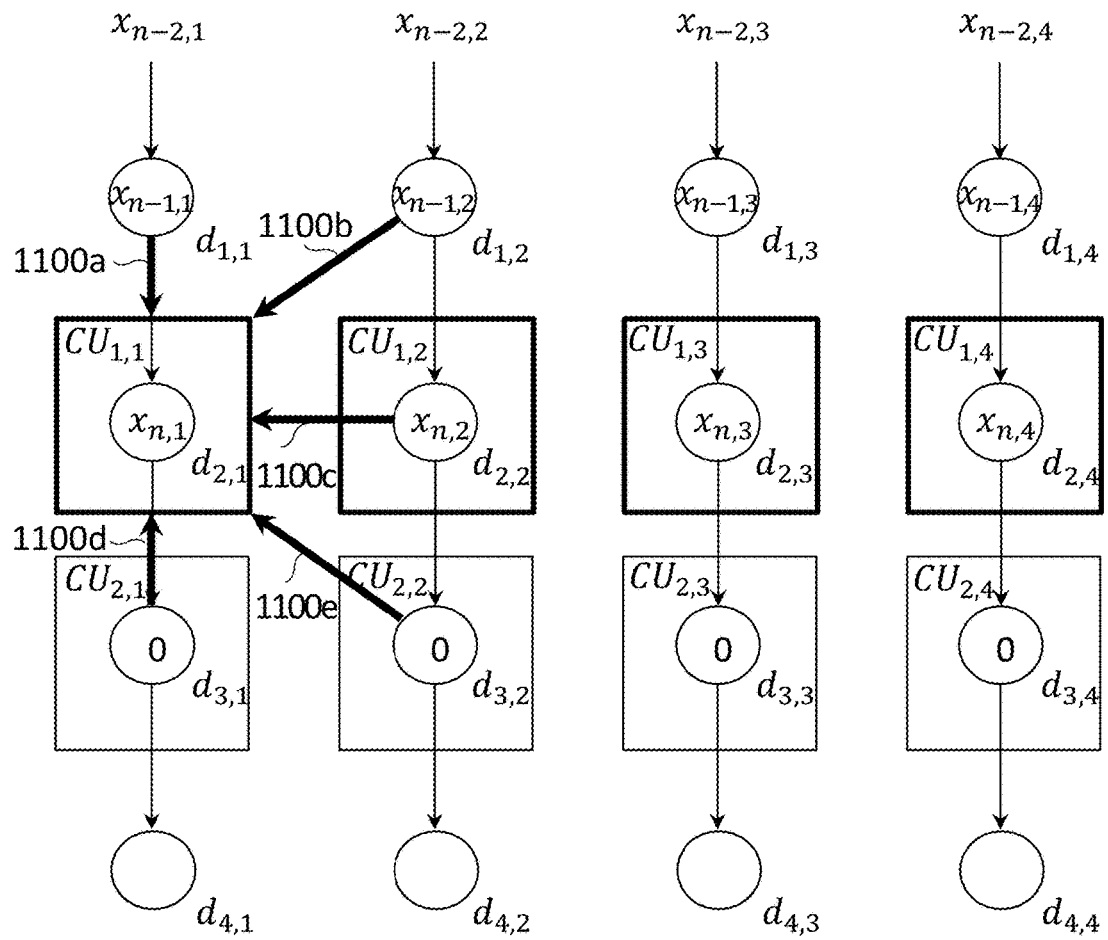
FIG. 11A and FIG. 11B describe the processing of two convolver units for the spatial orientation of the data values depicted in FIG. 10D, in accordance with one embodiment of the invention.
Figure 11A:
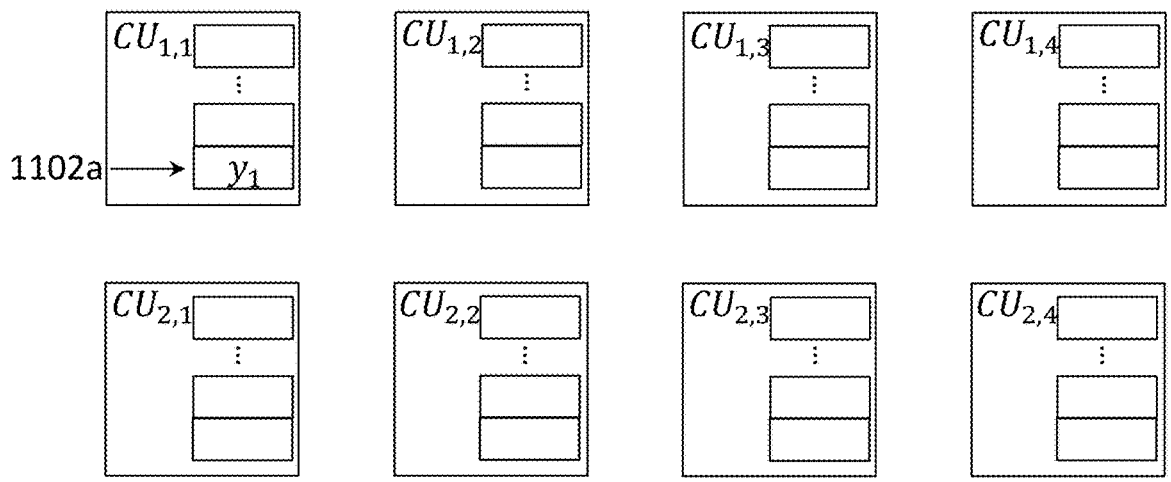

Active convolver units are drawn in FIG. 11A in bolded lines while non-active convolver units are drawn in FIG. 11A using non-bolded lines. In one embodiment, "active" means that a convolver unit is powered on, whereas "non-active" means that a convolver unit is powered off to save power. A controller (not depicted) may be responsible for powering on and off convolver units. The controller may power on a row of convolver units once the data from row n of a horizontal stripe has been loaded into the input data storage elements corresponding to the row of convolver units. The controller may power off a row of convolver units once data from row 1 of a horizontal stripe has been transferred out of the input data storage elements corresponding to the row of convolver units.

Figure 11B:
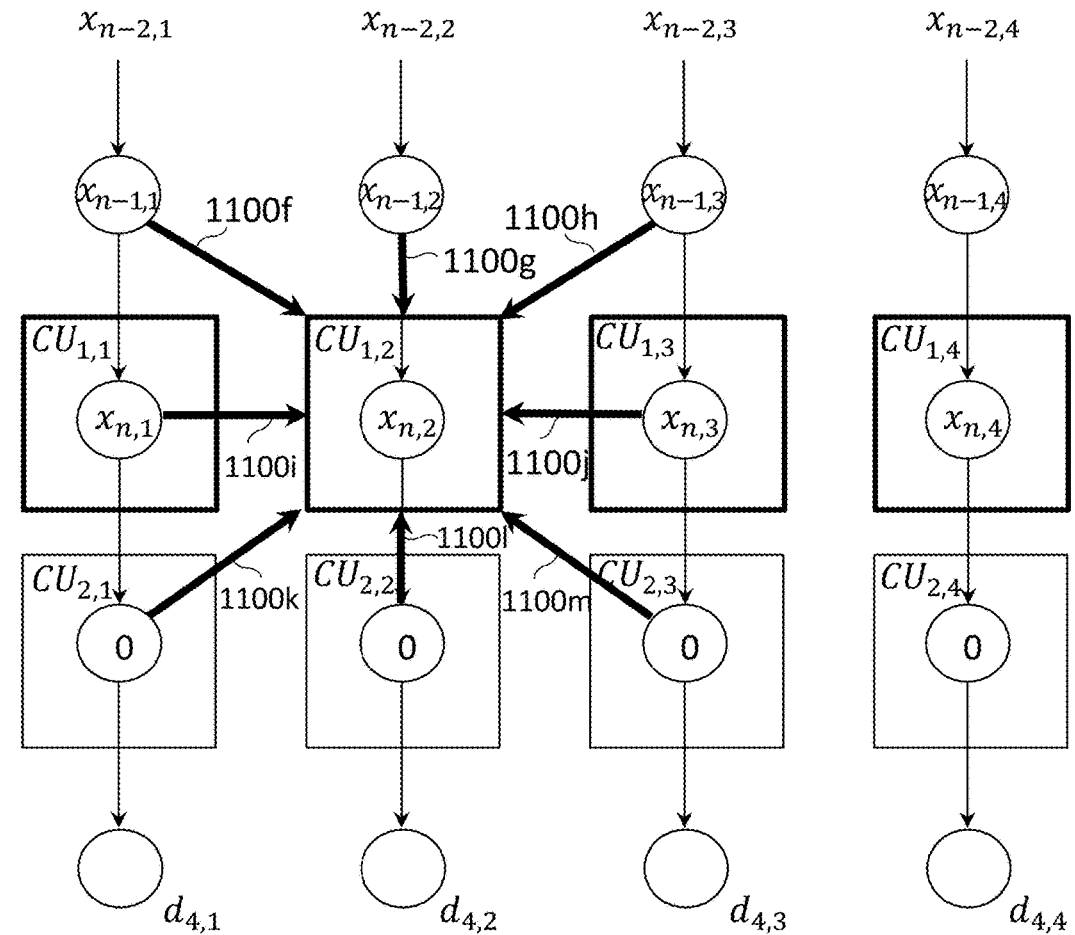
Figure 11B:
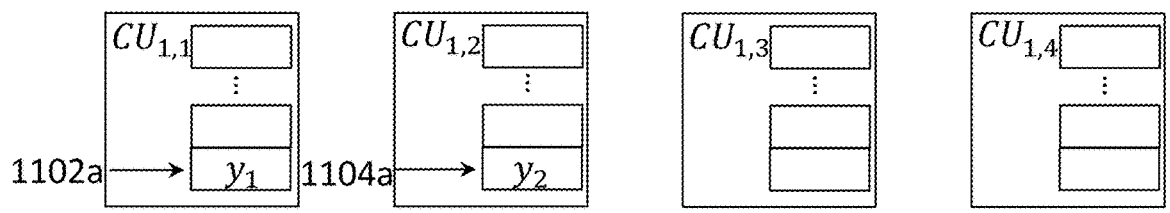
Figure 11B:
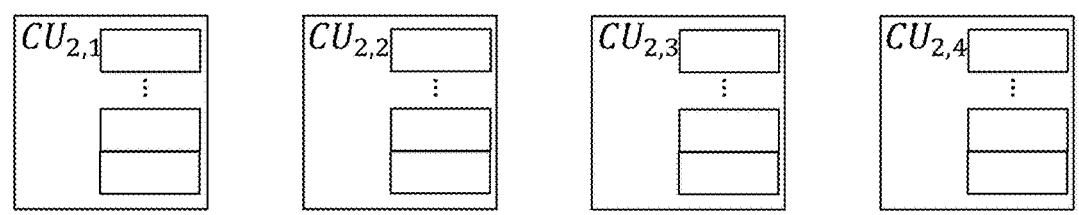

FIGS. 11A and 11B describe the processing of two out of the four active convolver units for the spatial orientation of the data values depicted in FIG. 10D. While the processing of the two convolver units is described in two separate figures, it is understood that such processing typically occurs in parallel (i.e., at the same time) in order to increase the number of computations per clock cycle.

As depicted in FIG. 11A, convolver unit $CU_{1,1}$ (typical for convolver units located on the left and right edges of the convolver array) receives data and/or zero values from five neighboring input data storage elements and one data value from the input data storage element corresponding to convolver unit $CU_{1,1}$. More specifically, convolver unit $CU_{1,1}$ receives:

data value $x_{n-1,1}$ from input data storage element $d_{1,1}$ via electrical connection 1100a, data value $x_{n-1,2}$ from input data storage element $d_{1,2}$ via electrical connection 1100b, data value $x_{n,1}$ from input data storage element $d_{2,1}$ via an electrical connection (not depicted)

data value $x_{n,2}$ from input data storage element $d_{2,2}$ via electrical connection 1100c, the zero value from input data storage element $d_{3,1}$ via electrical connection 1100d, and the zero value from input data storage element $d_{3,2}$ via electrical connection 1100e.

For clarity of depiction, electrical interconnections (i.e., bolded arrows) between convolver units and input data storage elements are only depicted when needed for discussion.

Once the data and/or zero values have been received, convolver unit $CU_{1,1}$ may compute the partial sum $y_1$ defined by $w_2^{1,1}x_{-1,1}+w_3^{1,1}+x_{n-1,2}+w_5^{1,1}x_{n,1}+w_6^{1,1}x_{n,2}$ (where $w_2^{1,1}$, $w_3^{1,1}$, $w_5^{1,1}$, and $w_6^{1,1}$ are four of the nine weights of kernel 704a depicted in FIG. 9C) and store the partial sum $y_1$ in output data storage element 1102a of convolver unit $CU_{1,1}$. Output data storage element 1102a may be part of a linear array of n output data storage elements, where n is the number of rows of within horizontal stripe 902a. Output data storage element 1102a may be configured to store the partial sums corresponding to row n of a horizontal stripe; output data storage element 1102b may be configured to store the partial sums corresponding to row n−1 of a horizontal stripe; and so on. For clarity of explanation, it is noted that the bottom instance of convolver unit $CU_{1,1}$ and the top instance of convolver unit $CU_{1,1}$ are one and the same convolver unit, with the bottom instance showing additional details of the top instance.

As depicted in FIG. 11B, convolver unit $CU_{1,2}$ receives data and/or zero values from eight neighboring input data storage elements and one data value from the input data storage element corresponding to convolver unit $CU_{1,2}$. More specifically, convolver unit $CU_{1,2}$ receives:

data value $x_{n-1,1}$ from input data storage element $d_{1,1}$ via electrical connection 1100f, data value $x_{n-1,2}$ from input data storage element $d_{1,2}$ via electrical connection 1100g, data value $x_{n-1,3}$ from input data storage element $d_{1,3}$ via electrical connection 1100h, data value $x_{n,1}$ from input data storage element $d_{2,1}$ via an electrical connection 1100i, data value $x_{n,2}$ from input data storage element $d_{2,2}$ via electrical connection (not depicted), data value $x_{n,3}$ from input data storage element $d_{2,3}$ via electrical connection 1100j, the zero value from input data storage element $d_{3,1}$ via electrical connection 1100k, the zero value from input data storage element $d_{3,2}$ via electrical connection 1100l, and the zero value from input data storage element $d_{3,3}$ via electrical connection 1100m.

Once the data values have been received, convolver unit $CU_{1,2}$ may compute the partial sum $y_2$ defined by $w_1^{1,1}x_{n-1,1}+w_2^{1,1}x_{n-1,2}+w_3^{1,1}+x_{n-1,3}+w_4^{1,1}x_{n,1}+w_5^{1,1}x_{n,2}+w_6^{1,1}x_{n,3}$ (where $w_1^{1,1}$, $w_2^{1,1}$, $w_3^{1,1}$, $w_4^{1,1}$, $w_5^{1,1}$ and $w_6^{1,1}$ are six of the nine weights of kernel 704a depicted in FIG. 9C) and store the partial sum $y_2$ in output data storage element 1104a of convolver unit $CU_{1,2}$.

Figure 11C:
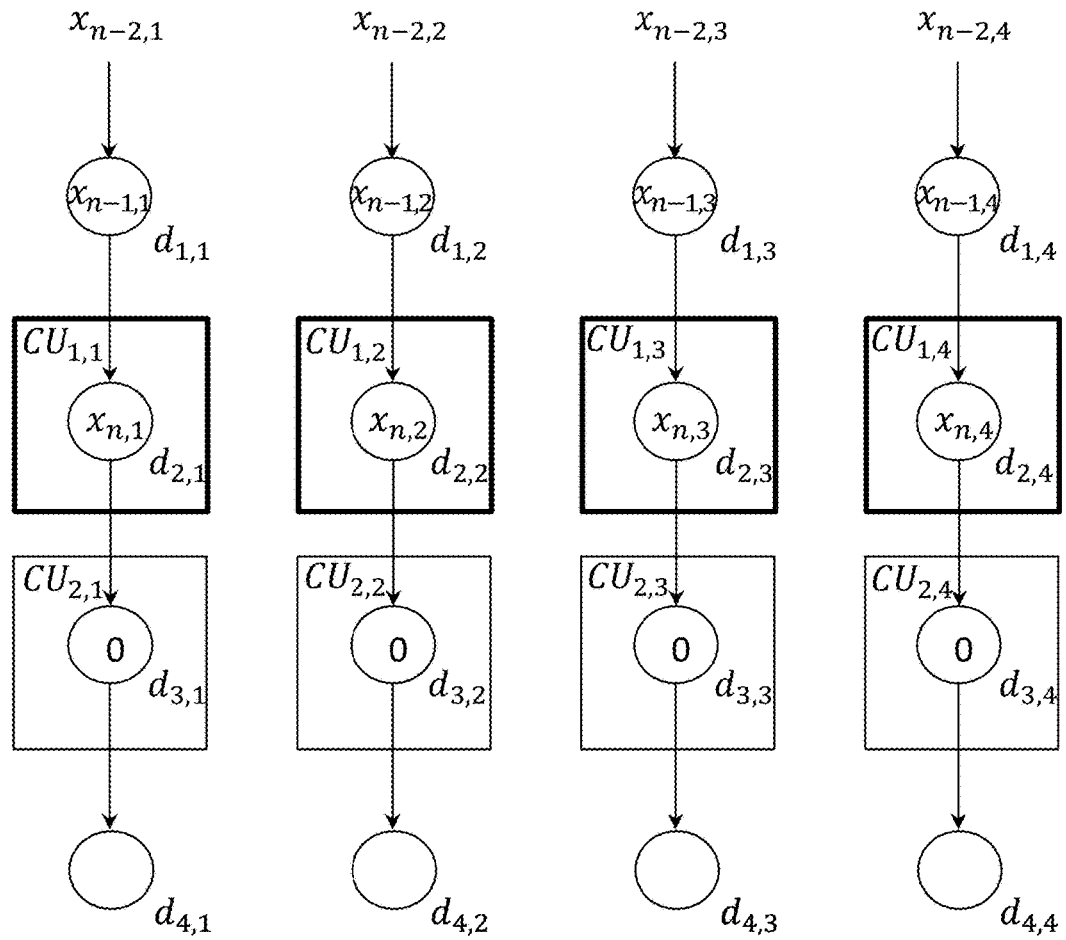
FIG. 11C depicts the resulting partial sums following the processing of all active convolver units for the spatial orientation of the data values depicted in FIG. 10D, in accordance with one embodiment of the invention.
Figure 11C:
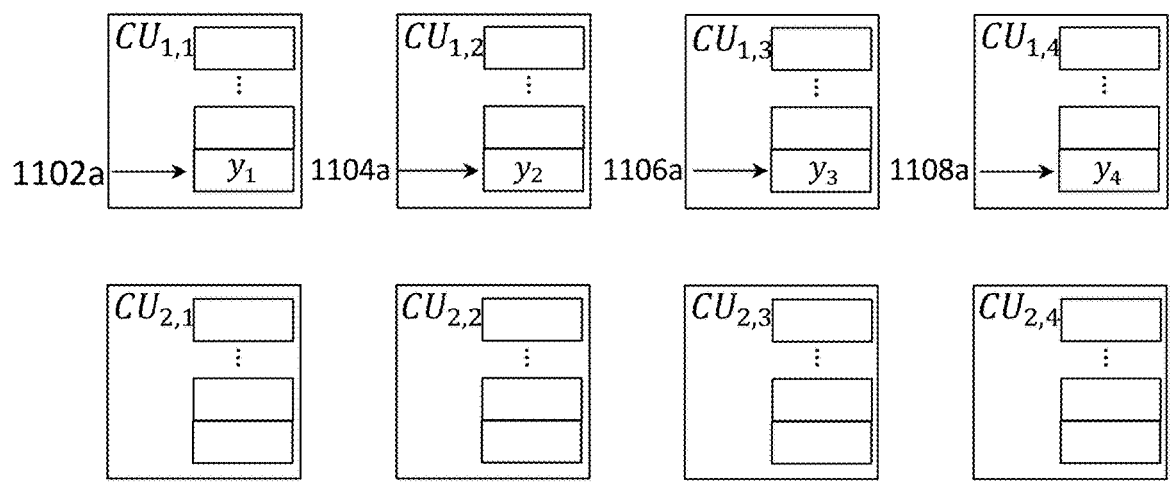

Similar processing is performed by $CU_{1,3}$ and $CU_{1,4}$, so the details of these computations have been omitted for conciseness. At the conclusion of the processing by the four active convolver units for the spatial orientation of data values shown in FIG. 10D, four partial sums are computed and stored in output data storage elements $1102a$, $1104a$, $1106a$ and $1108a$, as shown in FIG. 11C.

Figure 12:
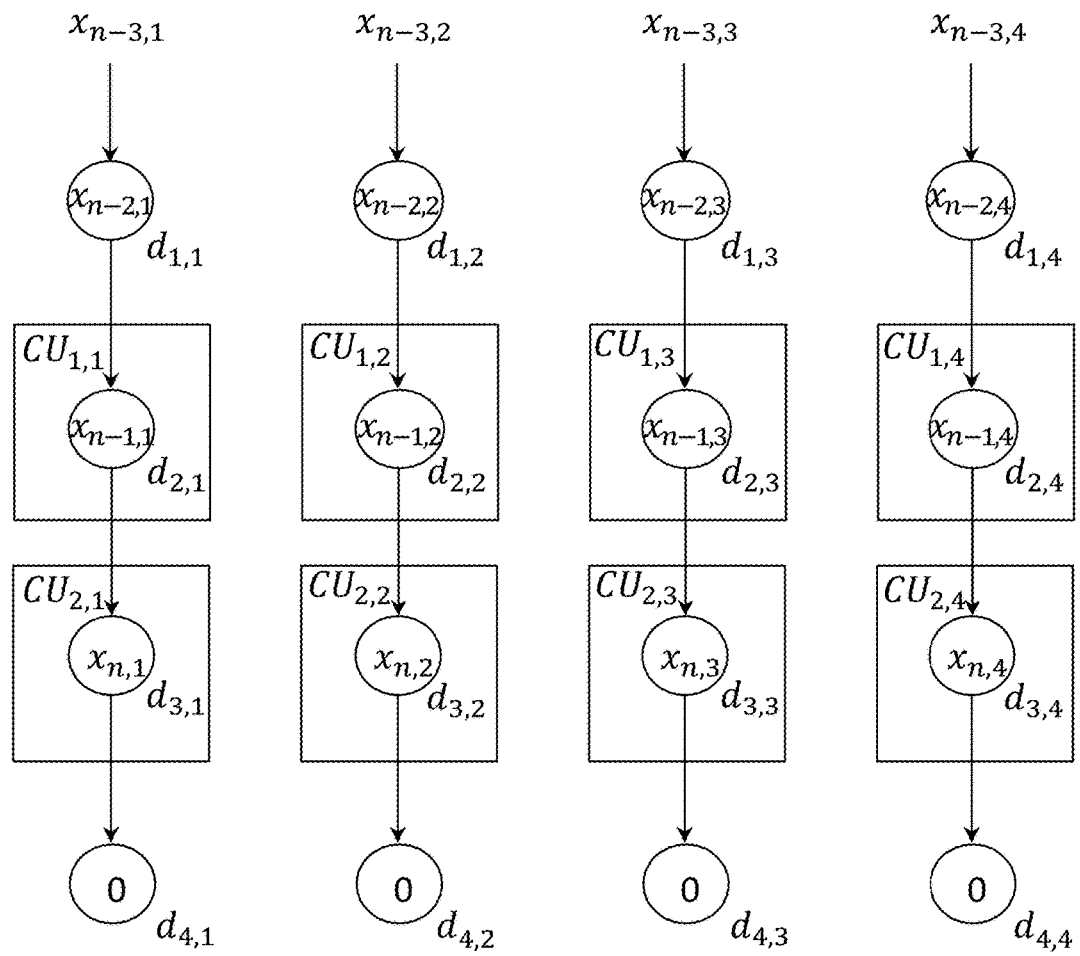
FIG. 12 depicts the data values after they have been shifted down one row of the 2-D shift register, as compared to the spatial orientation of the data values depicted in FIG. 10D.

FIG. 12 depicts the 2-D shift register after the data and/or zero values have been shifted down one row of input data storage elements, and data values $x_{n-2,1}$, $x_{n-2,2}$, $x_{n-2,3}$ and $x_{n-2,4}$ from the n−2 row of the horizontal stripe $902a$ have been loaded into the 2-D shift register. Once row n of horizontal stripe $902a$ has been loaded into input data storage elements $d_{3,1}$, $d_{3,2}$, $d_{3,3}$, and $d_{3,4}$, the corresponding convolver units $CU_{2,1}$, $CU_{2,2}$, $CU_{2,3}$ and $CU_{2,4}$ are activated, in addition to $CU_{1,1}$, $CU_{1,2}$, $CU_{1,3}$ and $CU_{1,4}$ (as shown in FIG. 13A).

FIGS. 13A-13D describe the processing of four of the eight active convolver units, in accordance with one embodiment of the invention. While the processing of the four convolver units is described in four separate figures, it is understood that such processing typically occurs in parallel (i.e., at the same time) in order to increase the number of computations per clock cycle.

Figure 13A:
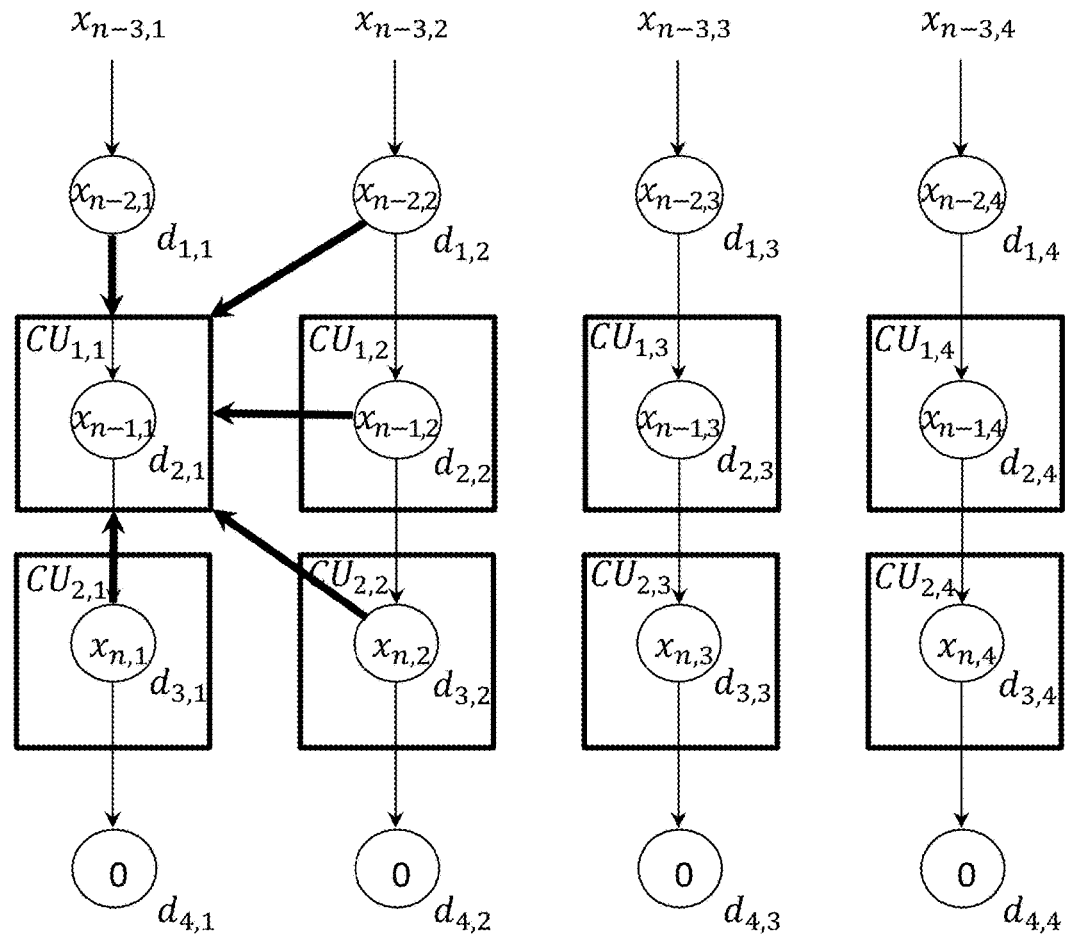
FIG. 13A, FIG. 13B, FIG. 13C and FIG. 13D describe the processing of four convolver units for the spatial orientation of the data values depicted in FIG. 12, in accordance with one embodiment of the invention.
Figure 13A:
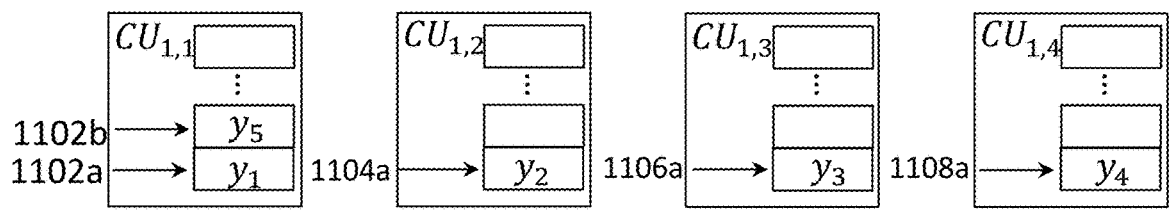
Figure 13A:
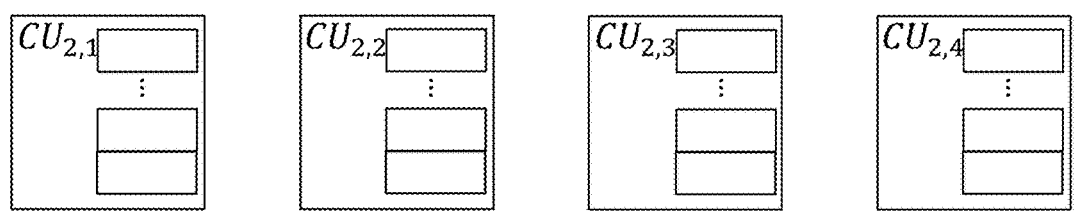

As depicted in FIG. 13A, convolver unit $CU_{1,1}$ may receive data values from the five neighboring input data storage elements and the one corresponding input data storage element. Convolver unit $CU_{1,1}$ may compute the partial sum $y_5$ defined by $w_2^{1,1}x_{n-2,1}+w_3^{1,1}x_{n-2,2}+w_5^{1,1}x_{n-1,1}+w_6^{1,1}x_{n-1,2}+w_8^{1,1}x_{n,1}+w_9^{1,1}x_{n,2}$ and store the partial sum $y_5$ in output data storage element $1102b$ of convolver unit $CU_{1,1}$.

Figure 13B:
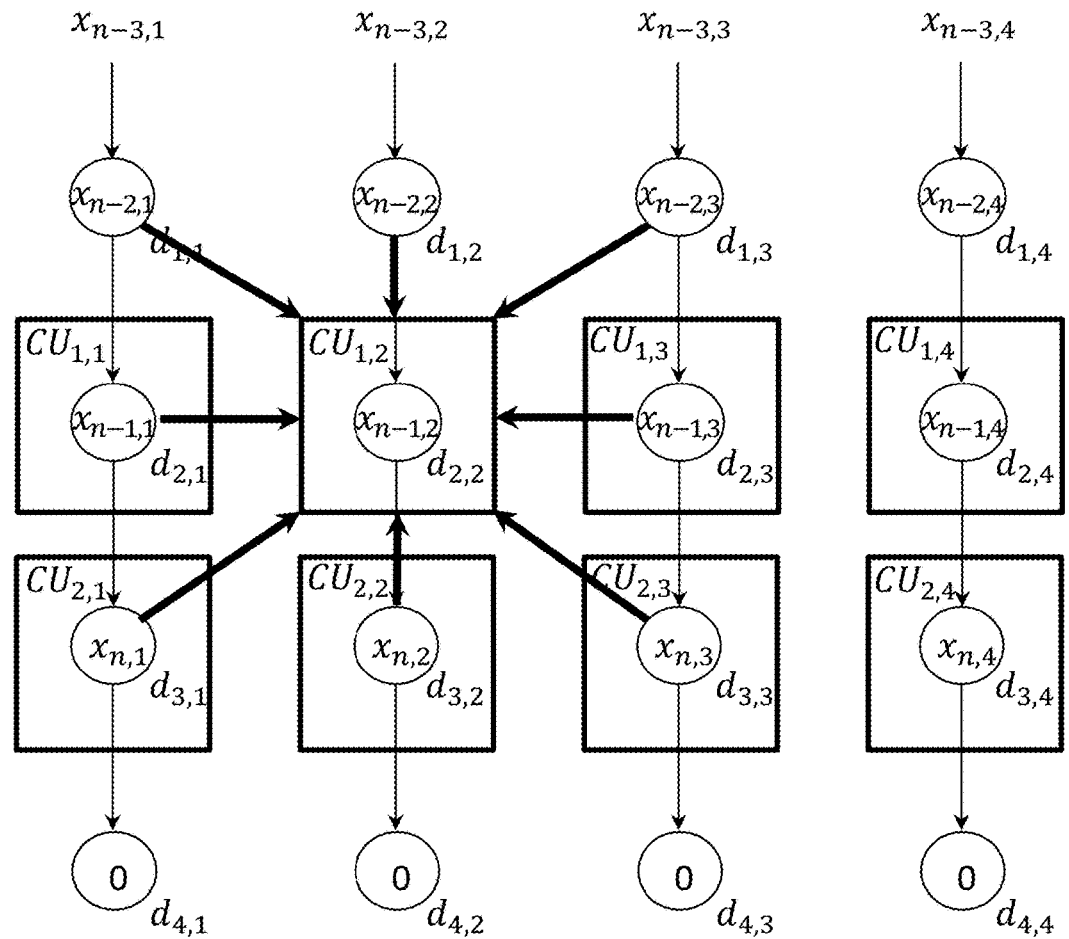
Figure 13B:
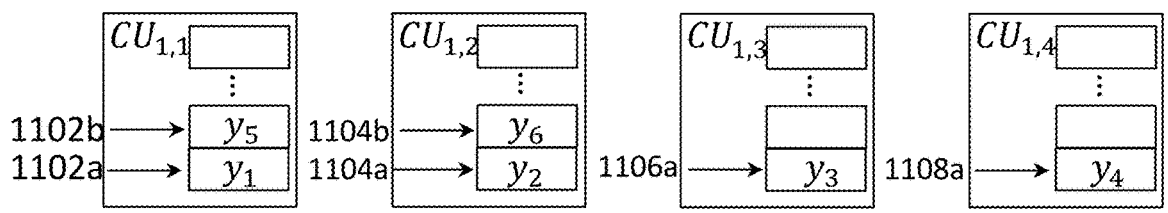
Figure 13B:
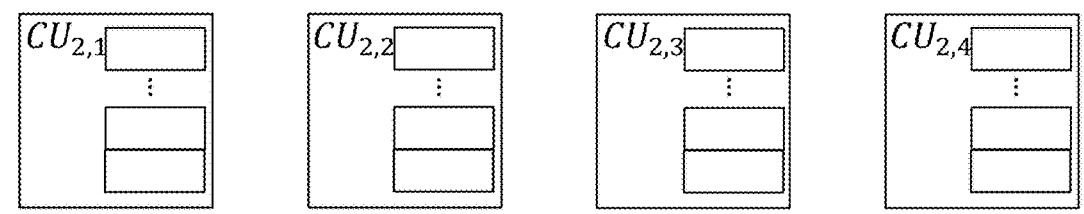

As depicted in FIG. 13B, convolver unit $CU_{1,2}$ may receive data values from the eight neighboring input data storage elements and the one corresponding input data storage element. Convolver unit $CU_{1,2}$ may compute the partial sum $y_6$ defined by $w_1^{1,1}x_{n-2,1}+w_2^{1,1}x_{n-2,2}+w_3^{1,1}x_{n-2,3}+w_4^{1,1}x_{n-1,1}+w_5^{1,1}x_{n-1,2}+w_6^{1,1}x_{n-1,3}+w_7^{1,1}x_{n,1}+w_8^{1,1}x_{n,2}+w_9^{1,1}x_{n,3}$ and store the partial sum y 6 in output data storage element $1104b$ of convolver unit $CU_{1,2}$.

Figure 13C:
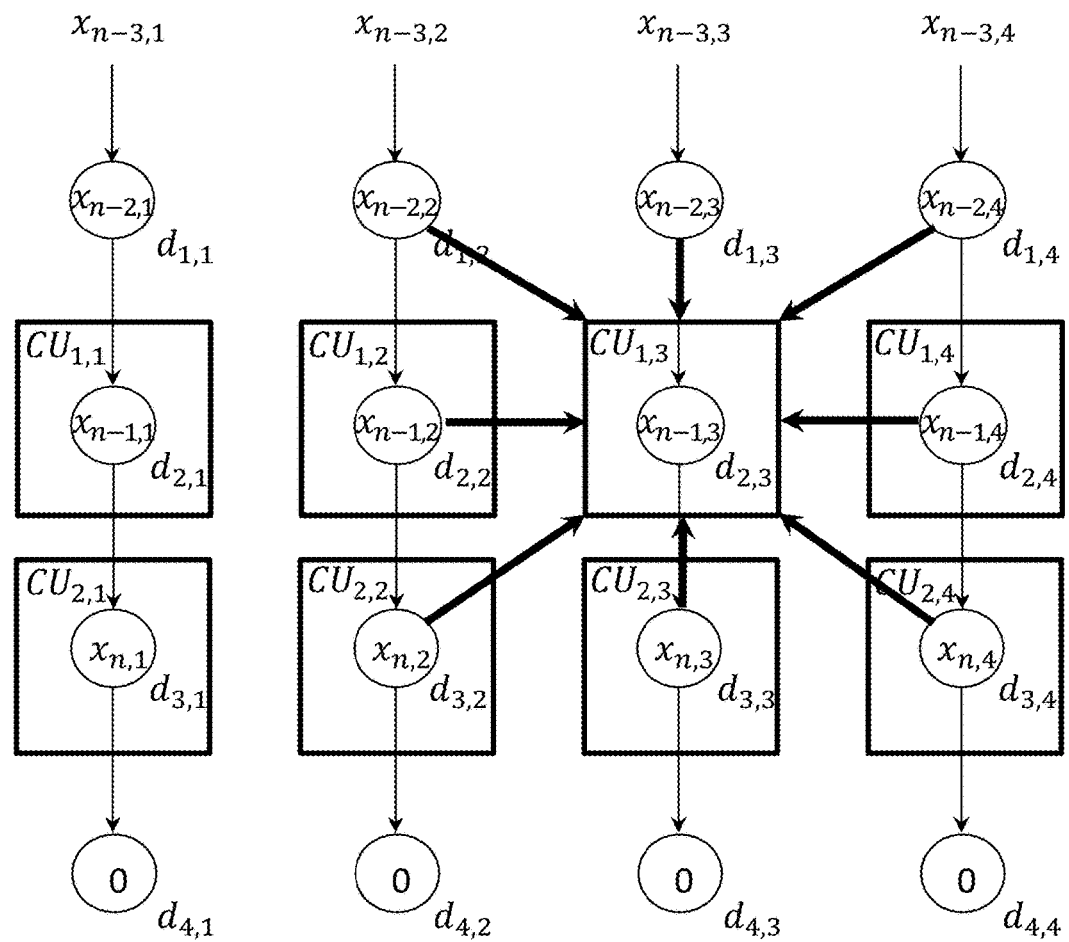
Figure 13C:
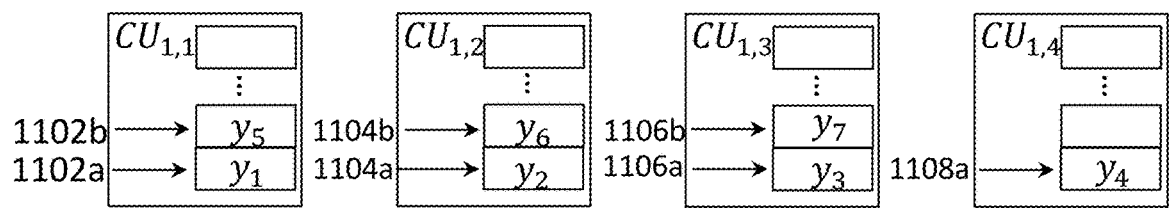
Figure 13C:
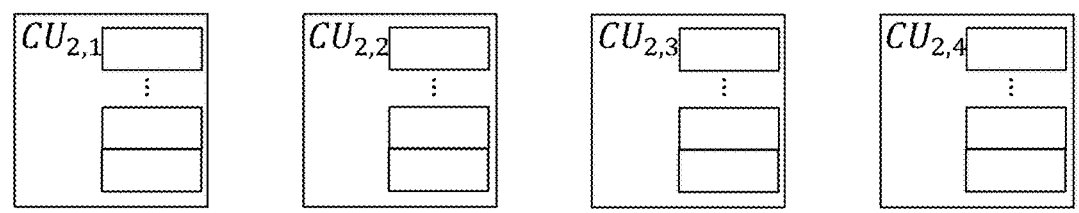

As depicted in FIG. 13C, convolver unit $CU_{1,3}$ may receive data values from the eight neighboring input data storage elements and the one corresponding input data storage element. Convolver unit $CU_{1,3}$ may compute the partial sum $y_7$ defined by $w_1^{1,1}x_{n-2,2}+w_2^{1,1}x_{n-2,3}+w_3^{1,1}x_{n-2,4}+w_4^{1,1}x_{n-1,2}+w_5^{1,1}x_{n-1,3}+w_6^{1,1}x_{n-1,4}+w_7^{1,1}x_{n,2}+w_8^{1,1}x_{n,3}+w_9^{1,1}x_{n,4}$ and store the partial sum $y_7$ in output data storage element $1106b$ of convolver unit $CU_{1,3}$.

Figure 13D:
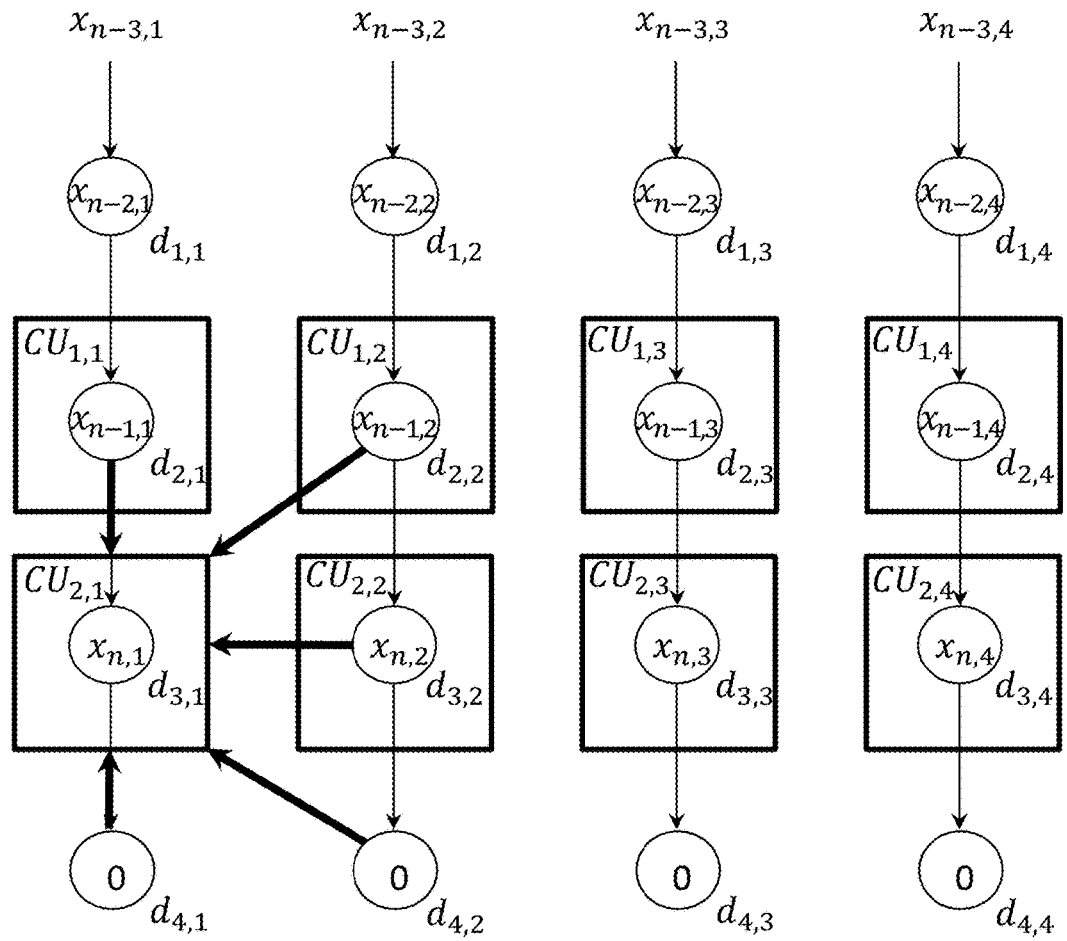
Figure 13D:
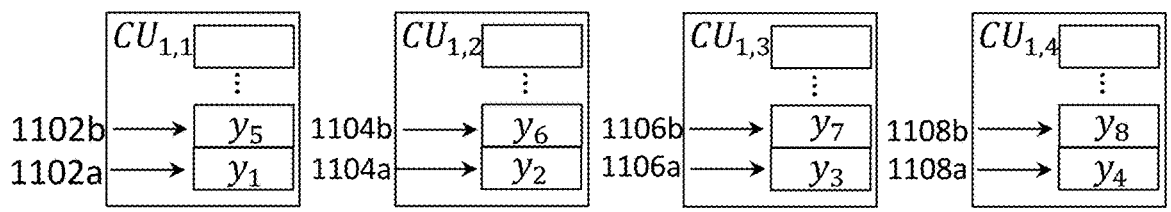
Figure 13D:
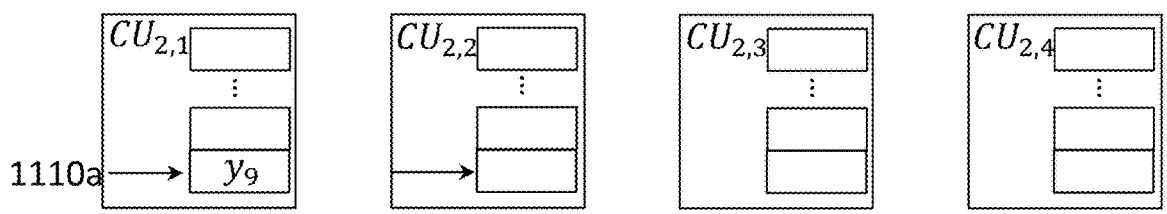

As depicted in FIG. 13D, convolver unit $CU_{2,1}$ may receive data and/or zero values from the five neighboring input data storage elements and the one corresponding input data storage element. Convolver unit $CU_{2,1}$ may then compute the partial sum $y_9$ defined by $w_2^{2,1}x_{n-1,1}+w_3^{2,1}x_{n-1,2}+w_5^{2,1}x_{n,1}+w_6^{2,1}x_{n,2}$ (where $w_2^{2,1}$, $w_3^{2,1}$, $w_5^{2,1}$ and $w_6^{2,1}$ are four of the nine weights of kernel $704b$ depicted in FIG. 9D) and store the partial sum $y_9$ in output data storage element $1110a$ of convolver unit $CU_{2,1}$.

Figure 13E:
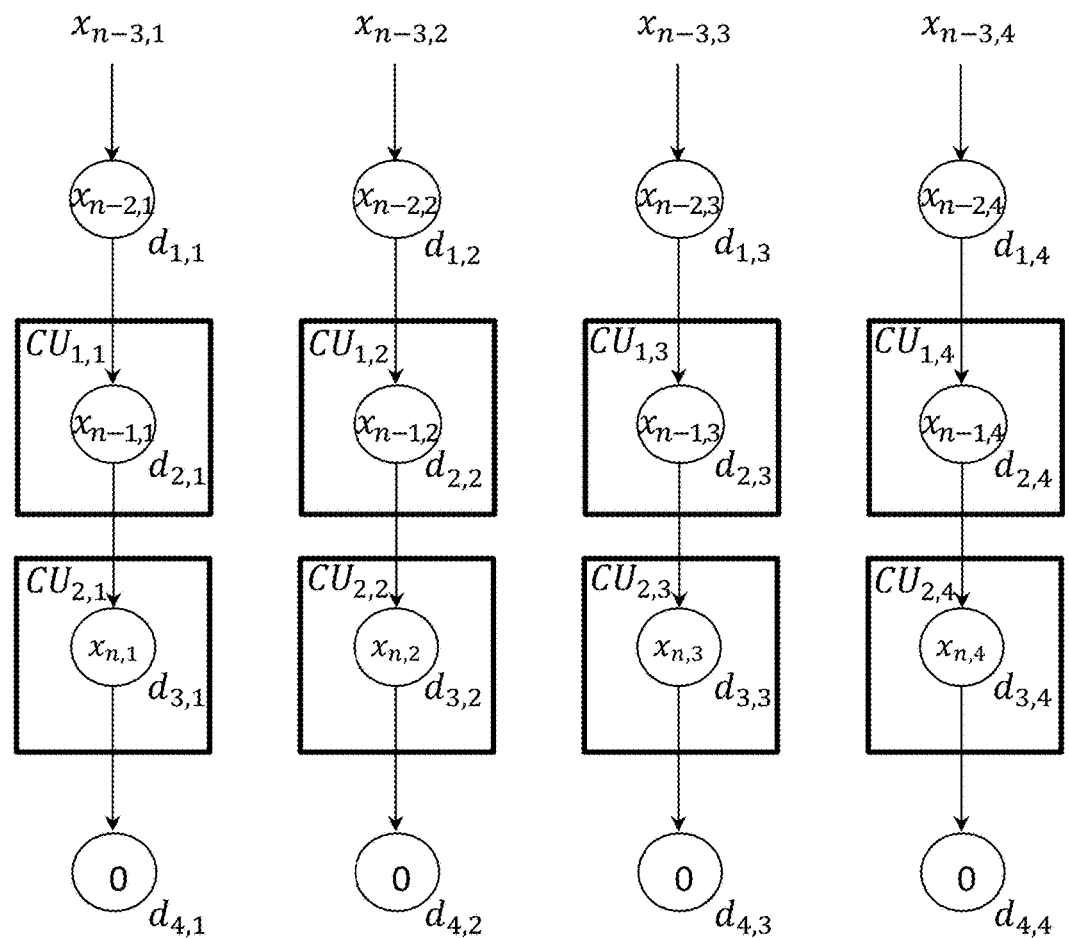
FIG. 13E depicts the resulting partial sums following the processing of all active convolver units for the spatial orientation of the data values depicted in FIG. 12, in accordance with one embodiment of the invention.
Figure 13E:
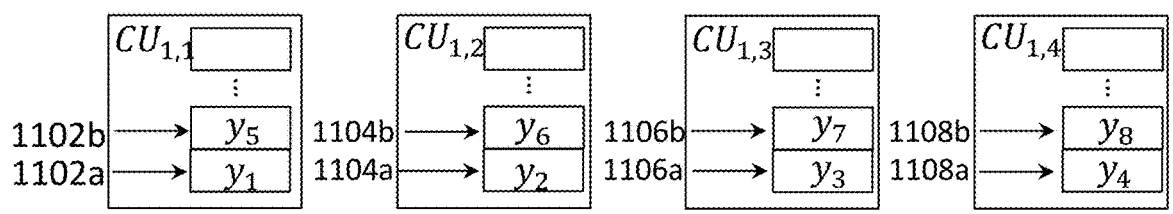
Figure 13E:
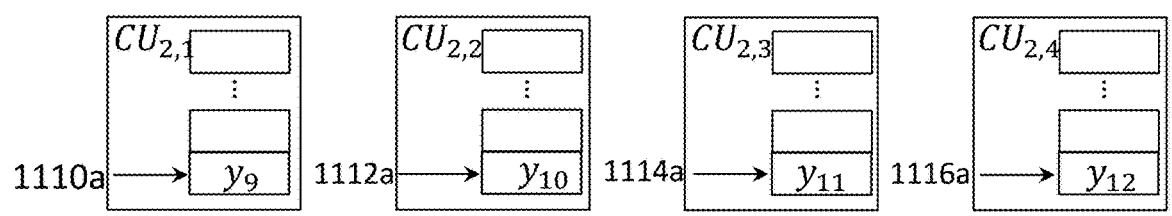

Similar processing may be performed by $CU_{1,4}$, $CU_{2,2}$, $CU_{2,3}$ and $CU_{2,4}$, so the details of these computations have been omitted for conciseness. At the conclusion of the processing by the active convolver units for the spatial orientation of data values shown in FIG. 12, eight (additional) partial sums have been computed and stored in output data storage elements $1102b$, $1104b$, $1106b$, $1108b$, $1110a$, $1112a$, $1114a$ and $1116a$, as shown in FIG. 13E.

The processing of the 2-D shift register and the plurality of convolutional units continues in a similar fashion until row 1 of horizontal stripe $902a$ has been shifted through the 2-D shift register. At this point, data values of the next input channel and parameters (i.e., weights) of the kernels corresponding to the next input channel may be loaded into the convolutional engine, as depicted in FIGS. 14A-14D.

Figure 14A:
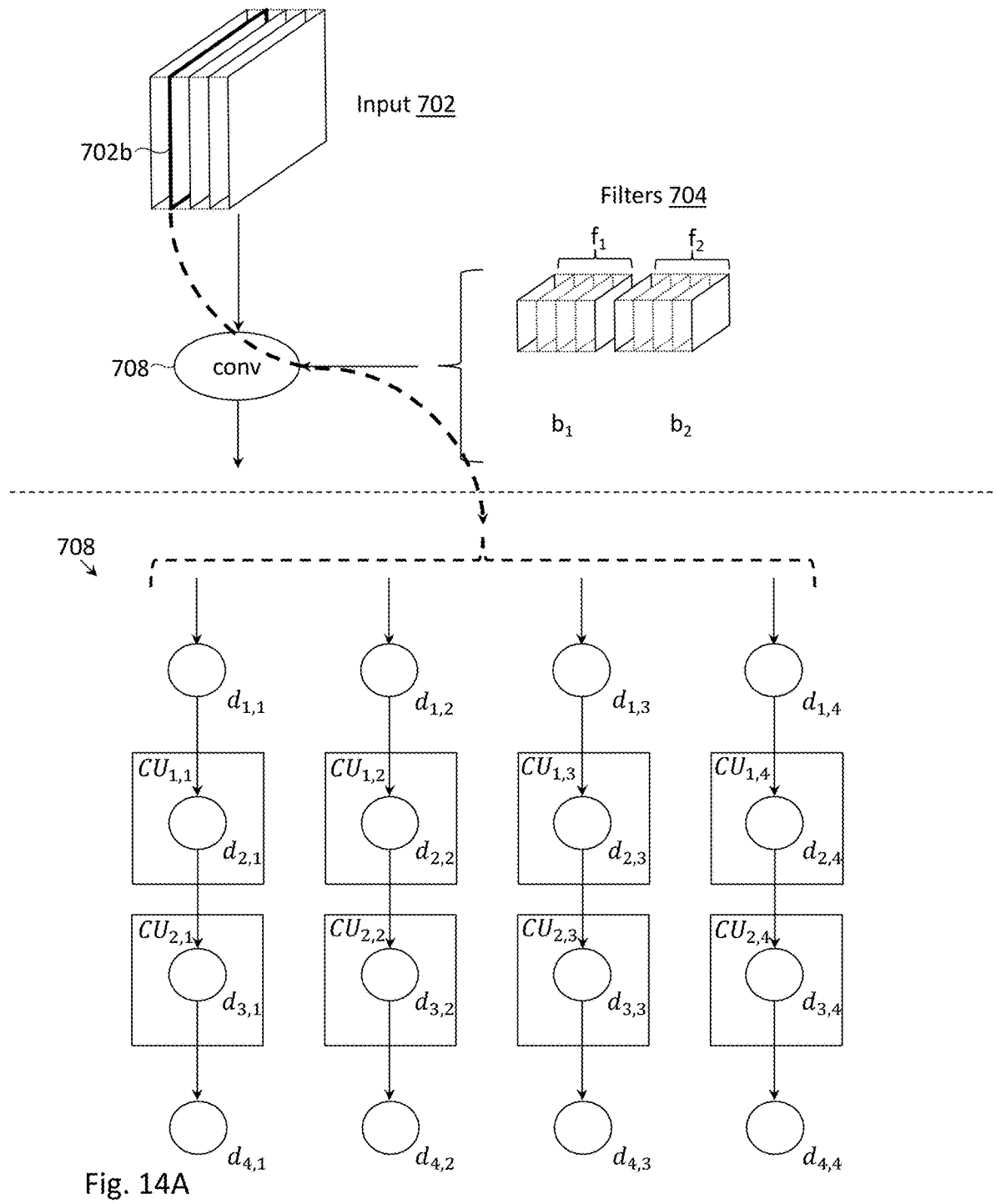
FIG. 14A and FIG. 14B depict the loading of data values into the convolutional engine, in accordance with one embodiment of the invention.
Figure 14B:
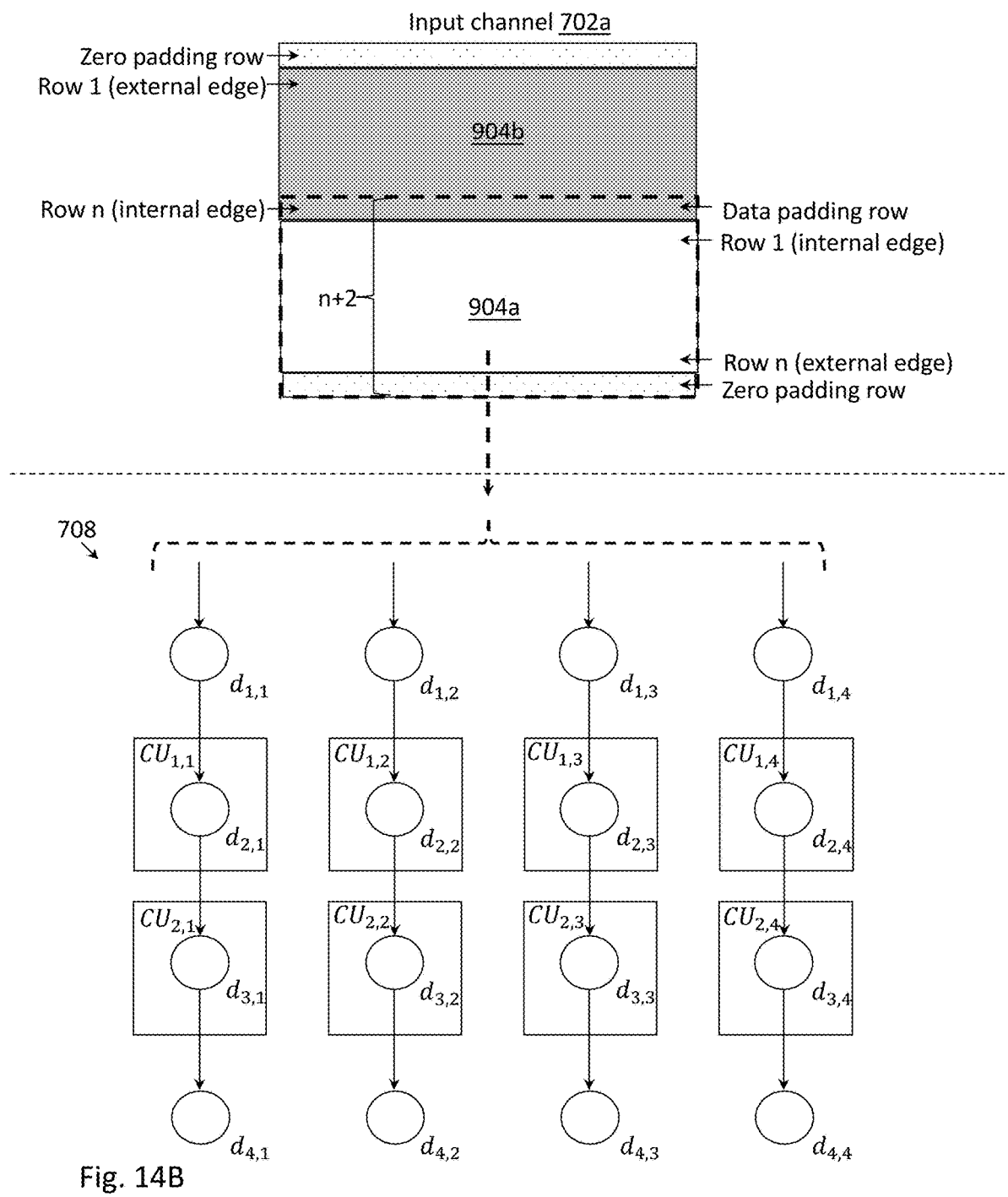

FIG. 14A depicts the loading of data values from the second input channel $702b$ into convolutional engine 708, in accordance with one embodiment of the invention. As depicted in greater detail in FIG. 14B, the second input channel $702b$ may include horizontal stripes $904a$ and $904b$, and horizontal stripe $904a$ may be loaded into convolutional engine 708 in a similar manner as horizontal stripe $902a$ was loaded.

Figure 14C:
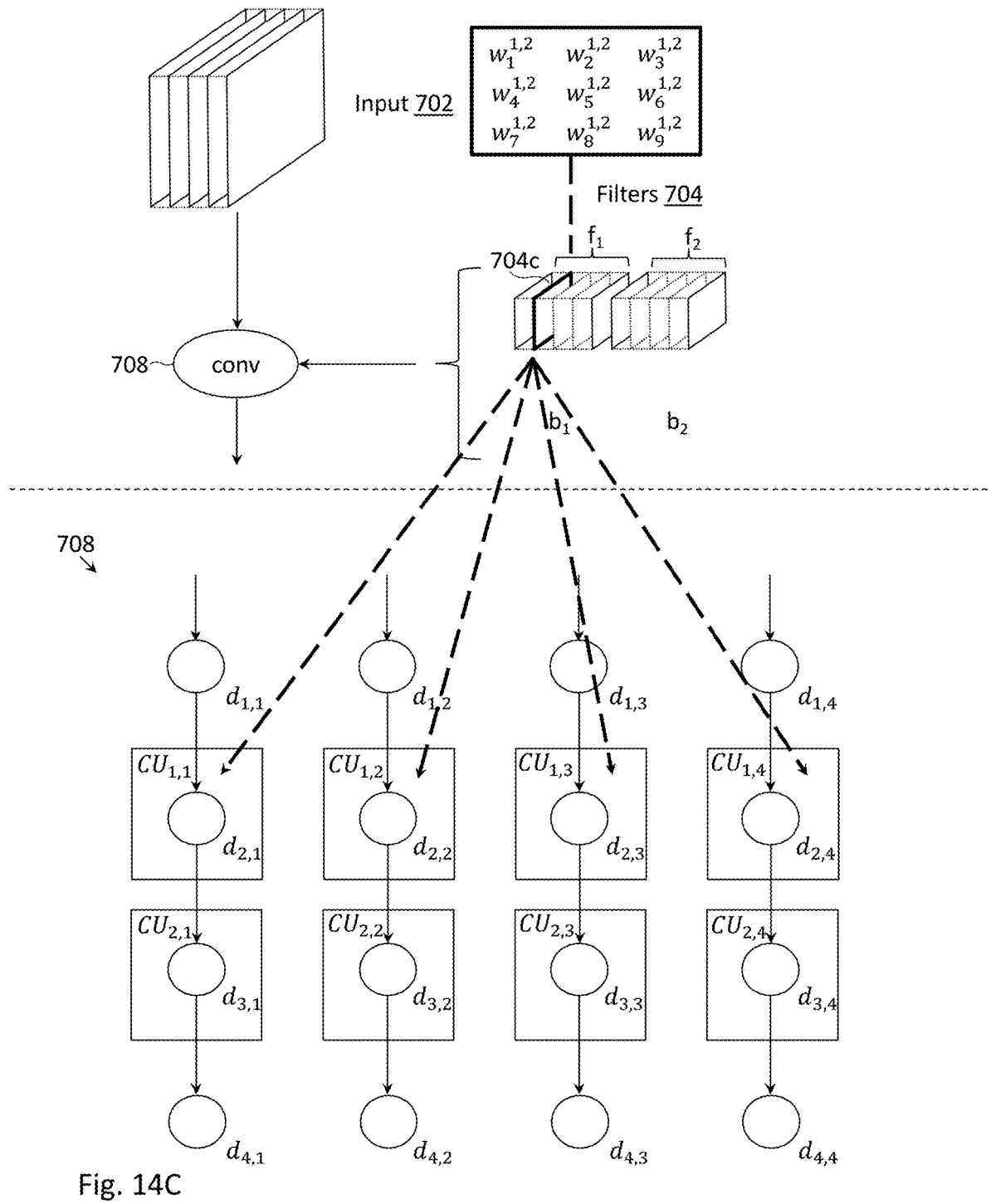
FIG. 14C and FIG. 14D depict the loading of filter weights into the convolutional engine, in accordance with one embodiment of the invention.
Figure 14D:
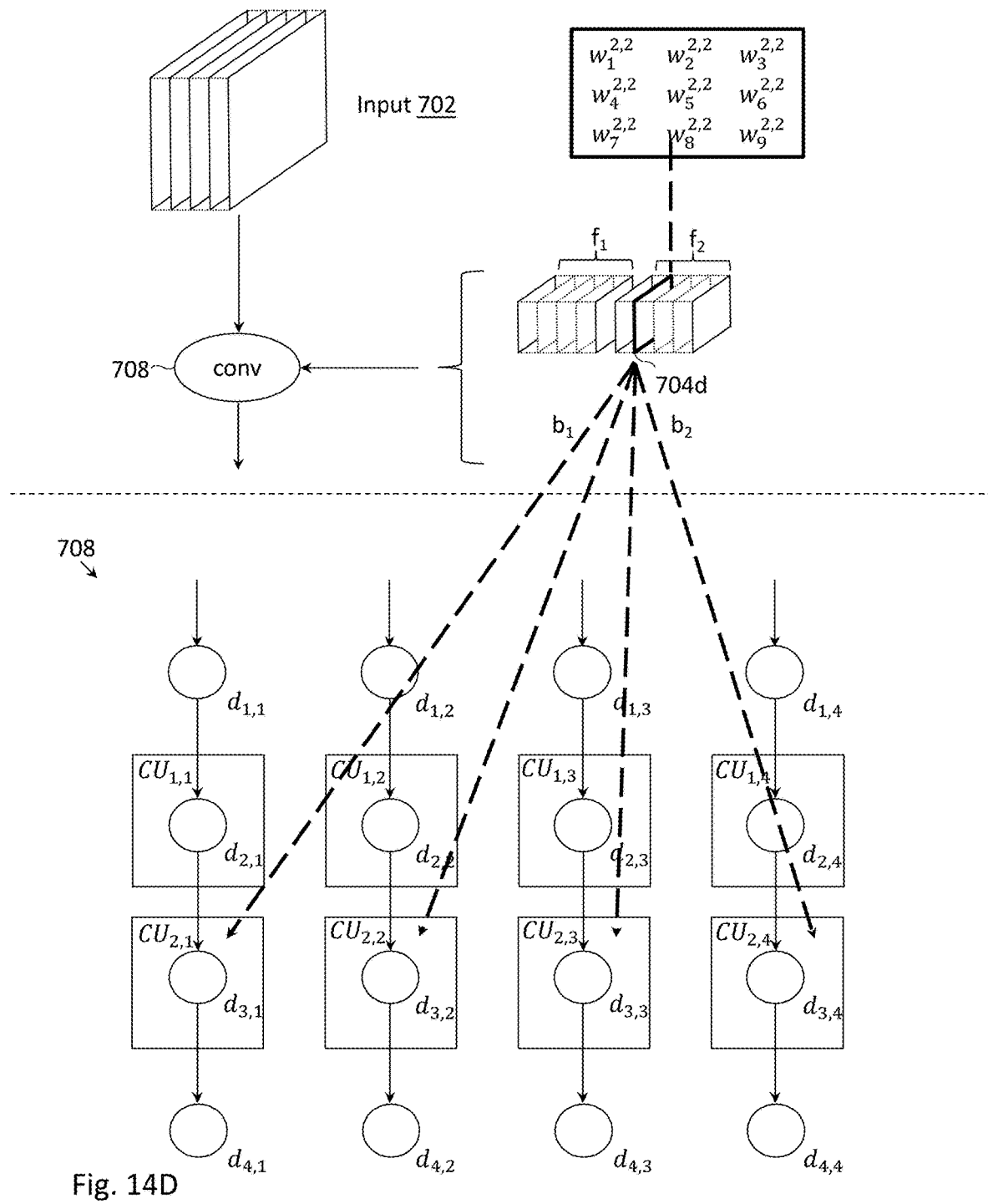

FIGS. 14C-14D depict the loading of filter weights into convolutional engine 708, in accordance with one embodiment of the invention. More specifically, FIG. 14C depicts the loading of the nine weights of kernel $704c$ into each of the convolver units of the first row of the convolver array (i.e., $CU_{1,1}$, $CU_{1,2}$, $CU_{1,3}$ and $CU_{1,4}$), and FIG. 14D depicts the loading of the nine weights of kernel $704b$ into each of the convolver units of the second row of the convolver array (i.e., $CU_{2,1}$, $CU_{2,2}$, $CU_{2,3}$ and $CU_{2,4}$). Kernel $704c$ is the second kernel of filter $f_1$, and each of its weights is labeled with the superscript "1,2", which is shorthand for (filter $f_1$, kernel 2). Kernel $704d$ is the second kernel of filter $f_2$, and each of its weights is labeled with the superscript "2,2", which is shorthand for (filter $f_2$, kernel 2).

Figure 15A:
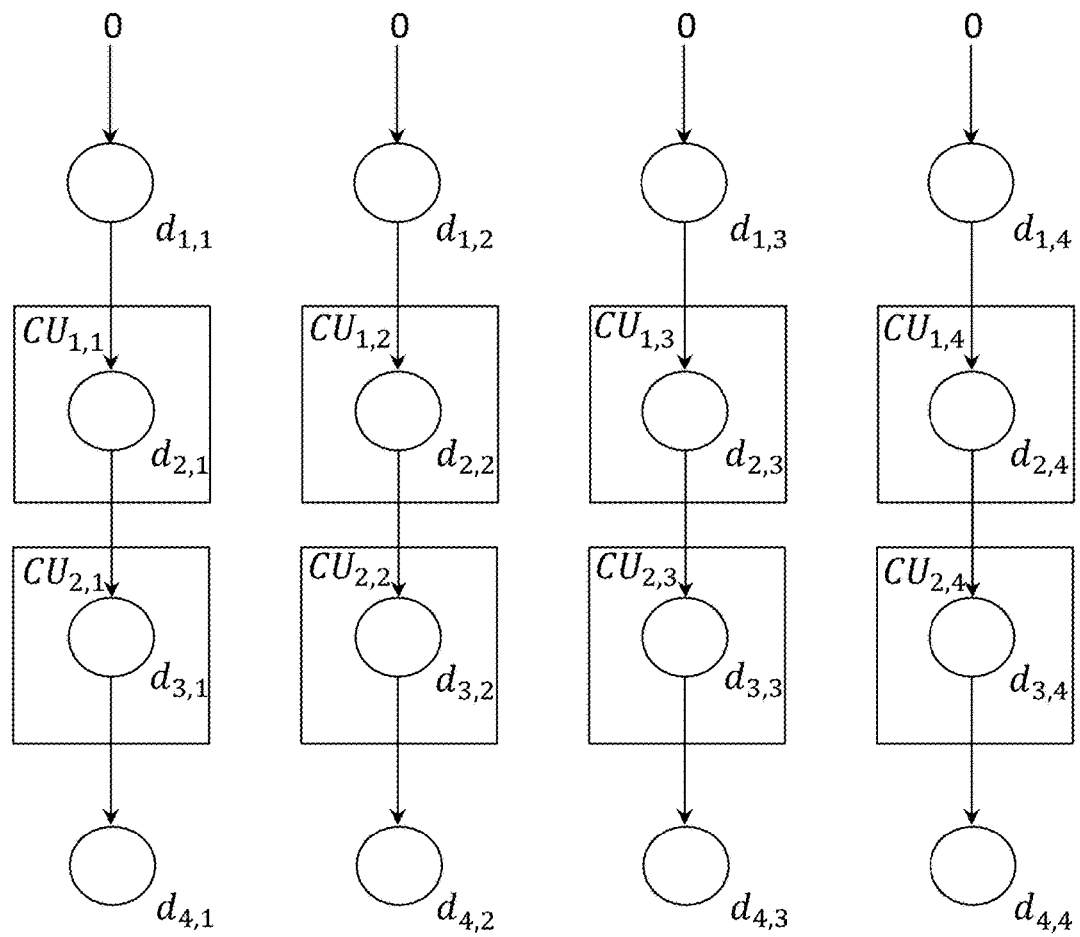
FIG. 15A and FIG. 15B the loading of a zero padding row into the 2-D shift register, in accordance with one embodiment of the invention.
Figure 15B:
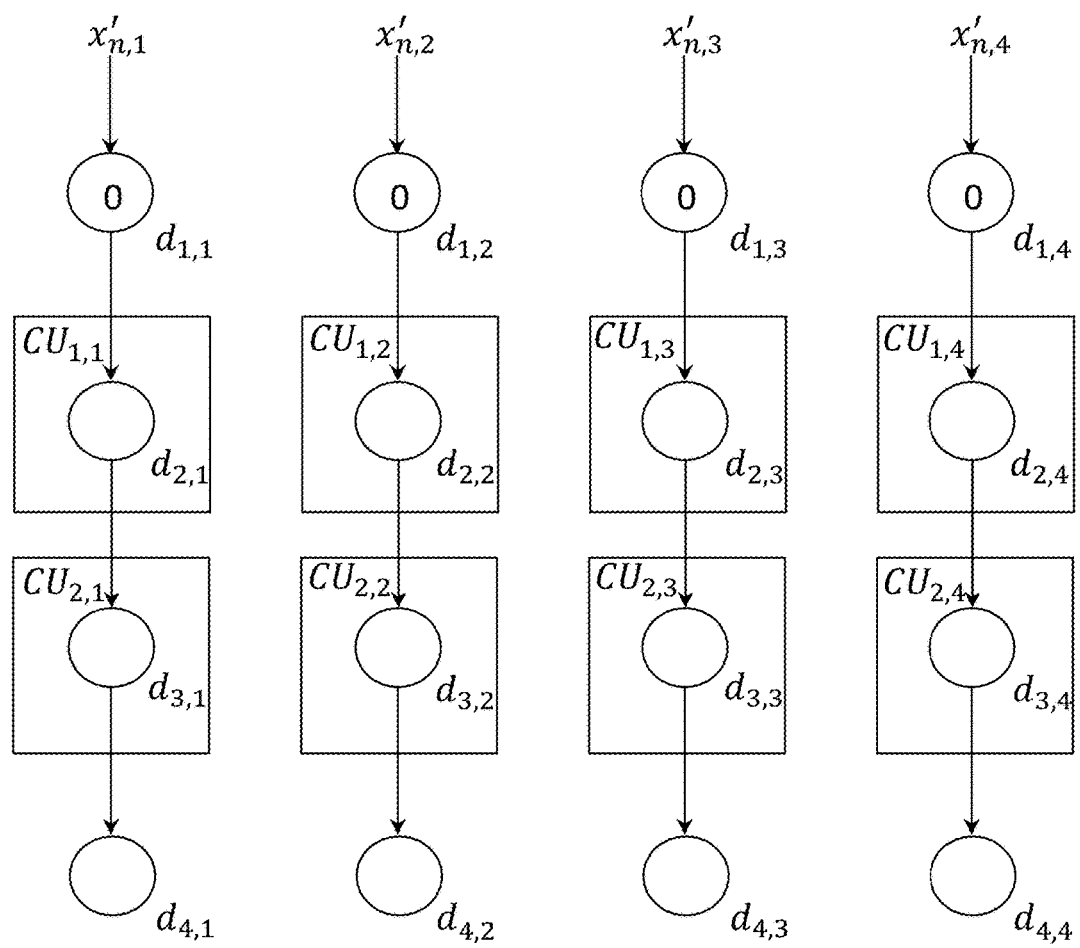
Figure 15C:
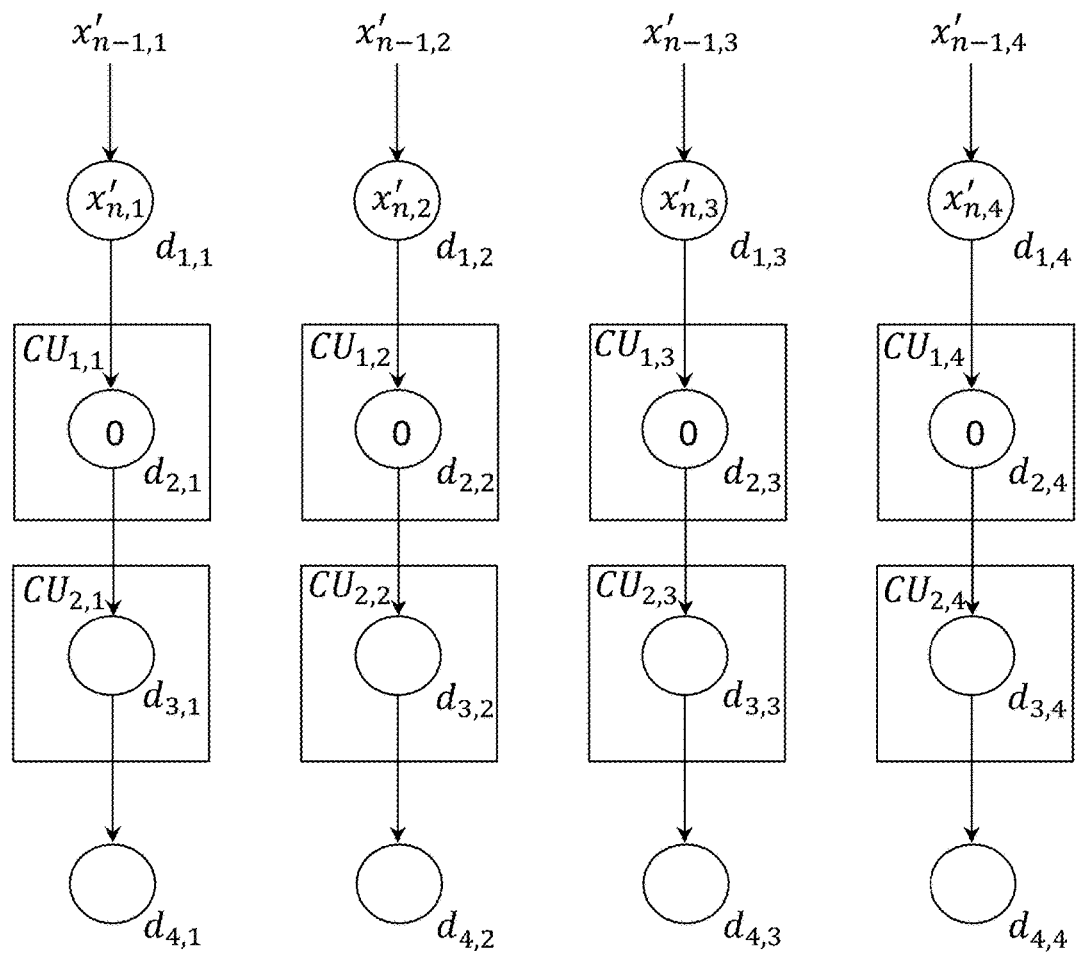
Figure 15D:
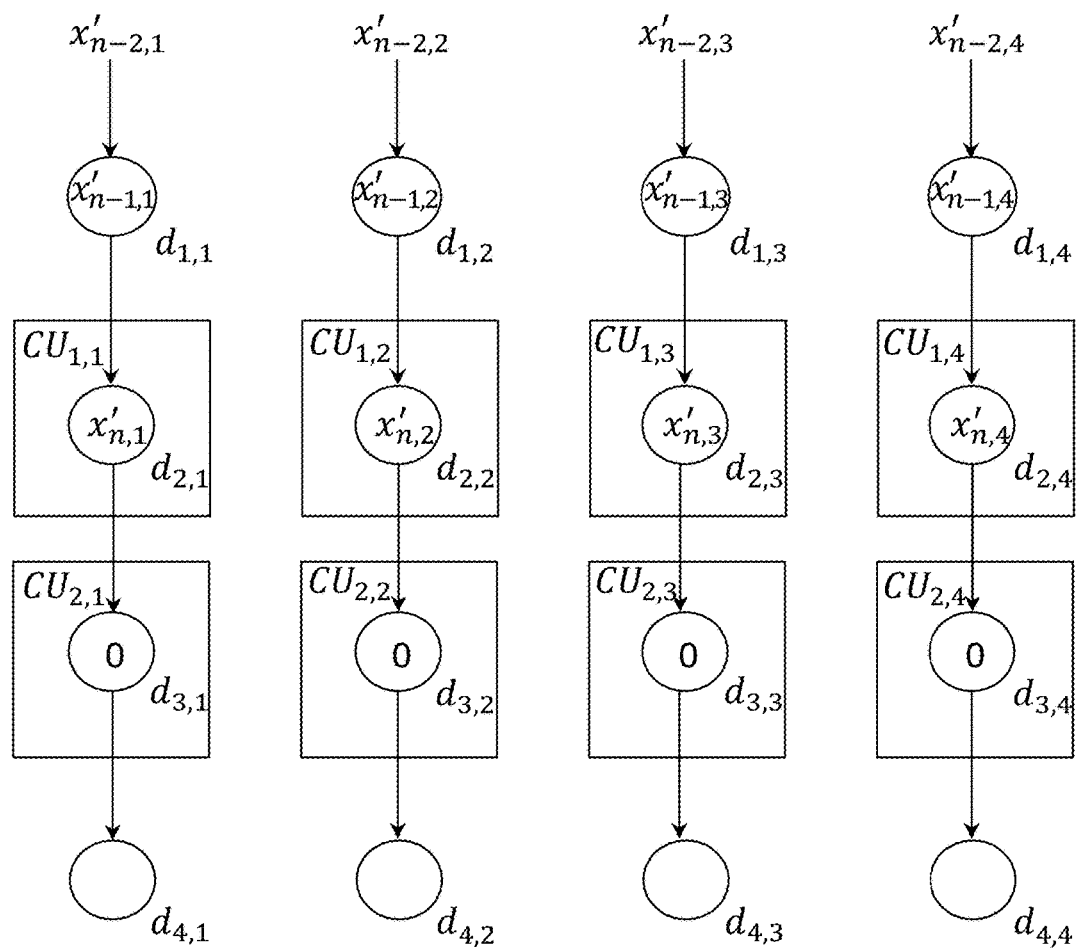

FIGS. 15A-15B depict the loading of a row of zero values into the 2-D shift register. FIGS. 15B-15D depict a row-by-row loading of data values from the second input channel $702b$ into the 2-D shift register and a row-to-row shifting of the data values through the 2-D shift register. Data values $x'_{n,1}$, $x'_{n,2}$, $x'_{n,3}$ and $x'_{n,4}$ may represent values from row n of horizontal stripe $904a$ of input channel $702b$. Data values $x'_{n-1,1}$, $x'_{n-1,2}$, $x'_{n-1,3}$ and $x'_{n-1,4}$ may represent values from row n−1 of horizontal stripe $904a$ of input channel $702b$. Data values $x'_{n-2,1}$, $x'_{n-2,2}$, $x'_{n-2,3}$ and $x'_{n-2,4}$ may represent values from row n−2 of horizontal stripe $904a$ of input channel $702b$. Upon row n of horizontal stripe $904a$ being loaded into the second row of input data storage elements, the first row of convolver units may be activated (as shown in FIG. 16A).

Figure 16A:
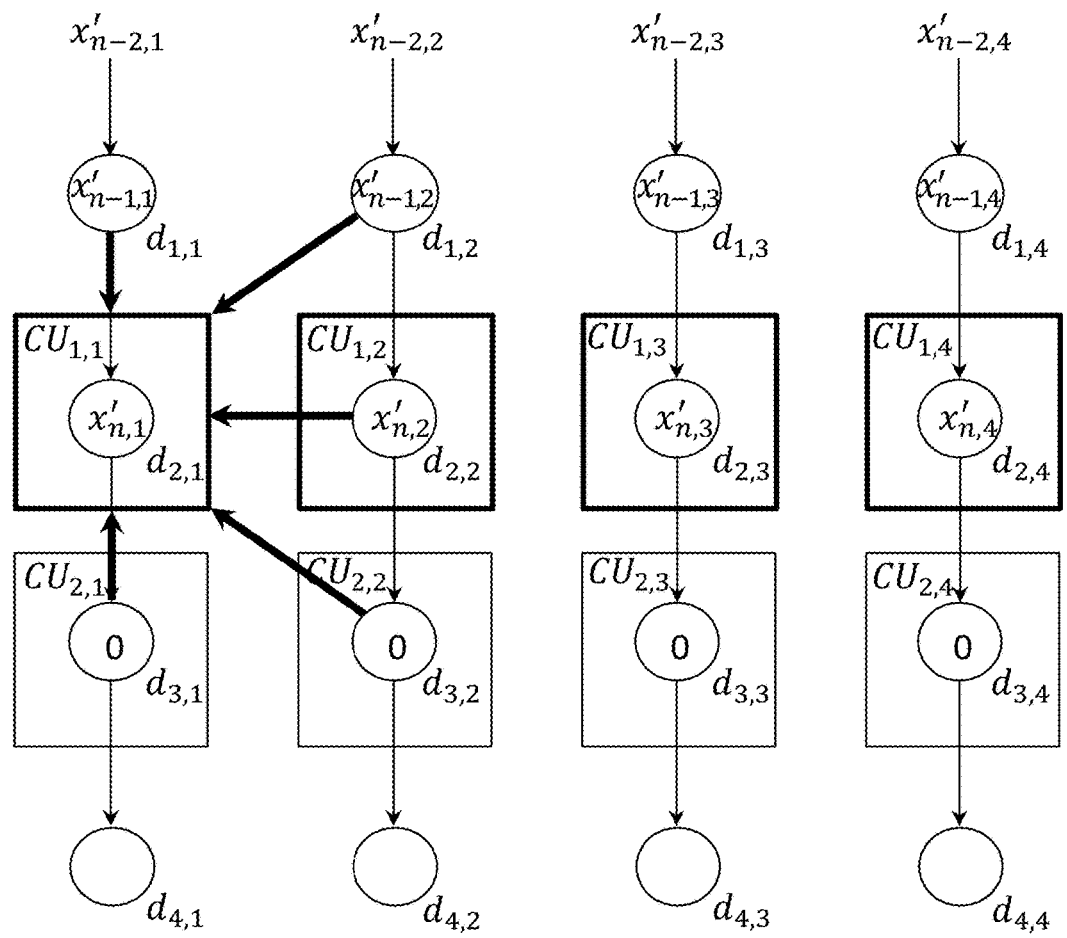
FIG. 16A and FIG. 16B describe the processing of two convolver units for the spatial orientation of the data values depicted in FIG. 15D, in accordance with one embodiment of the invention.
Figure 16A:
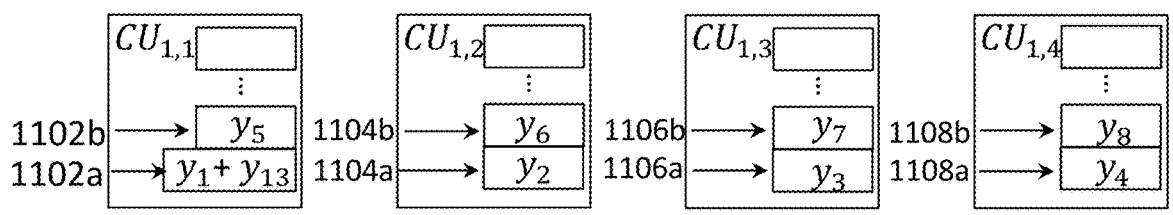
Figure 16A:
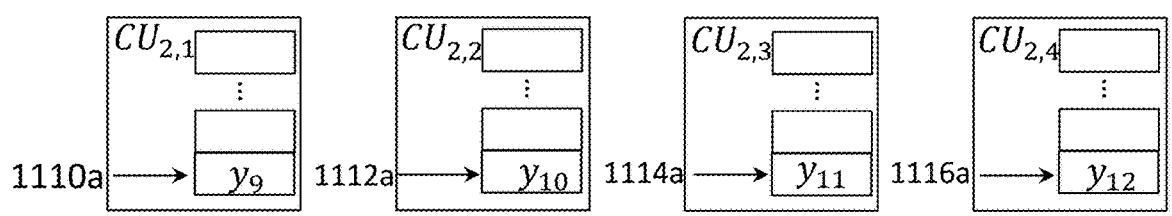
Figure 16B:
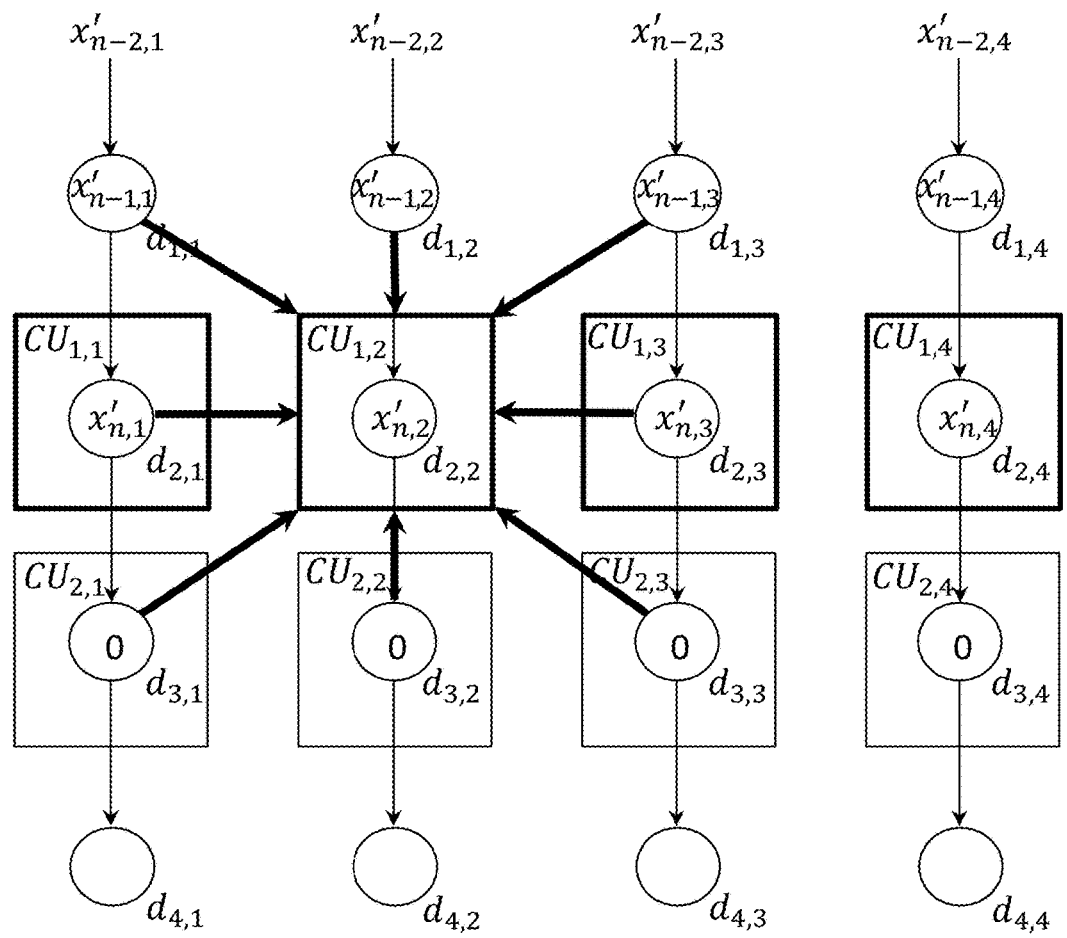
Figure 16B:
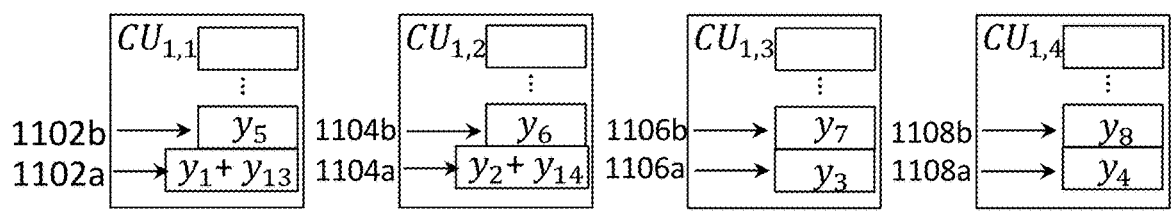
Figure 16B:
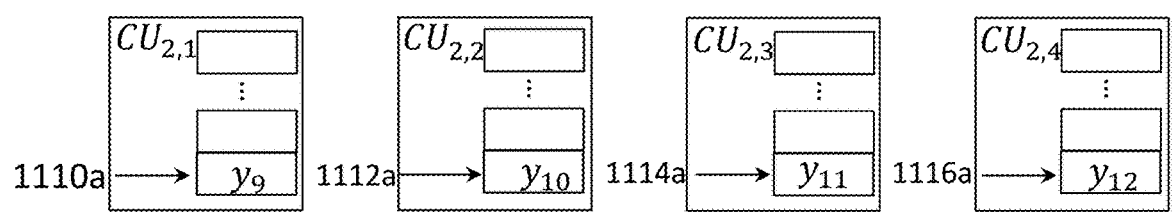

FIGS. 16A and 16B describe the processing of two out of the four active convolver units for the spatial orientation of the data values depicted in FIG. 15D. As depicted in FIG. 16A, convolver unit $CU_{1,1}$ may receive data and/or zero values from the five neighboring input data storage elements and one data value from the input data storage element corresponding to convolver unit $CU_{1,1}$. Once the data values have been received, convolver unit $CU_{1,1}$ may compute the partial sum $y_{13}$ defined by $w_2^{1,2}x'_{n-1,1}+w_3^{1,2}x'_{n-1,2}+w_5^{1,2}x'_{n,1}+w_6^{1,2}x'_{n,2}$ (where $w_2^{1,2}$, $w_3^{1,2}$, $w_5^{1,2}$, $w_6^{1,2}$ and $w_6^{1,2}$ are four of the nine weights of kernel $704c$ depicted in FIG. 14C). The partial sum y 13 may be summed with $y_1$ (the partial sum previously computed by convolver unit $CU_{1,1}$ for row n) and the new partial sum $y_1+y_{13}$ may be stored in output data storage element $1102a$.

As depicted in FIG. 16B, convolver unit $CU_{1,2}$ may receive data and/or zero values from the eight neighboring input data storage elements and one data value from the input data storage element corresponding to convolver unit $CU_{1,2}$. Once the data and/or zero values have been received, convolver unit $CU_{1,2}$ may compute the partial sum $y_{14}$ defined by $w_1^{1,2}x'_{n-1,1}+w_2^{1,2}x'_{n-1,2}+w_3^{1,2}x'_{n-1,3}+w_4^{1,2}x'_{n,1}+w_5^{1,2}x'_{n,2}+w_6^{1,2}x'_{n,3}$ (where $w_1^{1,2}$, $w_2^{1,2}$, $w_3^{1,2}$, $w_4^{1,2}$, $w_5^{1,2}$ and $w_6^{1,2}$ are six of the nine weights of kernel $704c$ depicted in FIG. 14C). The partial sum y 14 may be summed with $y_2$ (the partial sum previously computed by convolver unit $CU_{1,2}$ for row n) and the new partial sum $y_2+y_{14}$ may be stored in output data storage element 1104a.

Figure 16C:
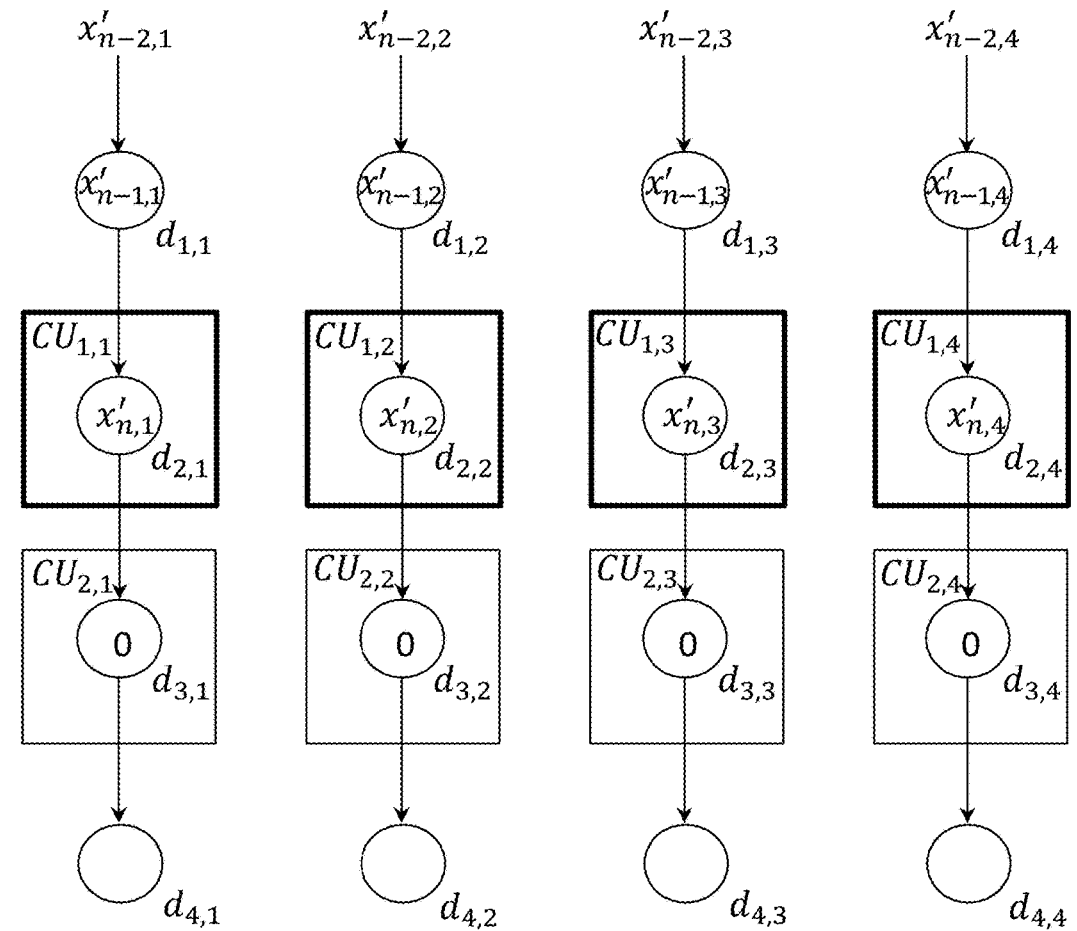
FIG. 16C depicts the resulting partial sums following the processing of all active convolver units for the spatial orientation of the data values depicted in FIG. 15D, in accordance with one embodiment of the invention.
Figure 16C:
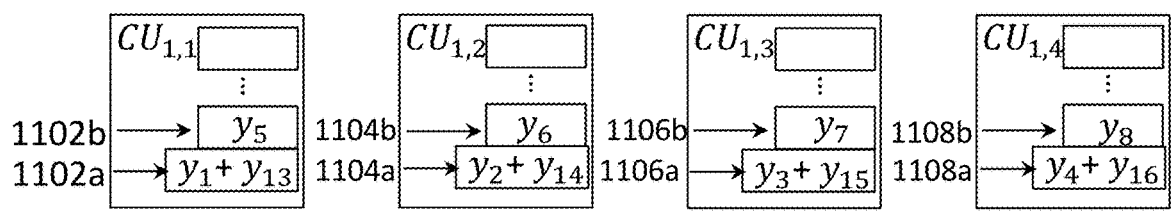
Figure 16C:
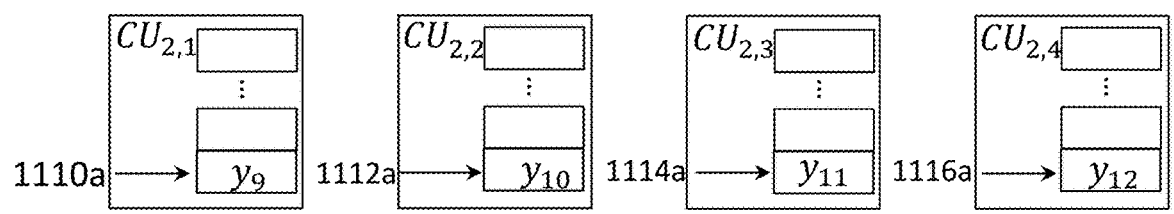

Similar processing is performed by $CU_{1,3}$ and $CU_{1,4}$, so the details of these computations have been omitted for conciseness. At the conclusion of the processing by the four active convolver units for the spatial orientation of data values shown in FIG. 15D, four partial sums have been updated and stored in output data storage elements 1102a, 1104a, 1106a and 1108a, as shown in FIG. 16C.

Figure 17:
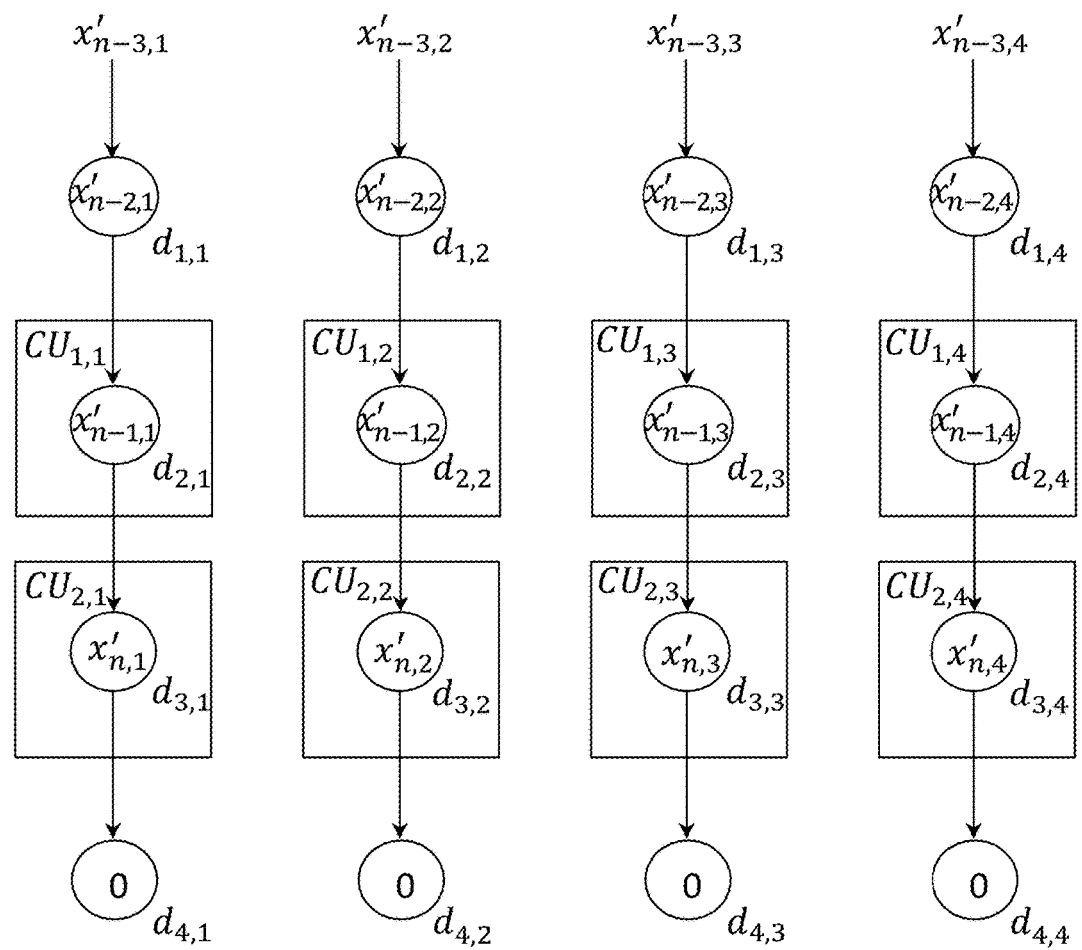
FIG. 17 depicts the data values after they have been shifted down one row of the 2-D shift register as compared to the spatial orientation of the data values depicted in FIG. 15D.

FIG. 17 depicts the 2-D shift register after the data and/or zero values have been shifted down one row of input data storage elements, and data values and $x'_{n-2,4}$ from the n−2 row of the horizontal stripe 904a have been loaded into the 2-D shift register. Once row n of horizontal stripe 904a has been loaded into input data storage elements $d_{3,1}$, $d_{3,2}$, $d_{3,3}$ and $d_{3,4}$, the corresponding convolver units $CU_{2,1}$, $CU_{2,2}$, $CU_{2,3}$ and $CU_{2,4}$ are activated, in addition to $CU_{1,1}$, $CU_{1,2}$, $CU_{1,3}$ and $CU_{1,4}$ (as shown in FIG. 18A).

Figure 18A:
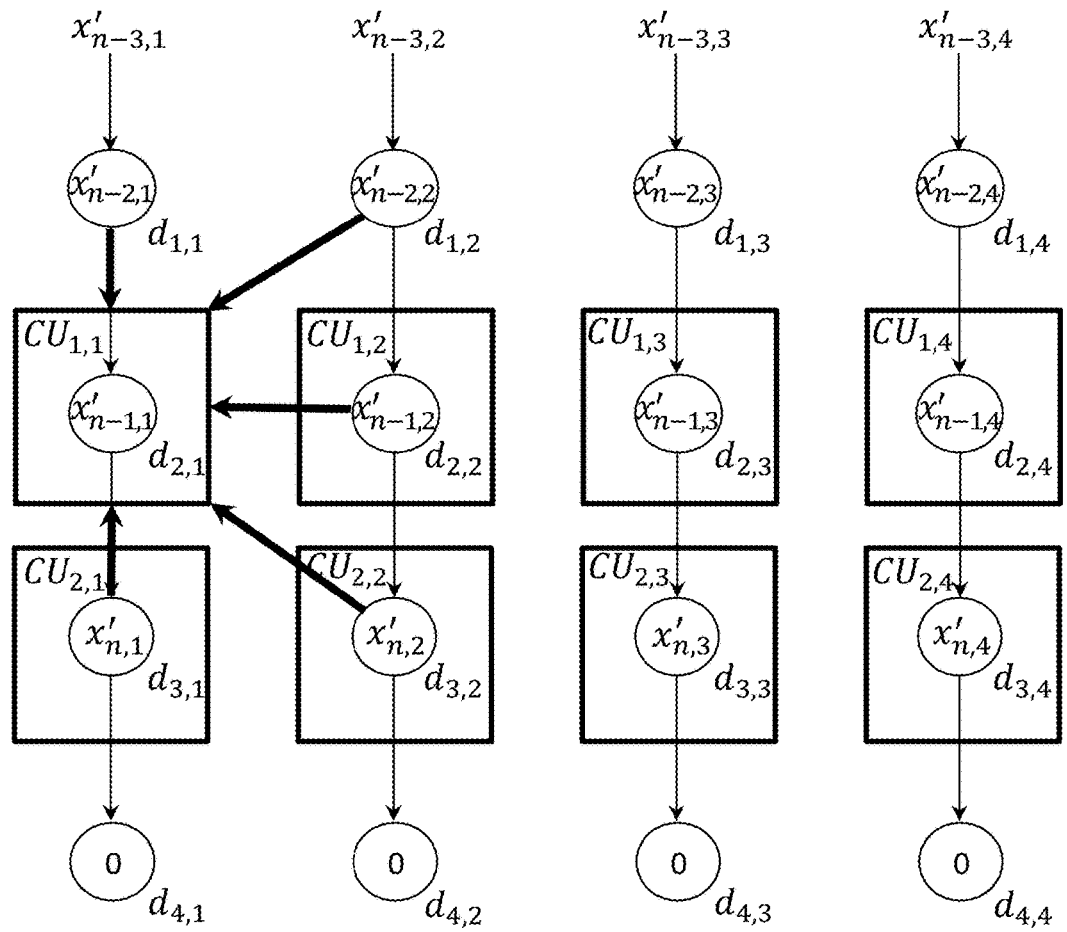
FIG. 18A and FIG. 18B describe the processing of two convolver units for the spatial orientation of the data values depicted in FIG. 17, in accordance with one embodiment of the invention.
Figure 18A:
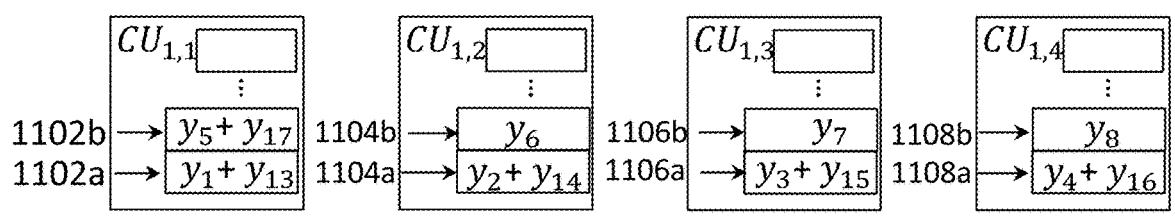
Figure 18A:
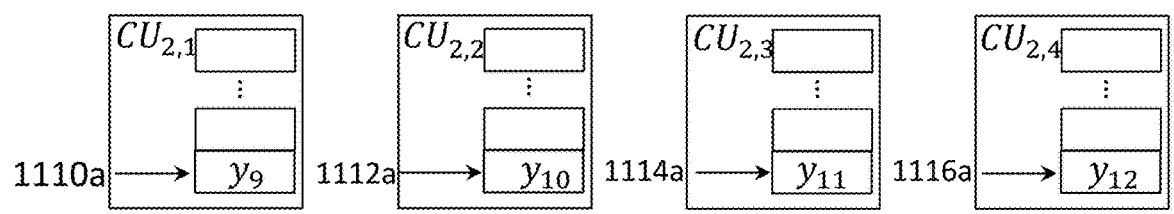
Figure 18B:
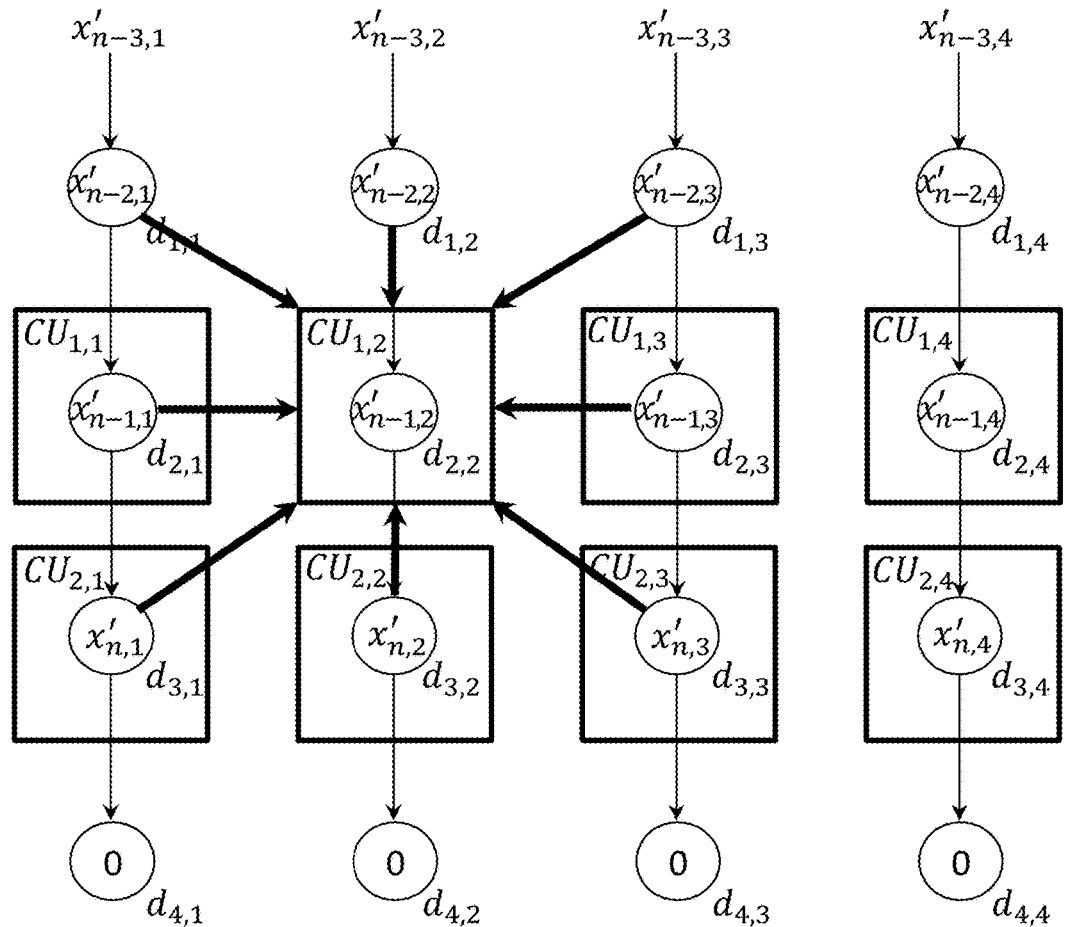
Figure 18B:
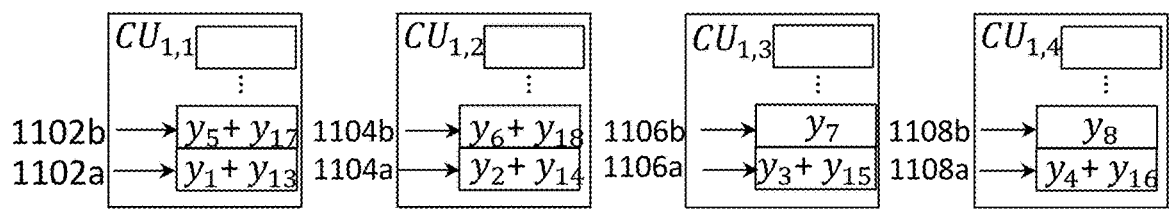
Figure 18B:
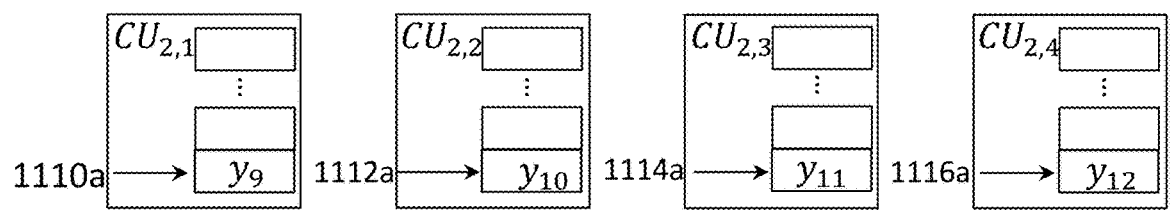

FIGS. 18A-18B describe the processing of two of the eight active convolver units, in accordance with one embodiment of the invention. As depicted in FIG. 18A, convolver unit $CU_{1,1}$ may receive data values from the five neighboring input data storage elements and the one corresponding input data storage element. Convolver unit $CU_{1,1}$ may then compute the partial sum $y_{17}$ defined by $w_2^{1,2} x'_{n-2,1}+w_3^{1,2}x'_{n-2,2}+w_5^{1,2}x'_{n-1,1}+w_6^{1,2}x'_{n-1,2}+w_8^{1,2}x'_{n,1}+w_9^{1,2}x'_{n,2}$. The partial sum $y_{17}$ may be summed with $y_5$ (the partial sum previously computed by convolver unit $CU_{1,1}$ for row n−1) and the new partial sum $y_5+y_{17}$ may be stored in output data storage element 1102b.

As depicted in FIG. 18B, convolver unit $CU_{1,2}$ may receive data values from the eight neighboring input data storage elements and the one corresponding input data storage element. Convolver unit $CU_{1,2}$ may then compute the partial sum y 18 defined by $w_1^{1,2}x'_{n-2,1}+w_2^{1,2}x'_{n-2,2}+w_3^{1,2}x'_{n-2,3}+w_4^{1,2}x'_{n-1,1}+w_5^{1,2}x'_{n-1,2}+w_6^{1,2}x'_{n-1,3}+w_7^{1,2}x'_{n,1}+w_8^{1,2}x'_{n,2}+w_9^{1,2}x'_{n,3}$. The partial sum $y_{18}$ may be summed with $y_6$ (the partial sum previously computed by convolver unit $CU_{1,2}$ for row n−1) and the new partial sum $y_6+y_{18}$ may be stored in output data storage element 1104b.

Figure 18C:
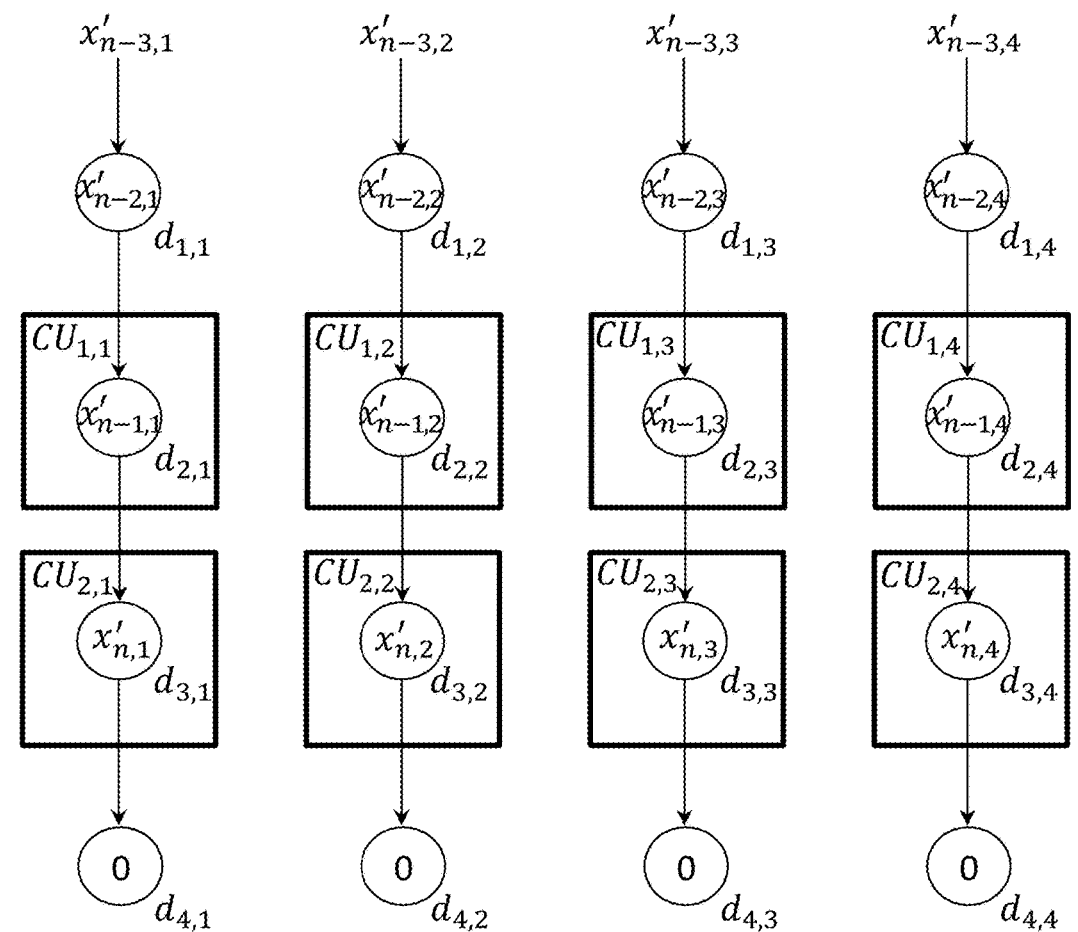
FIG. 18C depicts the resulting partial sums following the processing of all active convolver units for the spatial orientation of the data values depicted in FIG. 17, in accordance with one embodiment of the invention.
Figure 18C:
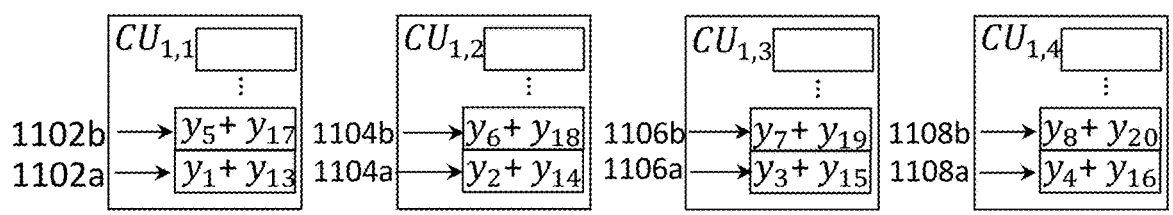
Figure 18C:
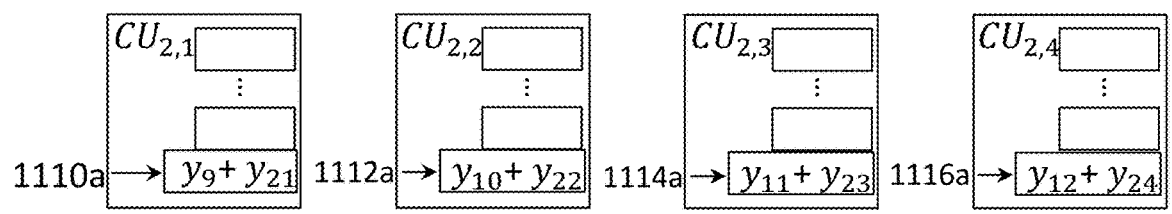

Similar processing is performed by convolver units $CU_{1,3}$, $CU_{1,4}$, $CU_{2,1}$, $CU_{2,2}$, $CU_{2,3}$ and $CU_{2,4}$, so the details of these computations have been omitted for conciseness. At the conclusion of the processing by the active convolver units for the spatial orientation of data values shown in FIG. 17, eight (additional) partial sums have been updated and stored in output data storage elements 1102b, 1104b, 1106b, 1108b, 1110a, 1112a, 1114a and 1116a, as shown in FIG. 18C.

The processing of the 2-D shift register and the plurality of convolutional units continues in a similar fashion until row 1 of horizontal stripe 904a has been shifted through the 2-D shift register. The processing of the 2-D shift register and the plurality of convolutional units then continues until all of the remaining input channels have been processed in a manner similar to the processing of the first two input channels.

Figure 19A:
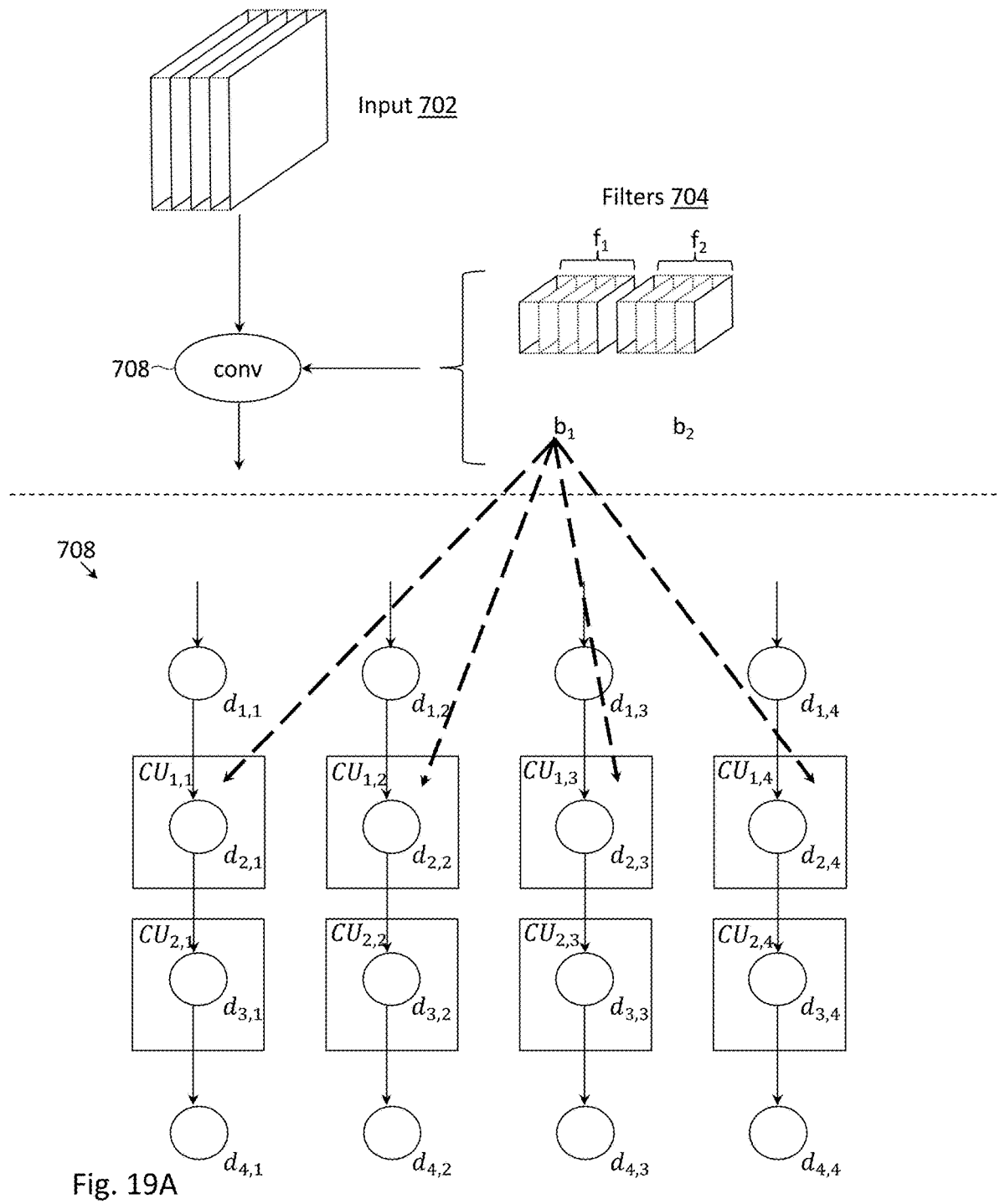
FIG. 19A and FIG. 19B depict the loading of bias values into the convolutional engine, in accordance with one embodiment of the invention.
Figure 19B:
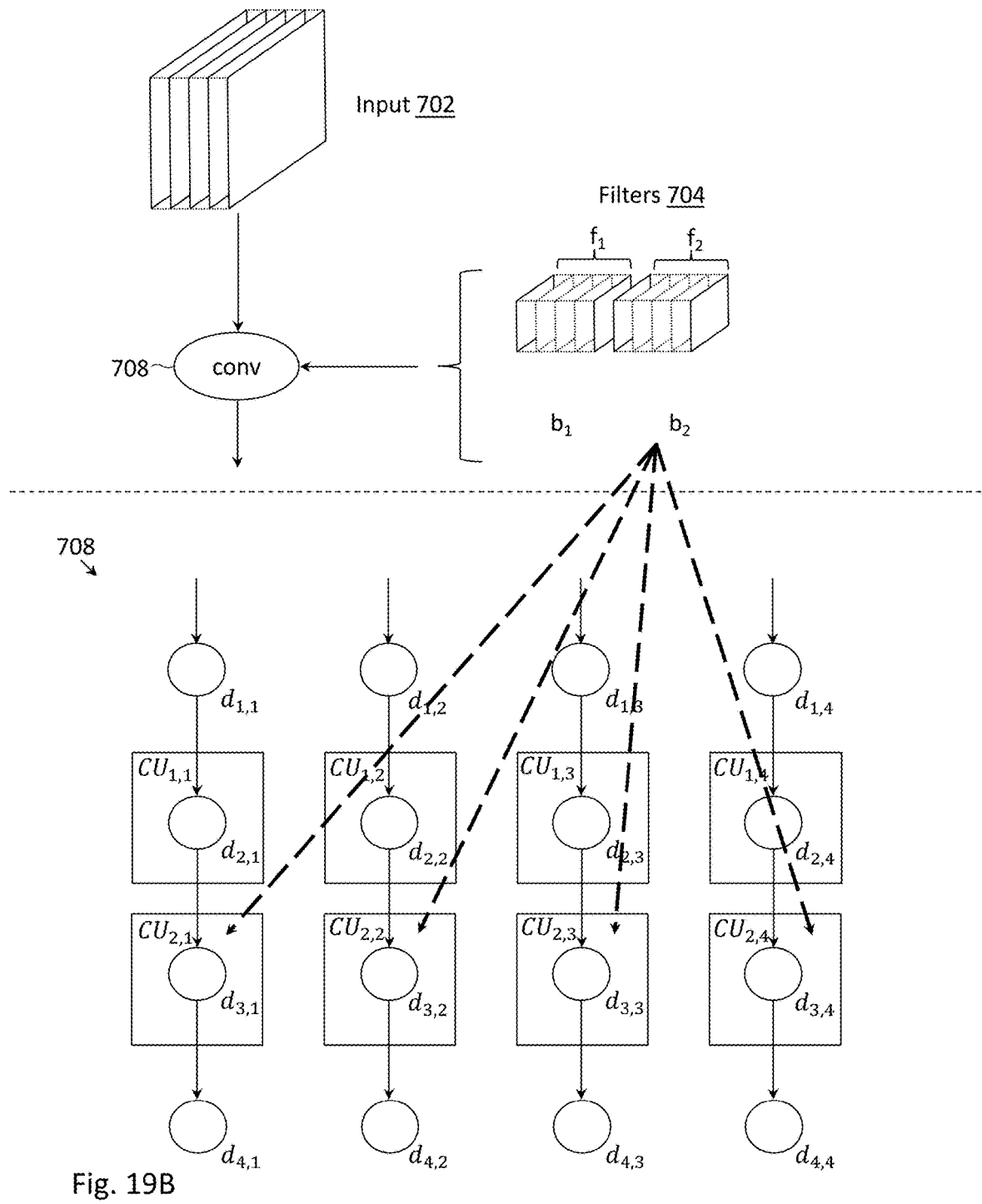
Figure 20:
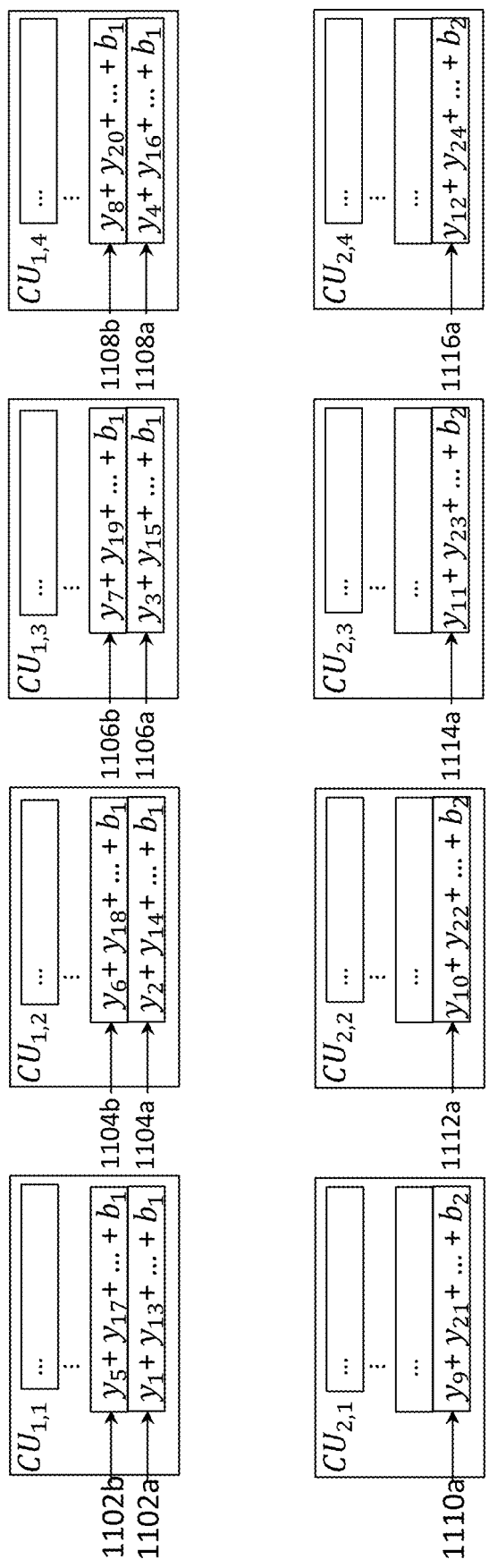
FIG. 20 depicts the output of each of the convolver units, after the partial sums have been biased with bias values, in accordance with one embodiment of the invention.

At this point (or earlier in the process), bias values may be loaded into the convolutional units. More specifically, FIG. 19A depicts the loading of bias value b 1 into the first row of convolver units ($CU_{1,1}$, $CU_{1,2}$, $CU_{1,3}$ and $CU_{1,4}$) and FIG. 19B depicts the loading of bias value b 2 into the second row of convolver units ($CU_{2,1}$, $CU_{2,2}$, $CU_{2,3}$ and $CU_{2,4}$). The partial sums computed by the first row of convolver units may be biased by bias value b 1, and the partial sums computed by the second row of convolver units may be biased by bias value b 2 (as depicted in FIG. 20) to yield the output of the convolution operation.

The description below focuses on a low power hardware architecture for the convolver units. As described above in FIG. 2, each value of the activation map is generated as the sum of a dot product between of input 202 and filter 204 (at a certain spatial location relative to input 202) and bias 206. As described in FIGS. 11A-20, each value of the activation map may be computed in stages, with the dot product between a first kernel of the filter and the first channel of the input data being computed, followed by the dot product between a second kernel of the filter and second channel of the input data being computed, etc., until the dot product between the last kernel of the filter and the last channel of the input data has been computed. Further, these dot products may be successively summed to arrive upon a value of the activation map. For example, as shown in FIG. 20, the value stored in output data storage element 1102a is $y_1+y_{13}+\ldots+b_1$, where $y_1$ represents the dot product between a first kernel of the filter and the first channel of the input data, $y_{13}$ represents the dot product between a second kernel of the filter and the second channel of the input data, and so on.

In this context of successively accumulating dot products, a power savings technique may be employed. Particularly, when the running sum of the dot products exceeds a maximum or minimum value that can be stored by the data register, causing a positive or negative overflow, it no longer makes sense to continue the dot product and accumulation operations for the remaining input data channels, since it is already known that the output value of the activation map will be either a positive or negative overflow value. Therefore, once an overflow condition has been reached, the power savings technique disables one or more of the dot product and accumulation computations, until the clear signal 123 is asserted which signals the start of a new accumulation cycle.

Figure 21:
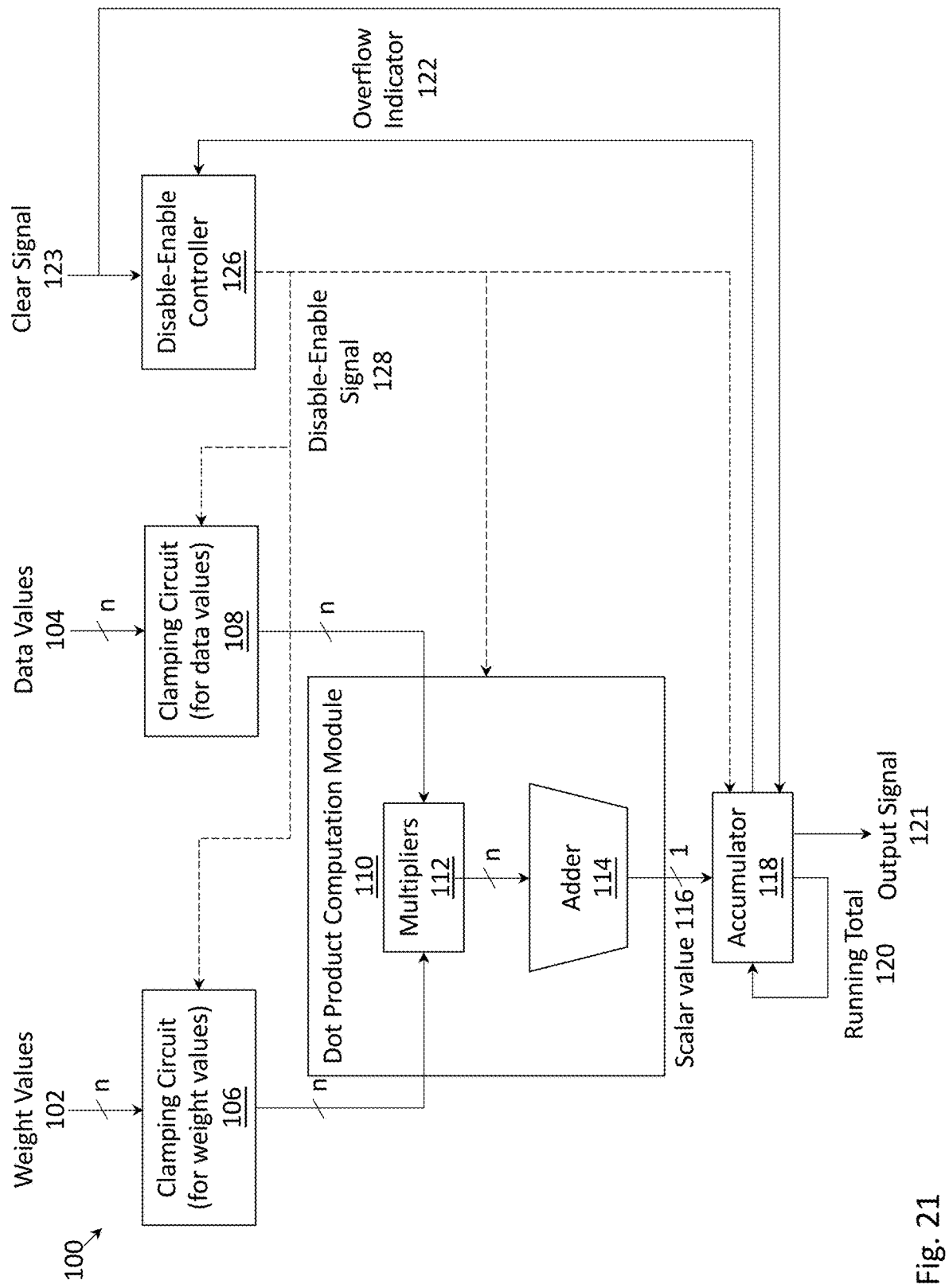
FIG. 21 depicts the hardware architecture of a convolver unit, in accordance with one embodiment of the invention.

FIG. 21 depicts a hardware architecture of a convolver unit 100, in accordance with one embodiment of the invention. The convolver unit 100 receives weight values 102, data values 104 and a clear signal 123 as input and outputs an output signal 121 which may either be an accumulated value or a positive/negative overflow value. In the context of the convolutional engine that has been described above, the weight values include nine weight values from a kernel and the data values 104 include nine data values from one channel of the input (or activation) data. The weight values 102 may optionally be passed through a clamping circuit 106, and the data values 104 may optionally be passed through a clamping circuit 108. The purpose of these clamping circuits will be explained below. Assuming the clamping operation is not enabled, the weight values 102 and data values 104 are passed through to the dot product computation module 110 which computes a scalar value 116 that represents the dot product of the input tensors (i.e., for brevity, each of the weight values 102 and data values 104 may be called an input tensor). The scalar value 116 is received by the accumulator 118 which sums the scalar value 116 with a running total 120.

However, as described above, if the running total 120 exceeds a maximum value or is less than a minimum value, the running total 120 has overflowed and an overflow indicator 122 may signal to the disable-enable controller 126 that an overflow has occurred. In turn, the disable-enable controller 126 may transmit a disable message via the disable-enable signal 128 to one or more of the clamping circuit 106, clamping circuit 108, dot product computation module 110 and accumulator 118 in order to disable additional dot product computations and/or additional accumulation operations. As one example, the disable message may be encoded by a falling edge of the disable-enable signal 128.

There are several ways in which additional dot product computations may be disabled. In one embodiment, the weight values 102 may be clamped to zero by clamping circuit 106, upon receipt of the disable message by clamping circuit 106. Clamping circuit 106 may include a parallel arrangement of AND gates, in which the clamping operation may be carried out by logically ANDing each of the input values with zero. It should be understood that the dot product with the zero operand will produce the zero output, so the clamping operation of one of the inputs to the dot product computation module 110 has the effect of disabling the dot product computation module 110 (i.e., preventing additional switching of signals between logical 1 and 0, thereby saving power).

In another embodiment, the data values 104 may be clamped to zero by clamping circuit 108, upon receipt of the disable message by clamping circuit 108. In another embodiment, the weight values 102 and data values 104 may be clamped to zero by clamping circuits 106 and 108, respectively, upon receipt of the disable message from the disable-enable controller 126.

In another embodiment, the weight values 102 and data values 104 could be held constant, which would also have the desired effect of preventing switching and reducing power consumption. In one hardware implementation (not depicted), the weight values 102 and data values 104 could be held constant by latches that are closed in response to receipt of the disable message. In another hardware implementation (not depicted), the clamping circuits 106 and 108 could be replaced with clock-gated registers or flip-flops in order to temporarily hold the weigh values 102 and data values 104 constant (i.e., with the clock gating activated by the disable message).

Figure 22:
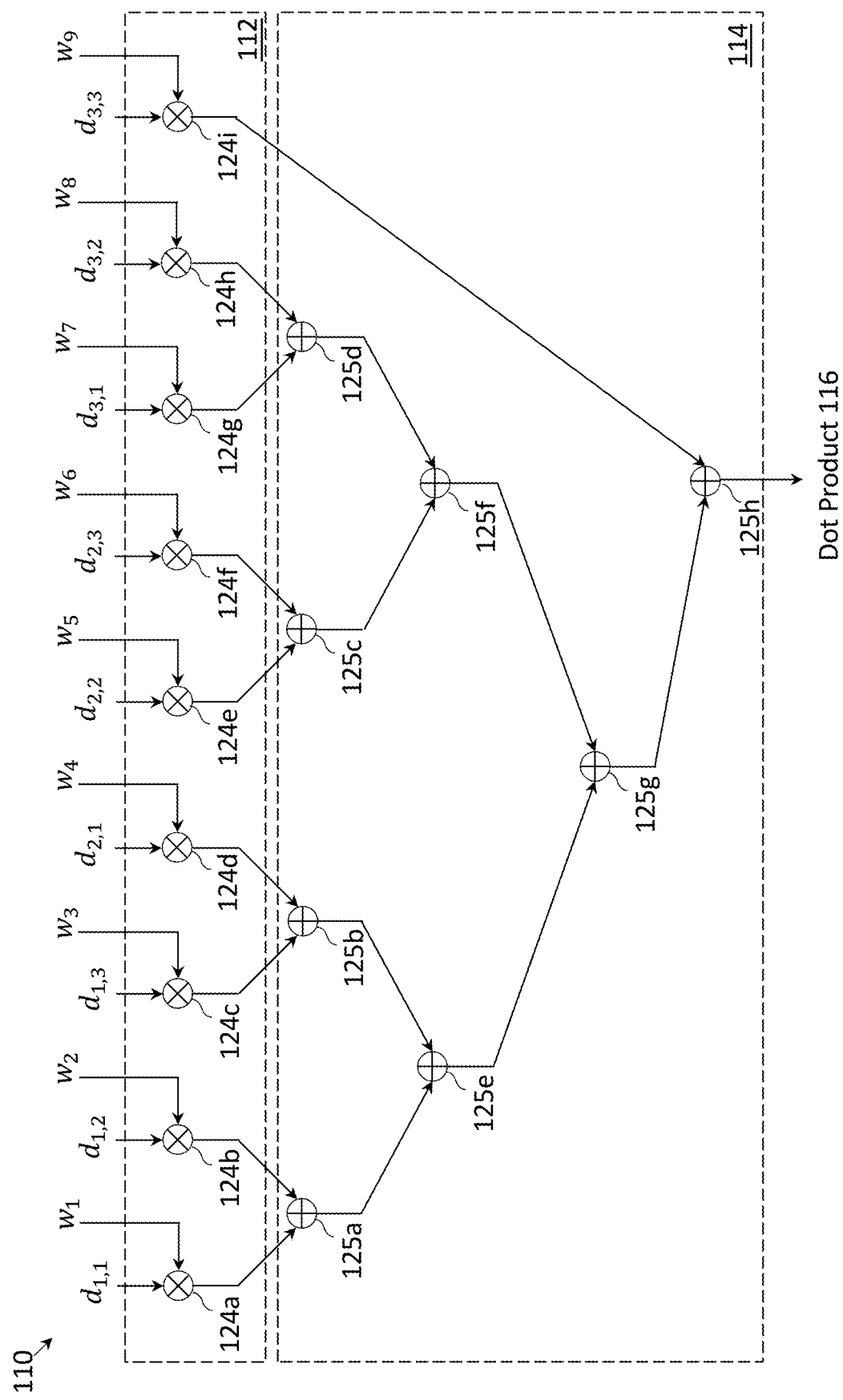
FIG. 22 depicts details of the dot product computation module, in accordance with one embodiment of the invention.

In another embodiment, the dot product computation module 110 may be disabled via clock gating (in addition or alternatively to the clamping of its inputs) upon receipt of the disable message from the disable-enable controller 126. One possible implementation of the dot product computation module 110 is provided in FIG. 22, in which the multipliers 112 are implemented as nine multipliers 124*a-i* and the adder 114 is implemented as an adder tree including eight adders 125*a-h*. It is understood that in a digital logic implementation of the multipliers and adders, each of these combinatorial logic components receives a clock input (not depicted), and clock gating of the dot product computation module 110 entails clamping the clock signal to either logic 1 or logic 0, which would prevent any toggling of signals within the dot product computation module 110, thereby saving power.

Receipt of the disable message by the accumulator 118 may cause the accumulator 118 to stop any additional accumulation operation (i.e., stop the updating of the running total 120), and set the output 121 of the accumulator 118 to a predetermined value. In response to a positive overflow, the output 121 of the accumulator 118 may be set to a predetermined positive overflow value. In response to a negative overflow, the output 121 of the accumulator 118 may be set to a predetermined negative overflow value. The operation of the accumulator 118 is described in greater detail below in FIG. 23.

At the beginning of an accumulation cycle (which will be better understood in the context of FIG. 26), the clear signal 123 may be asserted, causing the disable-enable controller 126 to send an enable message via the disable-enable signal 128. As one example, the enable message may be encoded by a rising edge of the disable-enable signal 128. In response to the enable message, the clamping circuit 106 may be de-activated, allowing weight values 102 to resume passing through to the dot product computation module 110. Similarly, the clamping circuit 108 may be de-activated, allowing data values 104 to resume passing through to the dot product computation module 110. In response to the enable message, the clock gating of the dot product computation module 110 may be deactivated, allowing the adders and multipliers to resume their respective operations. In response to the enable message and/or the clear signal 123 being asserted, the running total of the accumulator 118 may be initialized to 0.

For the sake of brevity, the schematic of convolver unit 100 in FIG. 21 does not include the hardware components and signals lines for summing the running total 120 with the bias value, but it is expected that one of ordinary skill in the art would be able to modify the convolver unit 100 to incorporate such functionality.

Figure 23:
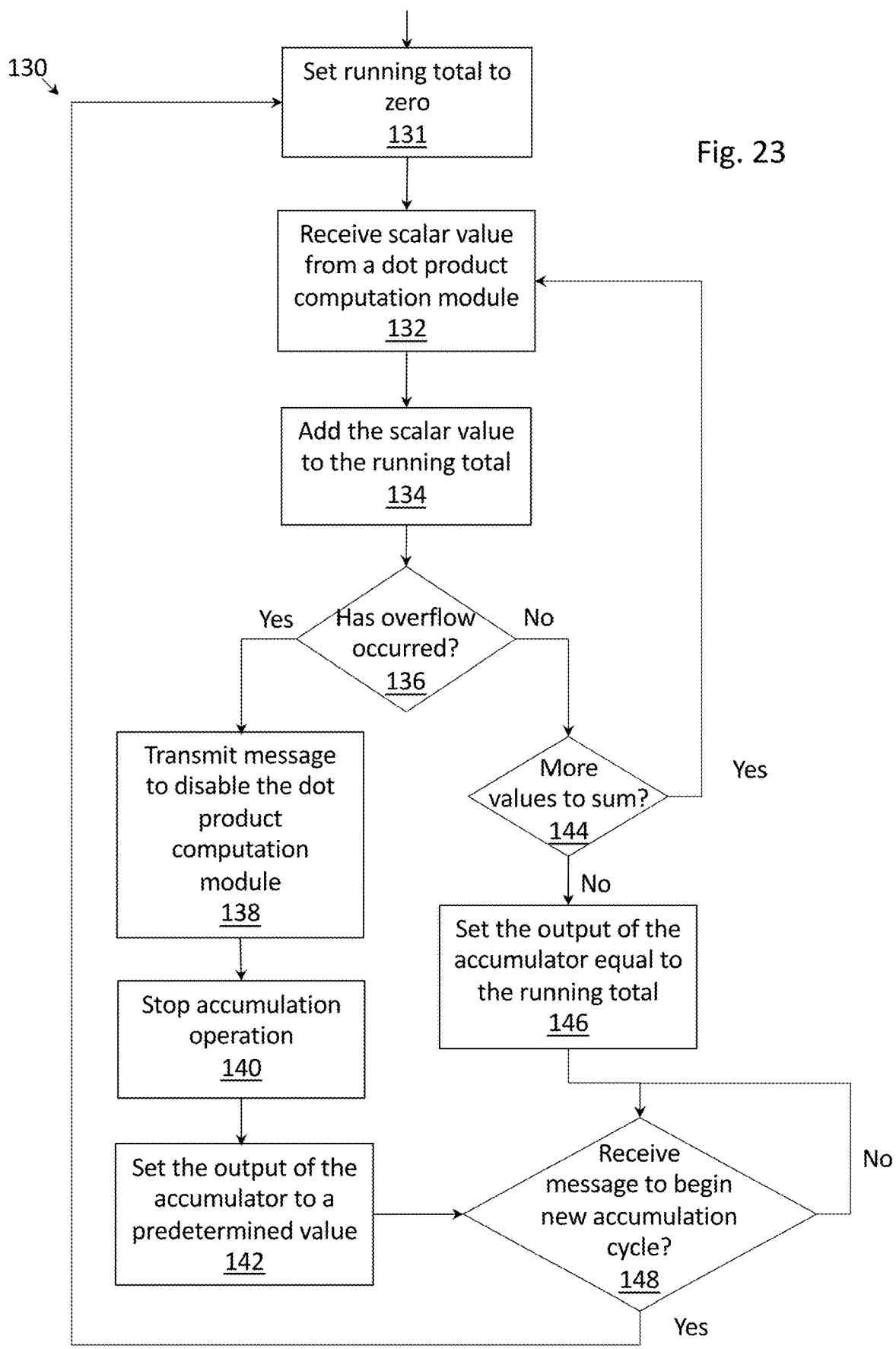
FIG. 23 depicts a flow diagram of operations performed by an accumulator, in accordance with one embodiment of the invention.

FIG. 23 depicts a flow diagram 130 of operations performed by the accumulator 118. At step 131, the running total of the accumulator 118 may be initialized to zero. At step 132, the accumulator 118 may receive a scalar value 116 from the dot product computation module 110. At step 134, the accumulator 118 may add the scalar value 116 to the running total 120. At step 136, the accumulator 118 may determine whether an overflow has occurred. For instance, the accumulator 118 may determine that a positive overflow has occurred in response to the running total 120 exceeding a maximum value. Similarly, the accumulator 118 may determine that a negative overflow has occurred in response to the running total 120 being less than a minimum value. If an overflow (e.g., either positive or negative) has occurred (yes branch of step 136), the accumulator 118 may transmit a message to disable the dot product computation module 110 (step 138). For example, in the embodiment of the convolver unit 100 depicted in FIG. 21, the message may involve toggling or asserting the overflow indicator signal 122. At step 140, the accumulator 118 may stop any further accumulation operation during the remainder of the accumulation cycle. At step 142, the accumulator 118 may set the output signal 121 of the accumulator 118 to a predetermined value (e.g., a positive or negative overflow value). It is noted that steps 140 and 142 may occur in response to the accumulator's detection of an overflow, or may occur in response to the receipt of a disable message received from the disable-enable controller 126.

If an overflow has not occurred (no branch of step 136), the accumulator 118 may determine whether there are additional values to sum (step 144), for instance, based on the current time point within an accumulation cycle. For example, the accumulator 118 may determine that there are additional values to sum until it has reached the end of an accumulation cycle. If there are more values to sum (yes branch of step 144), the process returns to step 132. If there are no more values to sum (no branch of step 144), the accumulator 118 may set the output signal 121 of the accumulator 118 equal to the running total 120 (step 146). After either of steps 142 and 146 in which the output 121 of the accumulator 118 has been set to a value, the output 121 may be sampled by a downstream component of the convolver unit 100 (not shown in FIG. 23). Finally, at step 148, the accumulator 118 may monitor for the assertion of the clear signal 123 (which indicates the start of a new accumulation cycle). If the clear signal 123 is asserted (yes branch of step 148), the process may return to step 131. If the clear signal 123 is not asserted (no branch of step 148), the accumulator 118 may continue monitoring for the assertion of the clear signal 123.

Figure 24:
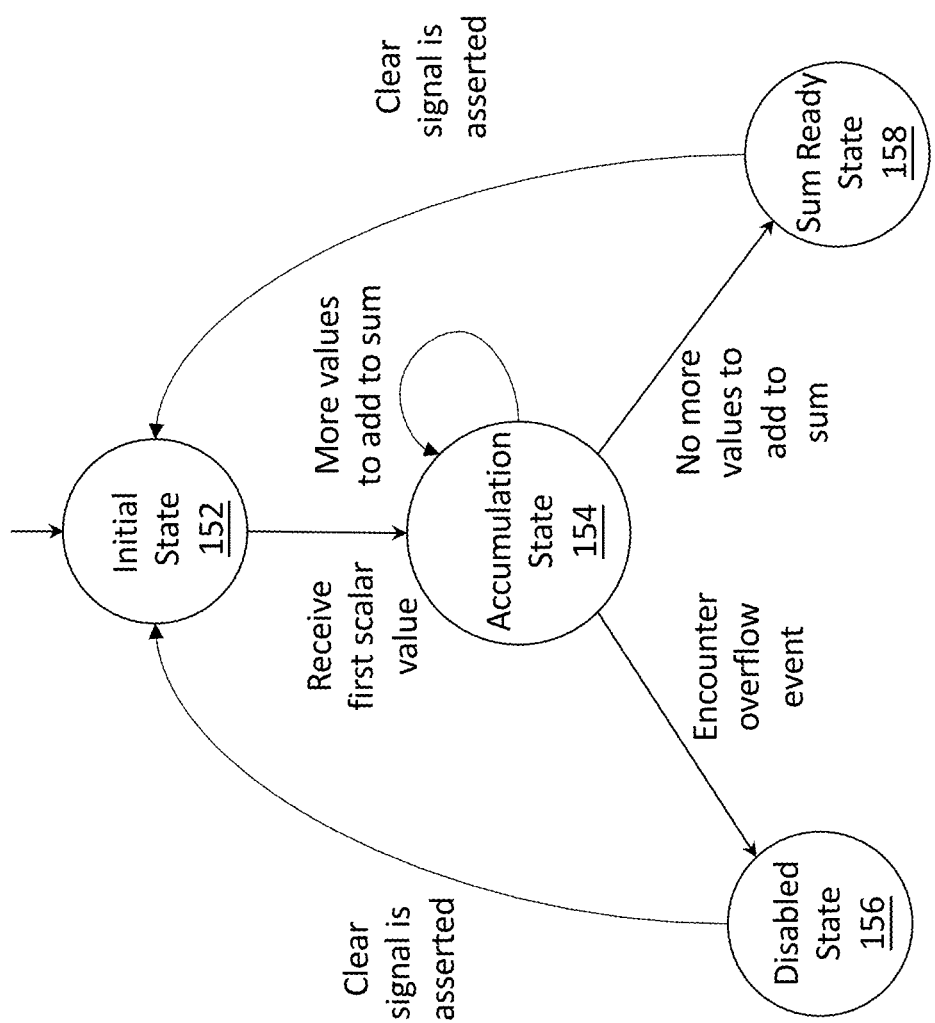
FIG. 24 depicts a state transition diagram describing the states of operation of the convolver unit, in accordance with one embodiment of the invention.

FIG. 24 depicts a state transition diagram 150 describing the states of operation of the convolver unit 100. The state of the convolver unit 100 begins in the initial state 152, in which the running total 120 of the accumulator 118 is set to zero. Upon receiving the first scalar value 116 from the dot product computation module 110, the convolver unit 100 transitions to the accumulation state 154 in which the accumulator 118 begins the accumulation operations by adding the first scalar value 116 to the running total 120. The convolver unit 100 transitions back to the accumulation state 154 if there are more scalar values to sum to the running total 120. Upon experiencing an overflow event, the convolver unit 100 transitions to the disabled state 156, in which at least a portion of the convolver unit 100 is disabled so as to save power. From the accumulation state 154, the convolver unit 100 transitions to the sum ready state 158 when there are no further values to add to the running total 120. In either the disabled state 156 or the sum ready state 158, the convolver unit 100 returns to the initial state 152 in response to the assertion of the clear signal 123, which signals the start of a new accumulation cycle.

Figure 25:
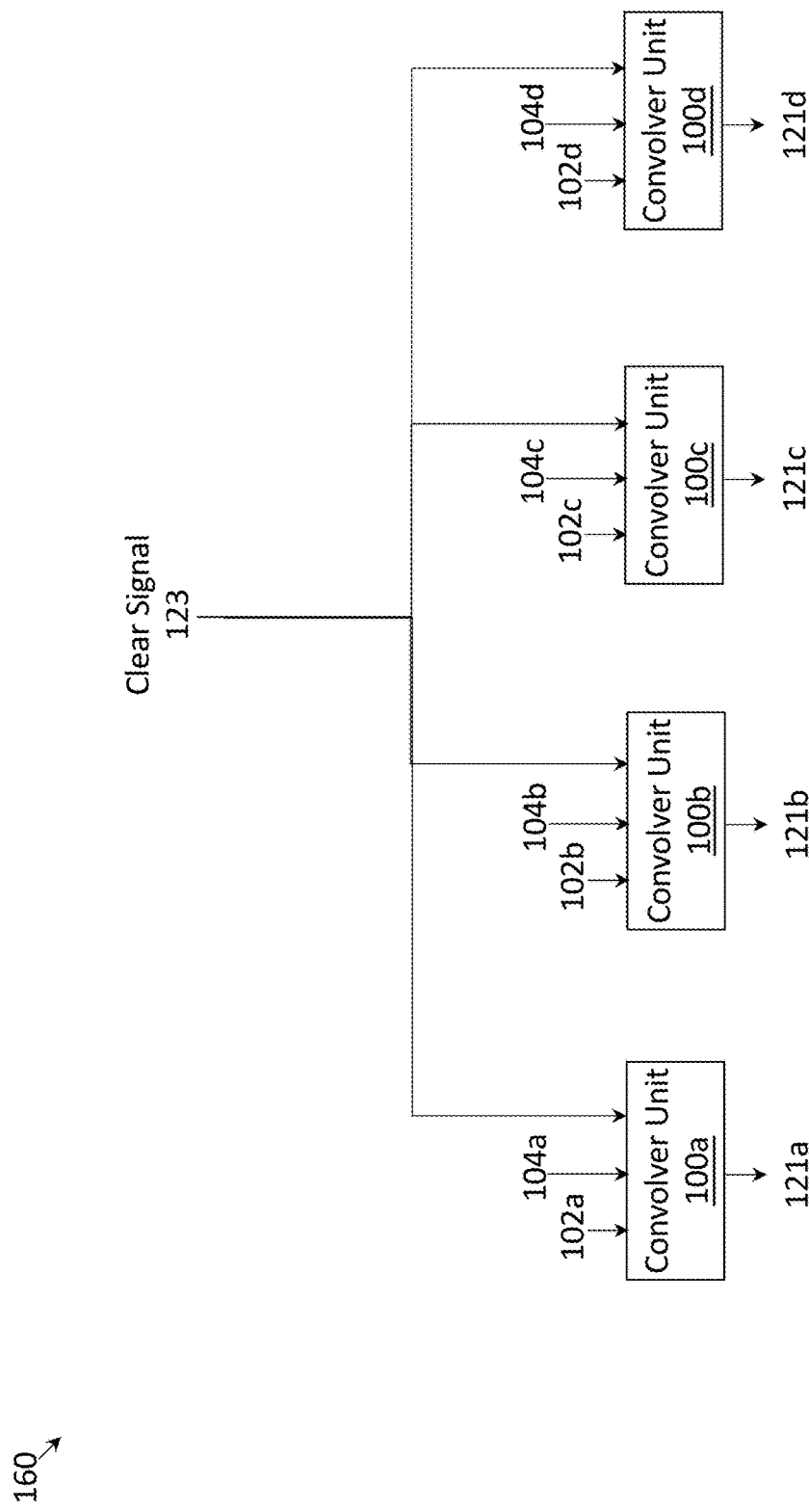
FIG. 25 depicts a system diagram with a group of convolver units being controlled by a common clear signal, in accordance with one embodiment of the invention.
Figure 26:
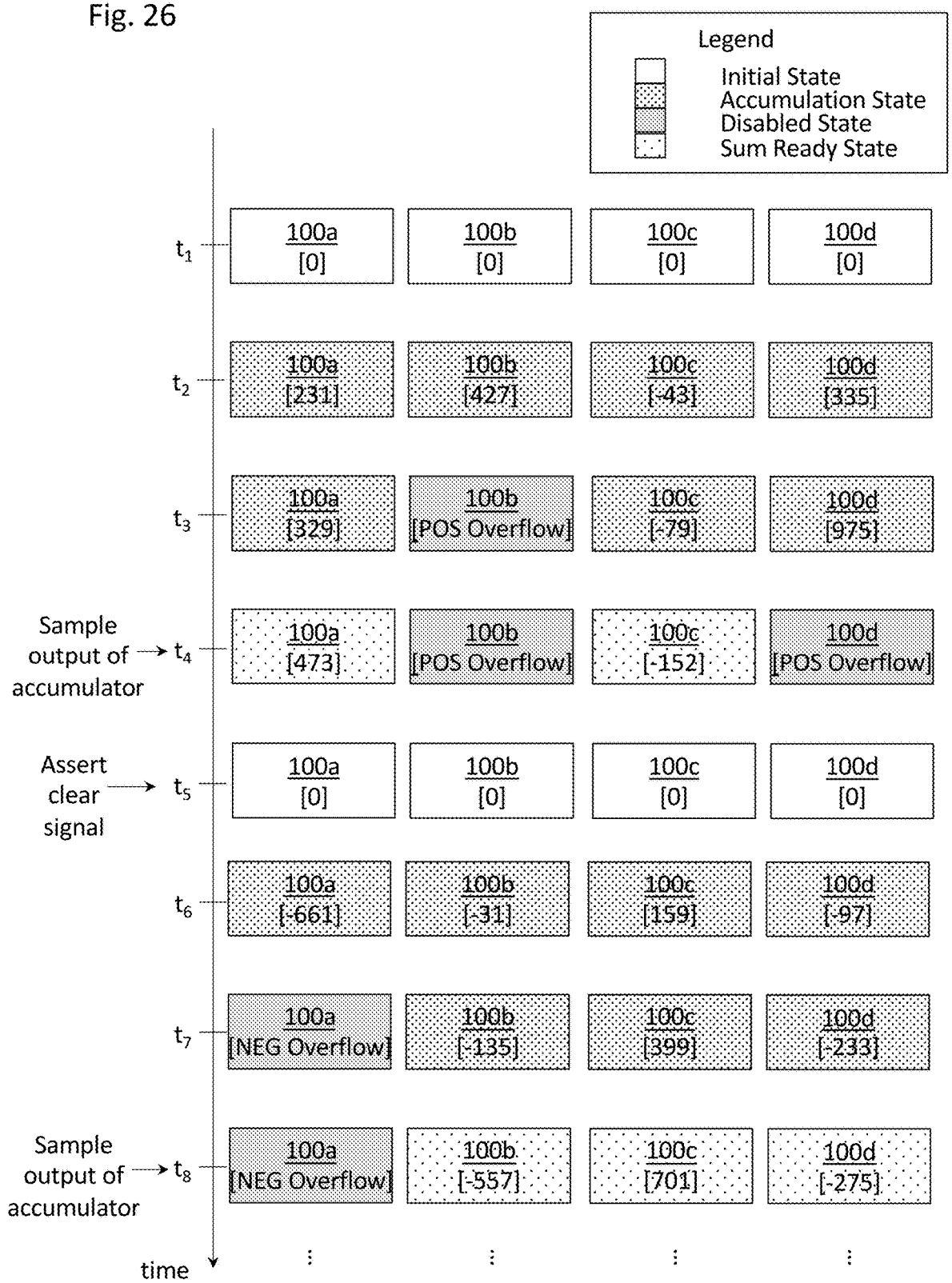
FIG. 26 depicts the time evolution of the state of a group of convolver units, in accordance with one embodiment of the invention.

FIGS. 25 and 26 now explain the handing of accumulation overflows in the context of a group of four convolver units, 100*a-d*. For simplicity, only four convolver units are shown and discussed, but it is understood that many more convolver units will be present in an implemented embodiment. As depicted in the system diagram 160 of FIG. 25, all the convolver units 100*a-d* receive a common clear signal 123. As a result, the accumulation cycles for all of the convolver units 100*a-d* start at the same time. Due to a simultaneous sampling operation (described below in FIG. 26), the accumulation cycles for all of the convolver units 100*a-d* also end at the same time.

Input signals 102*a-d* represent the weights values provided to convolver units 100*a-d*, respectively, and input signals 104*a-d* represent the data (or activation) values provided to the convolver units 100*a-d*, respectively. Based on the description of the convolutional engine above, it is expected the reader will understand what weights and data values to provide to the convolver units 100*a-d*. For example, if the convolver units 100*a-d* belong to the same "row" (in reference to the convolutional engine discussed above), all of the weight signals 102*a-d* will encode the same set of nine weights at any moment in time.

FIG. 26 depicts the time evolution of the state of a group of convolver units 100*a-d*. At time point $t_1$, all of the convolver units 100*a-d* begin in the initial state, and the respective running totals (represented within square brackets in FIG. 26) are set to zero. Time point $t_1$ may be regarded as the beginning of the first accumulation cycle.

At time point $t_2$, all of the convolver units 100*a-d* are in the accumulation state. The running totals of each of the convolver units 100*a-d* are shown at time point $t_2$. The running totals for the convolver units 100*a-d* are 231, 427, −43 and 335, respectively. In the example of FIG. 26, it is noted that the running totals may be positive or negative values.

At time point $t_3$, convolver units 100*a*, 100*c* and 100*d* are still in the accumulation state. The running total of convolver unit 100*b* has overflowed, so convolver unit 100*b* has transitioned to the disabled state and its output 121*b* has been set to a positive overflow value (abstractly represented as "POS Overflow" in FIG. 26). In the example of FIG. 26, the positive overflow threshold is 1000 and the negative overflow threshold is −1000, for simplicity.

At time point $t_4$, convolver unit 100*b* remains in the disabled state. There are no additional values to sum for convolver units 100*a* and 100*c*, so those convolver units have transitioned to the sum ready state. The running total of convolver unit 100*d* has overflowed, so convolver unit 100*d* has transitioned to the disabled state and its output 121*d* has been set to a positive overflow value (abstractly represented as "POS Overflow" in FIG. 26). Also at time point $t_4$, a downstream component samples the output 121*a-d* of each of the convolver units 100*a-d*. The downstream component may be data registers which stores the respective values as part of an activation map. Time point t 4 may be regarded as the end of the first accumulation cycle (i.e., coinciding with the sampling of the outputs 121*a-d*).

At time point $t_5$, all of the convolver units 100*a-d* return to the initial state upon the clear signal 123 being asserted, and the running totals are set to zero. Time point $t_5$ may be regarded as the beginning of the second accumulation cycle (i.e., coinciding with the assertion of the clear signal 123).

At time point $t_6$, all of the convolver units 100*a-d* are in the accumulation state. The running totals for the convolver units 100*a-d* are −661, −31, 159 and −97, respectively.

At time point $t_7$, convolver units 100*b-d* are still in the accumulation state. The running total of convolver unit 100*a* has overflowed, so convolver unit 100*a* has transitioned to the disabled state and its output 121*a* has been set to a negative overflow value (abstractly represented as "NEG Overflow" in FIG. 26).

At time point $t_8$, convolver unit 100*a* remains in the disabled state. There are no additional values to sum for convolver units 100*b-d*, so those convolver units have transitioned to the sum ready state. Also at time point $t_8$, a downstream component samples the output 121*a-d* of each of the convolver units 100*a-d*. Time point $t_8$ may be regarded as the end of the second accumulation cycle (i.e., coinciding with the sampling of the outputs 121*a-d*). Such process may continue in a similar manner for additional accumulation cycles.

The reason for transitioning the convolver units to the disabled (low power) state may be more apparent in the context of FIG. 26. If a system had only one convolver unit (mentioned only as a hypothetical for the sake of discussion), it might be reasonable for the convolver unit to immediately start the next accumulation cycle upon experiencing an accumulation overflow. However, in a system with many convolver units, the disabled state advantageously allows a convolver unit to stay in a low power mode for the remainder of an accumulation cycle while waiting for one or more other convolver units to complete their respective accumulation operations.

Figure 27:
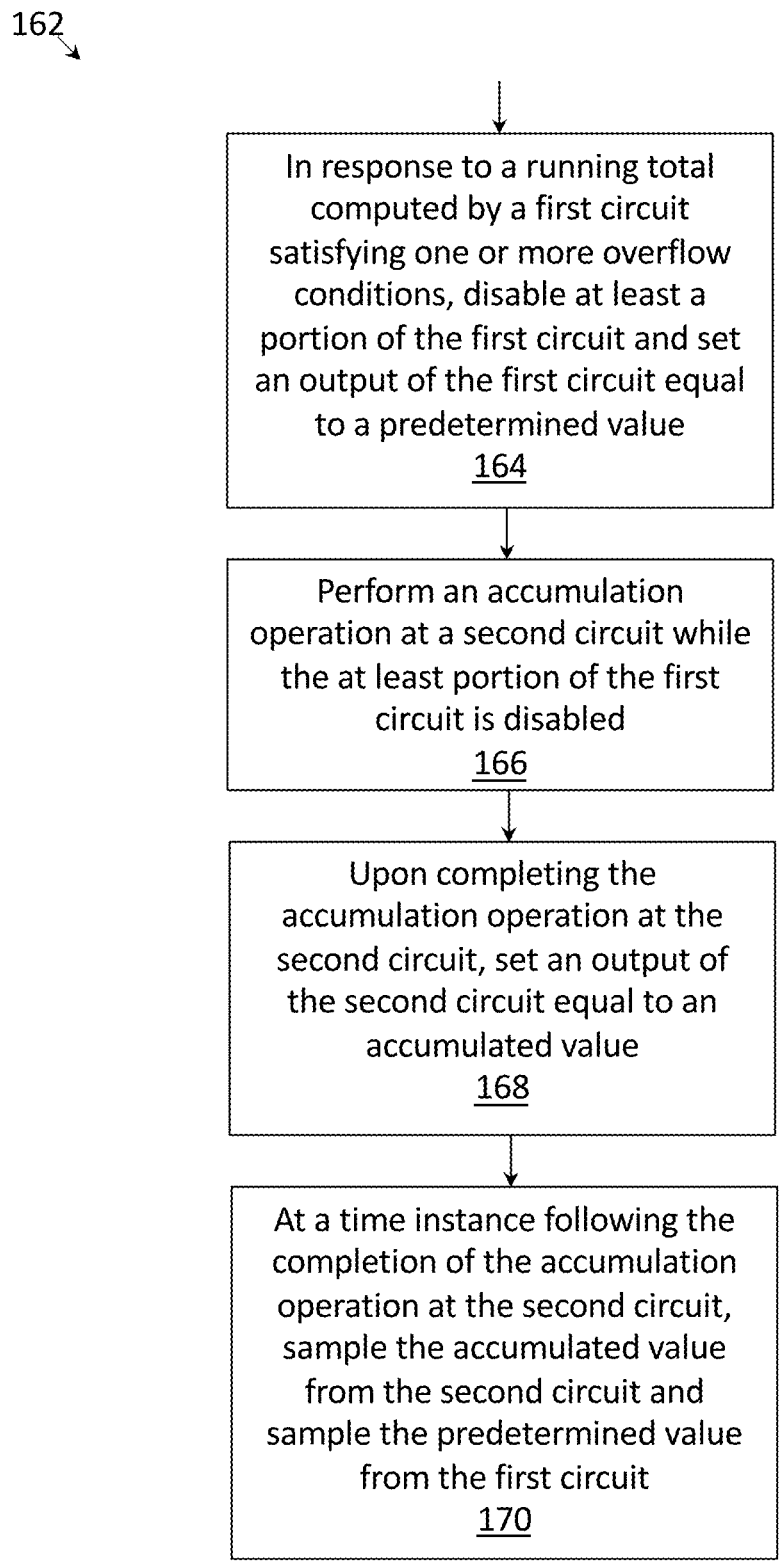
FIG. 27 depicts a flow diagram of the operations associated with two convolver units, in accordance with one embodiment of the invention.

FIG. 27 depicts a flow diagram 162 of the operations associated with two convolver units. At step 164, in response to a running total computed by a first convolver unit satisfying one or more overflow conditions, at least a portion of the first convolver unit may be disabled and an output of the first convolver unit may be set equal to a predetermined value. In the example of FIG. 26, such step may be illustrated by the dot product computation module 110 of convolver unit 100*b* being disabled and the output 121*b* of the convolver unit 100*b* being set to the positive overflow value at time point $t_3$ in response to the running total of the accumulator 118 of convolver unit 100*b* positively overflowing.

At step 166, an accumulation operation at a second convolver unit may be performed while the at least portion of the first convolver unit is disabled. In the example of FIG. 26, such step may be illustrated by an accumulation operation being performed at convolver unit 100a at time point $t_3$ while the dot product computation module 110 of convolver unit 100b is disabled.

At step 168, upon completing the accumulation operation at the second convolver unit, an output of the second convolver unit may be set equal to an accumulated value. In the example of FIG. 26, such step may be illustrated by the output 121a of the convolver unit 100a being set equal to the value of 473 (at some time between time points $t_3$ and $t_4$) upon completing the accumulation operation at convolver unit 100a.

At step 170, at a time instance following the completion of the accumulation operation at the second convolver unit, the accumulated value from the second convolver unit and the predetermined value from the first convolver unit may be sampled. In the example of FIG. 26, such step may be illustrated by the value of 473 being sampled from convolver unit 100a and the positive overflow value being sampled from convolver unit 100b at time point t 4.

Thus, a low power hardware architecture for handling accumulation overflows in a convolution operation has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
  at an accumulator, receiving a first dot product from a dot product computation module and updating a running total by adding the first dot product to the running total; and
  in response to the accumulator having overflowed as indicated by the running total satisfying one of at least one overflow condition, disabling the dot product computation module and setting an output of the accumulator to a predetermined value, wherein disabling the dot product computation module comprises one or more of clock gating the dot product computation module or clamping one or more inputs received by the dot product computation module to a zero value,
  otherwise, in response to the accumulator not having overflowed as indicated by the running total not satisfying any of the at least one overflow condition, either:
    (i) setting the output of the accumulator equal to the running total; or
    (ii) receiving at the accumulator a second dot product from the dot product computation module and updating the running total by adding the second dot product to the running total.

2. The method of claim 1, wherein the dot product computation module computes a dot product of two tensors, and wherein the first dot product is equal to a scalar value representing an output of the dot product computation module.

3. The method of claim 1, wherein the at least one overflow condition comprises a positive overflow and a negative overflow.

4. The method of claim 3, wherein the positive overflow comprises the running total exceeding a threshold value.

5. The method of claim 3, wherein the negative overflow comprises the running total being less than a threshold value.

6. The method of claim 1, wherein in response to the running total satisfying a positive overflow condition, the predetermined value is a positive overflow value.

7. The method of claim 1, wherein in response to the running total satisfying a negative overflow condition, the predetermined value is a negative overflow value.

8. A method, comprising:
  in response to a running total computed by a first accumulator of a first convolver unit satisfying one of at least one overflow condition, disabling a dot product computation module of the first convolver unit and setting an output of the first convolver unit equal to a predetermined value, wherein disabling the dot product computation module comprises one or more of clock gating the dot product computation module or clamping one or more inputs received by the dot product computation module to a zero value;
  performing an accumulation operation by a second accumulator of a second convolver unit while the dot product computation module of the first convolver unit is disabled;
  upon completing the accumulation operation by the second accumulator of the second convolver unit, setting an output of the second convolver unit equal to an accumulated value; and
  at a time instance following the completion of the accumulation operation by the second accumulator at the second convolver unit, sampling the accumulated value from the output of the second convolver unit and sampling the predetermined value from the output of the first convolver unit.

9. The method of claim 8, wherein the second convolver unit computes a dot product of two tensors.

10. The method of claim 8, wherein the at least one overflow condition comprises a positive overflow and a negative overflow.

11. The method of claim 10, wherein the positive overflow comprises the running total exceeding a threshold value.

12. The method of claim 10, wherein the negative overflow comprises the running total being less than a threshold value.

13. The method of claim 8, wherein in response to the running total satisfying a positive overflow condition, the predetermined value is a positive overflow value.

14. The method of claim 8, wherein in response to the running total satisfying a negative overflow condition, the predetermined value is a negative overflow value.

* * * * *